US012280278B2

(12) United States Patent
Duncan et al.

(10) Patent No.: US 12,280,278 B2
(45) Date of Patent: *Apr. 22, 2025

(54) SYSTEMS AND METHODS FOR IMPROVING FIRE SAFETY IN AGRICULTURAL MACHINERY

(71) Applicant: Suppression Technologies, Inc., Charlotte, NC (US)

(72) Inventors: Robert A. Duncan, Atlanta, GA (US); Kevin Scott Smith, Huntersville, NC (US); Terry A. Spencer, Gastonia, NC (US)

(73) Assignee: Suppression Technologies, Inc., Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/388,959

(22) Filed: Nov. 13, 2023

(65) Prior Publication Data
US 2024/0075326 A1 Mar. 7, 2024

Related U.S. Application Data

(63) Continuation of application No. 17/990,821, filed on Nov. 21, 2022, now Pat. No. 11,844,969, which is a
(Continued)

(51) Int. Cl.
A62C 3/04 (2006.01)
A01D 75/18 (2006.01)
(Continued)

(52) U.S. Cl.
CPC ............... *A62C 3/04* (2013.01); *A01D 75/18* (2013.01); *A01F 15/08* (2013.01); *A62C 3/07* (2013.01); *A01D 46/085* (2013.01)

(58) Field of Classification Search
CPC .. A62C 3/04; A62C 3/07; A01D 75/18; A01D 46/085; A01F 15/08
(Continued)

(56) References Cited

U.S. PATENT DOCUMENTS 3,260,040 A   7/1966 Wilson, Jr.
3,688,846 A   9/1972 Lease
(Continued)

FOREIGN PATENT DOCUMENTS

BR   PI0404126-7 A   6/2005
CN   202262263 A     6/2012
(Continued)

OTHER PUBLICATIONS

International Search Report and Written Opinion in counterpart International Application No. PCT/US18/58903 dated Mar. 22, 2019, pp. 1-18.
(Continued)

*Primary Examiner* — Steven J Ganey
(74) *Attorney, Agent, or Firm* — Additon, Pendleton & Witherspoon, P.A.

(57) ABSTRACT

Systems for improving fire safety in agricultural machinery are configured for detecting, at least partially controlling, and/or suppressing adverse fire-related conditions. The adverse fire-related conditions can include sparks, embers, and/or flames in the agricultural machinery.

17 Claims, 26 Drawing Sheets

Related U.S. Application Data continuation of application No. 17/279,233, filed as application No. PCT/US2018/058903 on Nov. 2, 2018, now Pat. No. 11,534,635.

(60) Provisional application No. 62/736,503, filed on Sep. 26, 2018.

(51) Int. Cl.
*A01F 15/08* (2006.01)
*A62C 3/07* (2006.01)
*A01D 46/08* (2006.01)

(58) Field of Classification Search
USPC ............. 169/45, 54, 62, 70; 56/10.2 A, 13.5
See application file for complete search history.

(56) References Cited

U.S. PATENT DOCUMENTS

| | | | |
|---|---|---|---|
| 4,129,185 A | 12/1978 | Hasselbacher | |
| 4,270,612 A | 6/1981 | Larsson | |
| 4,463,543 A | 8/1984 | Hubbard et al. | |
| 4,606,177 A | 8/1986 | Schlueter | |
| 5,311,728 A | 5/1994 | Schlueter | |
| 5,590,718 A * | 1/1997 | Bertossi | A62C 3/07 169/62 |
| 5,613,564 A * | 3/1997 | Rhines | A62C 3/07 169/62 |
| 5,934,379 A * | 8/1999 | Oestlyngen et al. | A62C 3/07 169/46 |
| 6,018,938 A | 2/2000 | Deutsch et al. | |
| 6,159,904 A | 12/2000 | Sakamoto et al. | |
| 6,378,617 B1 | 4/2002 | Brennan | |
| 6,518,574 B1 | 2/2003 | Castleman | |
| 6,550,230 B2 | 4/2003 | Fox | |
| 6,901,732 B2 | 6/2005 | Bares et al. | |
| 6,941,740 B2 | 9/2005 | Fox et al. | |
| 7,026,619 B2 | 4/2006 | Cranford | |
| 7,631,716 B2 | 12/2009 | Fox et al. | |
| 8,925,287 B2 | 1/2015 | Derscheid | |
| 9,313,952 B1 | 4/2016 | Schreiner | |
| 9,763,387 B2 | 9/2017 | Goering | |
| 10,034,433 B2 | 7/2018 | Kraus | |
| 10,097,814 B2 | 10/2018 | Hanses et al. | |
| 11,534,635 B2 | 12/2022 | Duncan et al. | |
| 11,844,969 B2 | 12/2023 | Duncan et al. | |
| 2002/0073677 A1 | 6/2002 | Lucand et al. | |
| 2003/0019200 A1 | 1/2003 | Lemke et al. | |
| 2005/0193704 A1 | 9/2005 | Brantley | |
| 2009/0020296 A1 | 1/2009 | Lee et al. | |
| 2013/0291507 A1 | 11/2013 | Williams | |
| 2014/0157745 A1 | 6/2014 | Rumohr et al. | |
| 2014/0338928 A1 | 11/2014 | Mortensen et al. | |
| 2016/0014960 A1 | 1/2016 | Meagher et al. | |
| 2018/0242527 A1 | 8/2018 | Pilcher et al. | |

FOREIGN PATENT DOCUMENTS

| | | |
|---|---|---|
| CN | 204498789 A | 7/2015 |
| CN | 106730520 A | 5/2017 |
| CN | 206760099 A | 12/2017 |
| WO | 2020068138 A1 | 4/2020 |

OTHER PUBLICATIONS

International Preliminary Report on Patentability in counterpart International Application No. PCT/US18/58903 dated Jun. 25, 2020, pp. 1-29.
John Deere, "Cotton Harvesting" Brochure No. DSAA68418, CP690 Cotton Picker, CS690 Cotton Stripper, www.JohnDeereFinancial. com, USA, downloaded on Apr. 11, 2018, pp. 1-24.
Search Report in counterpart European Application No. 18935474 dated May 18, 2022, pp. 1-7.
First Examination Report in counterpart Indian Patent Application No. 202137009752 dated Dec. 27, 2022, p. 1-5.
Office Action in counterpart Brazilian Application No. 112021005865-6 dated Oct. 4, 2023, pp. 1-9.
Office Action in counterpart European Application No. 18935474.9 dated Feb. 23, 2024, pp. 1-6.

\* cited by examiner

SYSTEMS AND METHODS FOR IMPROVING FIRE SAFETY IN AGRICULTURAL MACHINERY

CROSS-REFERENCE TO RELATED APPLICATIONS

This application is a continuation of U.S. patent application Ser. No. 17/990,821, filed Nov. 21, 2022, which is a continuation of U.S. patent application Ser. No. 17/279,233, filed Mar. 24, 2021, which is the National Stage of International Application No. PCT/US2018/058903, filed Nov. 2, 2018, which claims the benefit of U.S. Provisional Application No. 62/736,503, filed Sep. 26, 2018. Each of the foregoing patent applications is hereby incorporated by reference in its entirety.

FIELD OF THE INVENTION

The present invention generally relates to detection and/or suppression of sparks, embers, and/or flames, and more particularly to such detection and/or suppression in agricultural machinery.

BACKGROUND

Modern farms typically use agricultural machinery in order to increase efficiency. An uncontrolled fire in some types of agricultural machinery may result in a "total loss" of the machinery, loss of crops, and personal injury or death. Often after such a fire, there may not be a readily available standby or spare agricultural machine that is conveniently available to be used as a backup.

As an example, vehicles configured for harvesting cotton (e.g., "cotton harvesters") can be relatively susceptible to fires because raw cotton (e.g., harvested cotton that has not yet been ginned) typically exhibits extreme flammability and is naturally very hydrophobic (e.g. actively repels water).

Therefore, a need exists for systems and methods for improving fire safety in agricultural machinery such as, but not limited to, cotton harvesters.

SUMMARY

Accordingly, an aspect of this disclosure is the provision of systems and methods for improving fire safety in agricultural machinery. As a more specific example, an aspect of this disclosure is the provision of systems and methods for detecting, at least partially controlling, and/or suppressing adverse fire-related conditions (e.g., sparks, embers, and/or flames) in agricultural harvesters such as, but not limited to, cotton harvesters.

In another aspect, a vehicle configured to at least partially process harvested plant material and at least partially control any sparks, embers, and/or flames associated with the plant material can include a chassis, a material processing unit supported by the chassis and configured to at least partially define a flow path for transporting the harvested plant material, a pump supported by the chassis and configured to supply liquid fire suppressant under pressure when the pump is operated, and first and second nozzles configured to discharge the fire suppressant. The first and second nozzles can each be mounted to the material processing unit and connected to the pump for receiving the liquid fire suppressant under pressure from the pump and discharging the liquid fire suppressant into the flow path. The first nozzle can be configured to discharge the fire suppressant in a spray pattern having a central axis extending outwardly from the first nozzle in a first direction. The second nozzle can be configured to discharge the fire suppressant in a spray pattern having a central axis extending outwardly from the second nozzle in a second direction. The first and second directions can be different from one another. A controller can be configured to initiate operation of the pump.

The material processing unit can be an accumulator configured to repeatedly accumulate the harvested plant material and repeatedly discharge the harvested plant material. As another example, the material processing unit can be a module builder. The first and second nozzles can be configured to discharge into the accumulator and/or module builder.

A detector can be configured to detect at least one predetermined fire-related condition in the flow path. Optionally, the controller can be configured to initiate operation of the pump in response to a signal from the detector.

Machinery can be positioned in the flow path and configured to rotate and potentially generate sparks when engaged by any rock and/or metallic debris in the flow path. The machinery is typically positioned upstream from the first and second nozzles in the flow path. The machinery can be part of a cleaner configured to at least partially clean the plant material. As another example, the machinery can be part of a harvesting apparatus configured to harvest the plant material and provide the plant material to the flow path.

In another aspect, a vehicle configured to at least partially process harvested plant material and at least partially control any sparks, embers, and/or flames associated with the plant material can include a chassis; a module builder supported by the chassis, and configured to receive the harvested plant material and form the harvested plant material into a module within a first portion of an interior of the module builder; and a nozzle mounted to the module builder, and configured to receive fire suppressant under pressure and discharge the fire suppressant into a second portion of the interior of the module builder. The first and second portions of the interior can be adjacent to one another. The nozzle can be configured to discharge the fire suppressant in a pattern consisting essentially of fog and/or mist.

The module builder can include a plurality of belts configured to extend at least partially around the module. At least a portion of a belt of the plurality of belts can be positioned between the first and second portions of the interior.

In another aspect, a vehicle configured to at least partially process harvested plant material and at least partially control any sparks, embers, and/or flames associated with the plant material can include a chassis; an accumulator supported by the chassis, and configured to repeatedly accumulate the harvested plant material and repeatedly discharge the harvested plant material; a first nozzle mounted to a side wall of the accumulator, and configured to receive fire suppressant under pressure and discharge the fire suppressant into an interior of the accumulator; and a second nozzle mounted to a top wall of the accumulator, and configured to receive fire suppressant under pressure and discharge the fire suppressant into the interior of the accumulator.

The second nozzle can be configured to discharge the fire suppressant in a hollow spray pattern. The first nozzle can be configured to discharge the fire suppressant in a hollow area of the hollow spray pattern.

In another aspect, a vehicle configured to at least partially process harvested plant material and at least partially control any sparks, embers, and/or flames associated with the plant material can include a chassis; an accumulator supported by the chassis, and configured to repeatedly accumulate the harvested plant material and repeatedly discharge the harvested plant material; and a nozzle assembly comprising a body mounted to an outer surface of a sidewall of the accumulator, and further comprising a nozzle mounted in a recess of the body and configured to receive fire suppressant under pressure through the body. The recess of the body can be open to a hole in the side wall for at least partially facilitating the nozzle being configured to discharge the fire suppressant into an interior of the accumulator.

In another aspect, a vehicle configured to at least partially process harvested plant material and at least partially control any sparks, embers, and/or flames associated with the plant material can include a chassis; an accumulator supported by the chassis, and configured to repeatedly accumulate the harvested plant material and repeatedly discharge the harvested plant material; and a nozzle assembly comprising a body mounted to an inner surface of a sidewall of the accumulator, and further comprising a nozzle mounted to the body and configured to receive fire suppressant under pressure through the body. The nozzle can be configured to discharge the fire suppressant, in a spray pattern, into an interior of the accumulator. The nozzle can be mounted to an inclined portion of the body so that the spray pattern has an inclined central axis.

The nozzle and body can be cooperatively configured so that the inclined central axis of the spray pattern extends toward an upright corner in the interior of the accumulator. As another example, the nozzle and body can be cooperatively configured so that the inclined central axis of the spray pattern extends toward a hollow area of a hollow spray pattern of another nozzle of the vehicle.

In another aspect, a vehicle configured to at least partially process harvested plant material can include a chassis; a plurality of material processing units supported by the chassis, configured to cooperatively move the harvested plant material along the flow path, and configured to be in series along the flow path, wherein the plurality of material processing units comprises a first material processing unit comprising machinery positioned in the flow path and configured to rotate and potentially generate sparks when engaged by any rock and/or metallic debris in the flow path, and a downstream material processing unit comprising a conduit positioned downstream from the first material processing unit; a fan supported by the chassis, wherein the fan is in fluid communication with the conduit and configured to at least partially cause the harvested plant material to be transported along at least the portion of the flow path within the conduit; and a detector configured to detect at least one predetermined fire-related condition within the conduit, and provide a signal comprising data indicative of any detection of the at least one predetermined fire-related condition within the conduit.

In another aspect, a vehicle configured to at least partially process harvested plant material can include a chassis; a plurality of material processing units supported by the chassis, configured to cooperatively move the harvested plant material along the flow path, and configured to be in series along the flow path, wherein the plurality of material processing units comprises an accumulator configured to repeatedly accumulate the harvested plant material and repeatedly discharge the harvested plant material; a detector configured to detect at least one predetermined fire-related condition within the accumulator, and provide a signal comprising data indicative of any detection of the at least one predetermined fire-related condition within the accumulator.

Another aspect of this disclosure is the provision of a method for at least partially controlling any fire-related condition in a vehicle configured to at least partially process harvested plant material. The method can include operating a plurality of material processing units supported by a chassis of the vehicle, so that the plurality of material processing units cooperatively move the harvested plant material along the flow path, wherein the plurality of material processing units are configured to be in series along the flow path, the plurality of material processing units includes upstream and downstream material processing units each including a respective chamber through which the flow path extends, and the upstream material processing unit is positioned upstream from the downstream material processing unit along the flow path; discharging fire suppressant into the chamber of the upstream material processing unit; discharging fire suppressant into the chamber of the downstream material processing unit; transporting harvested plant material from the upstream material processing unit to the downstream material processing unit along a portion of the flow path; ceasing the discharging of the fire suppressant into the chamber of the upstream material processing unit; and ceasing the discharging of the fire suppressant into the chamber of the downstream material processing unit after the ceasing of the discharging of the fire suppressant into the chamber of the upstream material processing unit.

The foregoing summary provides a few brief examples and is not exhaustive, and the present invention is not limited to the foregoing examples. The foregoing examples, as well as other examples, are further explained in the following detailed description with reference to accompanying drawings.

BRIEF DESCRIPTION OF THE DRAWINGS

The drawings are provided as examples, and they are typically schematic and may not be drawn to scale. The present invention may be embodied in many different forms and should not be construed as limited to the examples depicted in the drawings.

FIG. 13 is an upwardly directed pictorial view from within the accumulator of the harvester of FIG. 1, wherein FIG. 13 depicts an upper-right nozzle assembly, and wherein a view corresponding to FIG. 13, except for being taken from the opposite side, can be a mirror image of FIG. 13.

DETAILED DESCRIPTION

Examples of embodiments are disclosed in the following. The present invention may, however, be embodied in many different forms and should not be construed as limited to the embodiments set forth herein. For example, features disclosed as part of one embodiment or example can be used in the context of another embodiment or example to yield a further embodiment or example. As another example of the breadth of this disclosure, it is within the scope of this disclosure for one or more of the terms "substantially," "about," "approximately," and/or the like, to qualify each of the adjectives and adverbs of the Detailed Description section of disclosure, as discussed in greater detail below.

An aspect of this disclosure can be provision of systems and methods for detecting, at least partially controlling, and/or suppressing adverse fire-related conditions (e.g., sparks, embers, and/or flames) in agricultural machinery, for example vehicles configured to process harvested plant material (e.g., harvesters, combine harvesters, and/or cotton harvesters). In a first embodiment of this disclosure, both a system for detecting the adverse conditions and a system for at least partially controlling and/or suppressing the adverse conditions are incorporated into an agricultural machine in the form of a vehicle configured for harvesting (e.g., "a harvester"), wherein the harvester was a conventional JOHN DEERE CS690 Cotton Stripper prior to being retrofitted with the detection and suppression systems. Notwithstanding, a wide variety of differently configured types of agricultural machinery (e.g., harvesters and/or vehicles configured to process harvested plant material) are within the scope of this disclosure.

The first embodiment suppression system is configured and operated so that the at least partially controlling and/or suppressing includes discharging one or more liquid fire suppressants (e.g., liquid fire suppression agents) in a variety of predetermined and coordinated ways in an effort to at least partially control and/or suppress sparks, embers, and/or flames at predetermined locations in, on, and/or around the harvester. The fire suppressant of the first embodiment is typically water-based. Alternatively, it is believed that other types of fire suppressants may be used.

In one of several different examples of operating the suppression system that are discussed in greater detail below, the operation of the suppression system can be manually initiated and/or automatically initiated in response to the detection system detecting one or more fire-related conditions associated with the harvester. Alternatively, the automated detection system, or portions thereof, may be omitted. More generally, whereas this disclosure describes various combinations of features, subcombinations of those features are also within the scope of this disclosure.

Figure 1:
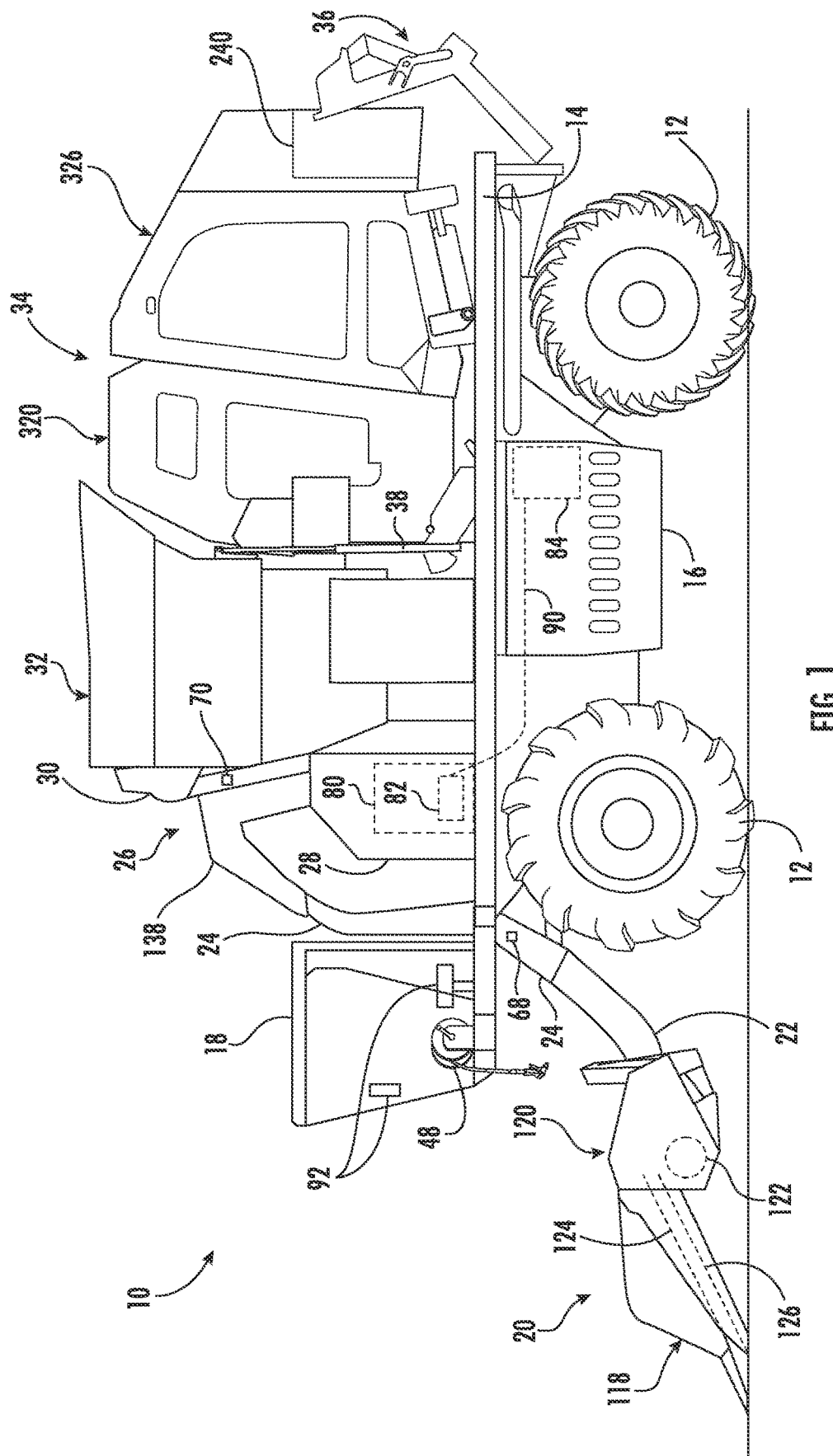
FIG. 1 is a right elevation view of an agricultural harvester in the form of a cotton stripper, wherein some features that are normally hidden from view are depicted by dashed lines, in accordance with a first embodiment of this disclosure.

For ease of understanding and providing a frame of reference believed to be used substantially consistently throughout the Detailed Description section of this disclosure, it is noted that FIG. 1 is a right elevation view of a harvester 10 of the first embodiment, and it is further noted that a front elevation view of the harvester 10 would be seen by an observer standing in front of the harvester and looking toward the front of the harvester. Based upon the frame of reference provided in the sentence immediately above, it is believed that the conventions of "multiview projection" are used substantially consistently throughout the Detailed Description section of this disclosure.

The harvester 10 depicted in FIG. 1 is an example of a vehicle configured to at least partially process harvested plant material, wherein other examples of such vehicles are within the scope of this disclosure. More specifically, FIG. 1 depicts an example of a vehicle in the form of a cotton-stripper harvester 10 that can be used to harvest plant material. The harvested plant material can include ripe cotton bolls and associated debris (e.g., green cotton bolls, and stems and leaves of cotton plants). The ripe cotton bolls include raw cotton (e.g., cotton fiber with seeds) that typically constitutes a majority of the final product (e.g., bales 336 (FIG. 2)) output by the harvester 10, as will be discussed in greater detail below.

In the example of FIG. 1, a chassis of the harvester 10 includes a frame supported by front and rear wheels 12. Typically at least a pair of the wheels 12 is steerable. The harvester frame can include a platform 14 (e.g., deck) that extends horizontally and can be configured to function as a main supporting structure for components of the harvester 10. U.S. Pat. No. 7,631,716 is believed to disclose an example of a suitable chassis (e.g., wheels 12, platform 14, and/or other suitable frame components).

With continued reference to FIG. 1, an engine compartment 16 can be supported below the frame platform 14. The engine compartment 16 can contain a gasoline or diesel engine configured to drive one or more hydraulic pumps. The hydraulic pumps can be part of a conventional hydraulic drive system for driving various hydraulic actuators (e.g., hydraulic motors and hydraulic cylinders) that are configured to drive respective components of the harvester 10. For example, any suitable numbers of the wheels 12 can be driven by hydraulic motors. A cab 18 with glass windows can be supported on top of a forward portion of the frame platform 14 for accommodating at least one user that can operate controls of the harvester 10, for example for controlling the speed and direction of travel of the harvester 10.

The harvester 10 can be described as having several material processing units that are supported by the chassis (e.g., wheels 12 and platform 14) and are configurable to cooperatively define at least one material flow path for the harvested plant material. In the first embodiment, when the harvester 10 is in a harvesting configuration, as discussed in greater detail below, the material processing units are arranged in series along the harvester's material flow path, so that at least a significant percentage of the harvested cotton passes through the material processing units in a serial manner.

In the following, a high-level description of the material processing units of the harvester 10 is followed by high-level descriptions of the suppression and detection systems of the harvester. Thereafter, the detection and suppression systems, and some of the features of the harvester 10, are discussed in greater detail.

A high-level overview of the material processing units of the harvester 10 can be generally understood with reference to FIG. 1. The material processing units can include a conventional harvesting apparatus 20, conventional separator 22 (e.g., separation chamber), upstream duct 24, conventional intermediate duct 26, conventional field cleaner 28, downstream duct 30, accumulator 32, module builder 34 (e.g., baler), and conventional unloader 36 that are configured to be arranged in series along, and at least partially define, the harvester's material flow path. In the first embodiment, the upstream duct 24, downstream duct 30, accumulator 32, and module builder 34 were conventional prior to being retrofitted with the detection and suppression systems.

Figure 2:
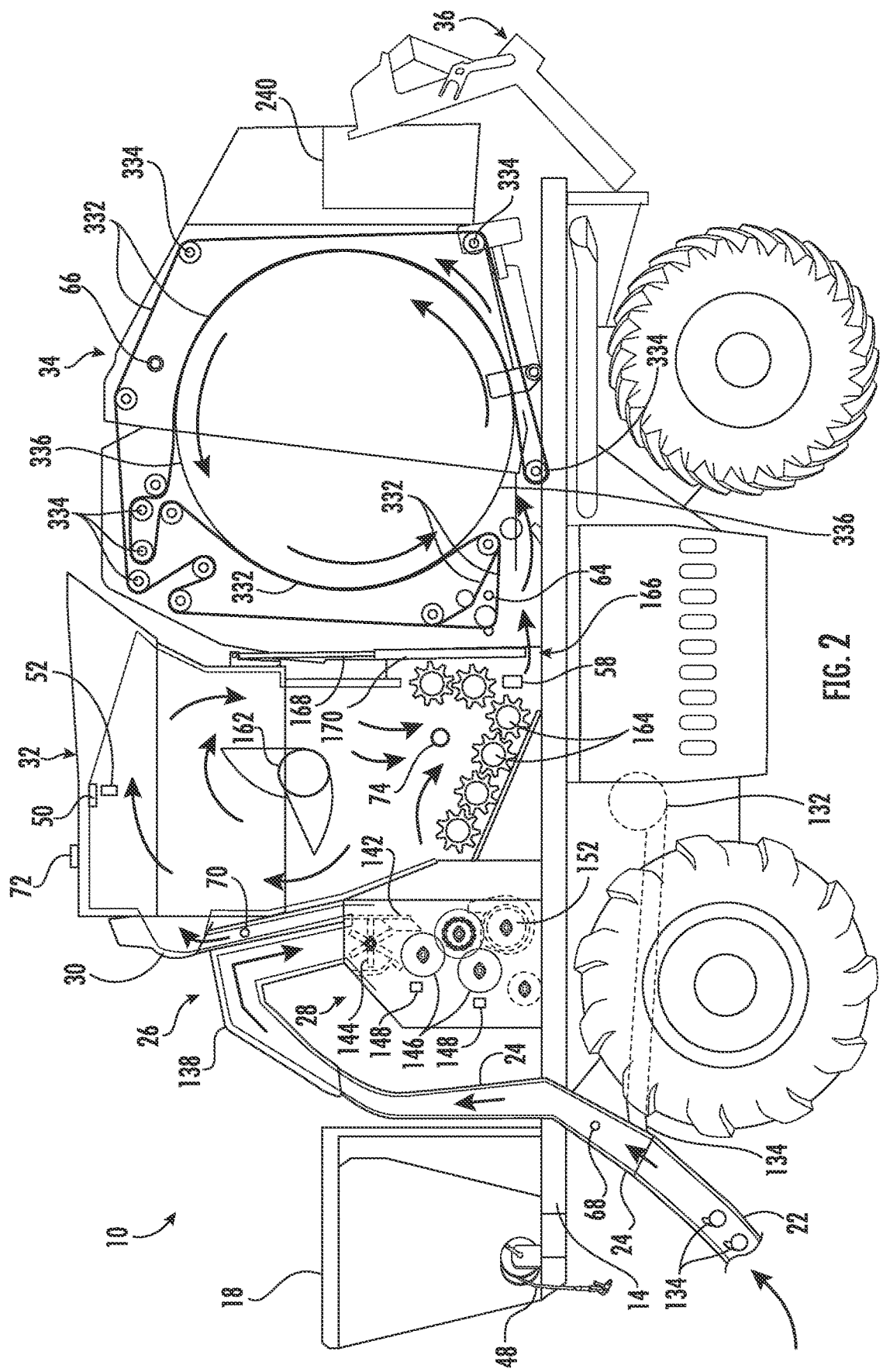
FIG. 2 is a partially cut-away, right elevation view of a portion of the harvester of FIG. 1, wherein portions of the right side of the harvester have been removed to show interior features of the harvester, wherein a corresponding partially cut-away, left elevation view of the same portions of the harvester can substantially be a mirror image of FIG. 2, and wherein some features that are normally hidden from view are depicted by dashed lines.

In the partially cut-away view depicted in FIG. 2, unnumbered arrows schematically depict some of the harvester's material flow path extending at least partially through some of the material processing units 20, 22, 24, 26, 28, 30, 32, 34. One or more of the material processing units can be arranged differently, one or more of the material processing units can be omitted, different types of material processing units can be included, and there can be more than one of each type material processing unit (e.g., arranged in parallel).

In the example of FIG. 1, the harvesting apparatus 20 defines an upstream end of the harvester's material flow path, and the harvesting apparatus is configured to gather plant material by "strip harvesting" cotton plants. The first embodiment harvesting apparatus 20 is configured so that the strip harvesting performed typically includes gathering at least ripe cotton bolls, green cotton bolls, and stems and leaves of the cotton plants. The green cotton bolls, stems, and leaves may be referred to as debris, and additional debris (e.g., any rocks, dirt, scraps of metal, and/or other debris in the field being harvested) can be drawn into the harvester's material flow path by the harvesting apparatus 20, as will be discussed in greater detail below. As will also be discussed in greater detail below, the harvesting apparatus 20 can be configured differently for gathering plant material in different ways.

The harvester's material flow path can extend from the harvesting apparatus 20 to the separator 22, so that the separator receives the ripe cotton bolls and any associated debris. The separator 22 and associated features are configured in a manner that seeks to cause the ripe cotton bolls to remain in the harvester's material flow path, and seeks to cause relatively heavy and/or dense debris (e.g., as compared to the ripe cotton bolls) to fall downwardly out of the harvester's material flow path, as will be discussed in greater detail below.

The harvester's material flow path can extend from the separator 22 to the upstream duct 24, and from the upstream duct to the intermediate duct 26, so that the upstream and intermediate ducts receive the ripe cotton bolls and any accompanying debris. The intermediate duct 26 is configured in a manner that seeks to cause the ripe cotton bolls to remain in the harvester's material flow path, and seeks to cause relatively small debris (e.g., as compared to the ripe cotton bolls) to flow upwardly out of the harvester's material flow path, as will be discussed in greater detail below.

The harvester's material flow path can extend from the intermediate duct 26 to the cleaner 28 (e.g., field cleaner), so that the cleaner receives the ripe cotton bolls and any accompanying debris. The cleaner 28 is configured to at least partially separate the raw cotton fiber with seeds of the ripe cotton bolls from accompanying debris. The separated debris typically includes at least some of the remnant parts of the ripe cotton bolls that are not cotton fibers, as will be discussed in greater detail below.

The harvester's material flow path can extend from the cleaner 28 to an interior space of a chamber of the accumulator 32 (e.g., accumulator chamber). As will be discussed in greater detail below, occasionally the rotating machinery in the harvesting apparatus 20 and/or field cleaner 28 may engage any rocks, scraps of metal, and/or any other types of debris that is contained in the harvester's material flow path. Any such engagement may create sparks such that sparks or embers may be entrained in the harvester's material flow path. The sparks and embers may interact with harvested plant material in the accumulator chamber, and cause a fire, as discussed in greater detail below. Fires originating in accumulator chambers have been known to spread and result in the total destruction of conventional harvesters. As additional examples, it is believed that sparks, embers, and/or fires in harvesters may result from a variety of other causes, including equipment malfunction, and perhaps also lightening strikes, static electricity, or the like.

The harvester's material flow path can extend from the accumulator 32 to an interior space of a chamber of the module builder 34 (e.g., "baler chamber"). That is, the module builder 34 (e.g., baler) receives the cotton fiber with seeds and associated remnant debris (collectively "raw cotton"). The accumulator 32 is configured to serially accumulate batches of the raw cotton, and serially provide the batches to the module builder 34, in a repetitive manner. The module builder 34 is configured to form each batch of raw cotton into a module (e.g., a rectangular, cylindrical, or other suitably configured bale 336 (FIG. 2)), and serially discharge the formed modules to the unloader 36 in a repetitive manner, as will be discussed in greater detail below.

Figure 3:
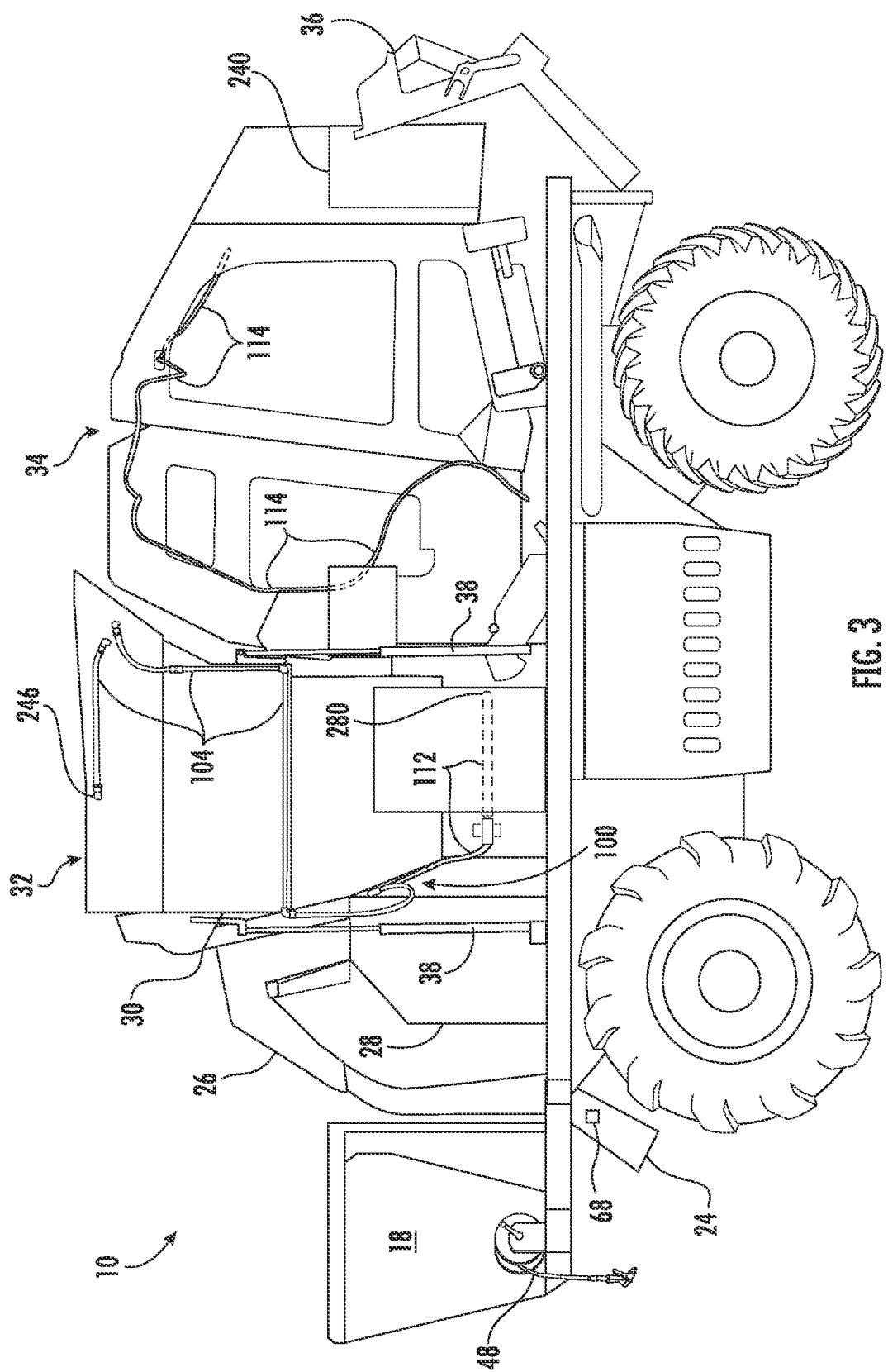
FIG. 3 is another right elevation view of a portion of the harvester of FIG. 1, wherein some features that are normally hidden from view are depicted by dashed lines.

The relative configurations of the material processing units 20, 22, 24, 26, 28, 30, 32, 34, 36 can differ from that shown in FIGS. 1 and 2. For example as shown in FIG. 3, typically at least the harvesting apparatus 20 (FIG. 1) and separator 22 may be removed from the remainder of the harvester 10. Also, FIGS. 1-3 depict the harvester 10 in its relatively tall or "harvesting configuration," wherein the harvester is configured to gather plant material, at least partially clean the plant material, and discharge modules (e.g., bales 336) of the at least partially clean plant material (e.g., "raw cotton"). In contrast and as partially shown in FIG. 4, the harvester 10 can have a relatively low "public roadway configuration" or "transport configuration." A method of transforming to the transport configuration can include lowering an upper portion of the accumulator 32.

Whereas FIG. 3 depicts a pair of hydraulic actuators 38 for use in raising and lowering the upper portion of the accumulator 32, the forward one of those actuators is omitted from FIG. 1 in order to expose a feature (e.g., a spark or ember detector 70) that may otherwise be at least partially hidden from view. As schematically depicted in FIG. 4 by a double ended arrow 39, there can be relative movement between the downstream duct 30 and an upper portion of the accumulator 32 for connecting and disconnecting therebetween.

Regarding a high-level overview of the first embodiment suppression system, it is configured to at least partially control and/or suppress adverse fire-related conditions (e.g., sparks, embers, and/or flames) in the accumulator chamber (e.g., the chamber of the accumulator 32), baler chamber (e.g., the chamber of the module builder 34), and/or other suitable locations. Referring to FIG. 4, the suppression system can include one or more tanks 40 for containing a liquid fire suppressant (e.g., water or a water-based solution) for use in at least partially controlling and/or suppressing sparks, embers, and/or flames (e.g., adverse fire-related conditions) at predetermined locations in, on, and around the harvester 10. In the first embodiment, the tanks 40 can be supplemented with at least one other tank (not shown) that is a conventional component of the harvester 10. More generally, the suppression system can include one or more tanks 40 for containing the liquid fire suppressant and/or other tank(s) (not shown). At least one of the other tanks can be a conventional component of the harvester 10 and be configured for containing water or a water-based solution, for use in at least partially controlling and/or suppressing sparks, embers, and/or flames.

Figure 4:
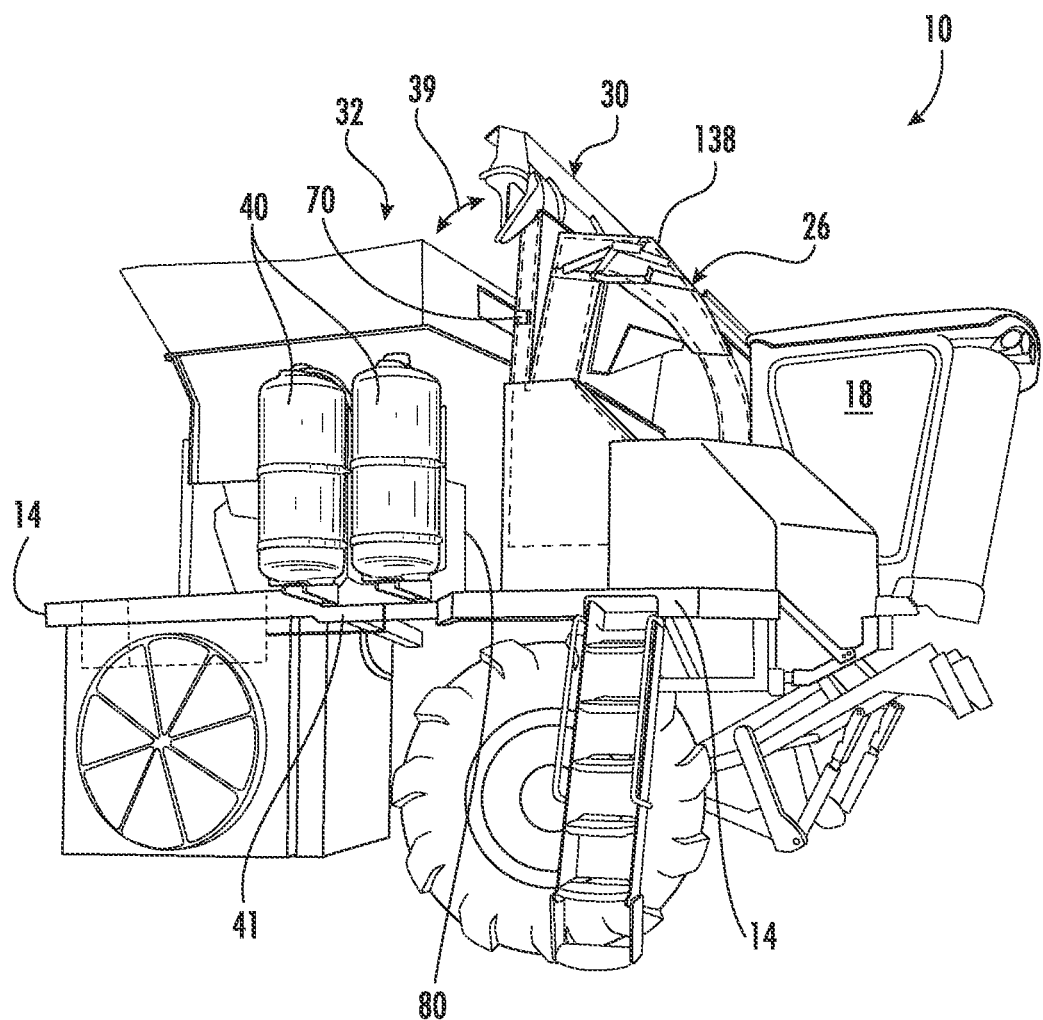
FIG. 4 is a left, front pictorial view of a portion of the front end of the harvester of FIG. 1.

In the example of FIG. 4, a support frame 41 mounted to the left side of the platform 14 is configured to both securely hold the tanks 40 and allow the tanks to be removed from the harvester 10 during the "transport configuration," or the like. In FIG. 4, the support frame 41 is depicted as including cantilevered supports respectively beneath, and supporting, the tanks 40, and brackets including straps configured to hold the tanks in place on the cantilevered supports. The cantilevered supports and brackets are typically mounted to the harvester 10 by removable fasteners, for example bolts and/or any other suitable fasteners, so that at least a portion of the support frame 41 (e.g., the cantilevered supports and associated brackets) can be conveniently removed from the harvester 10 during the "transport configuration," or the like.

Figure 5:
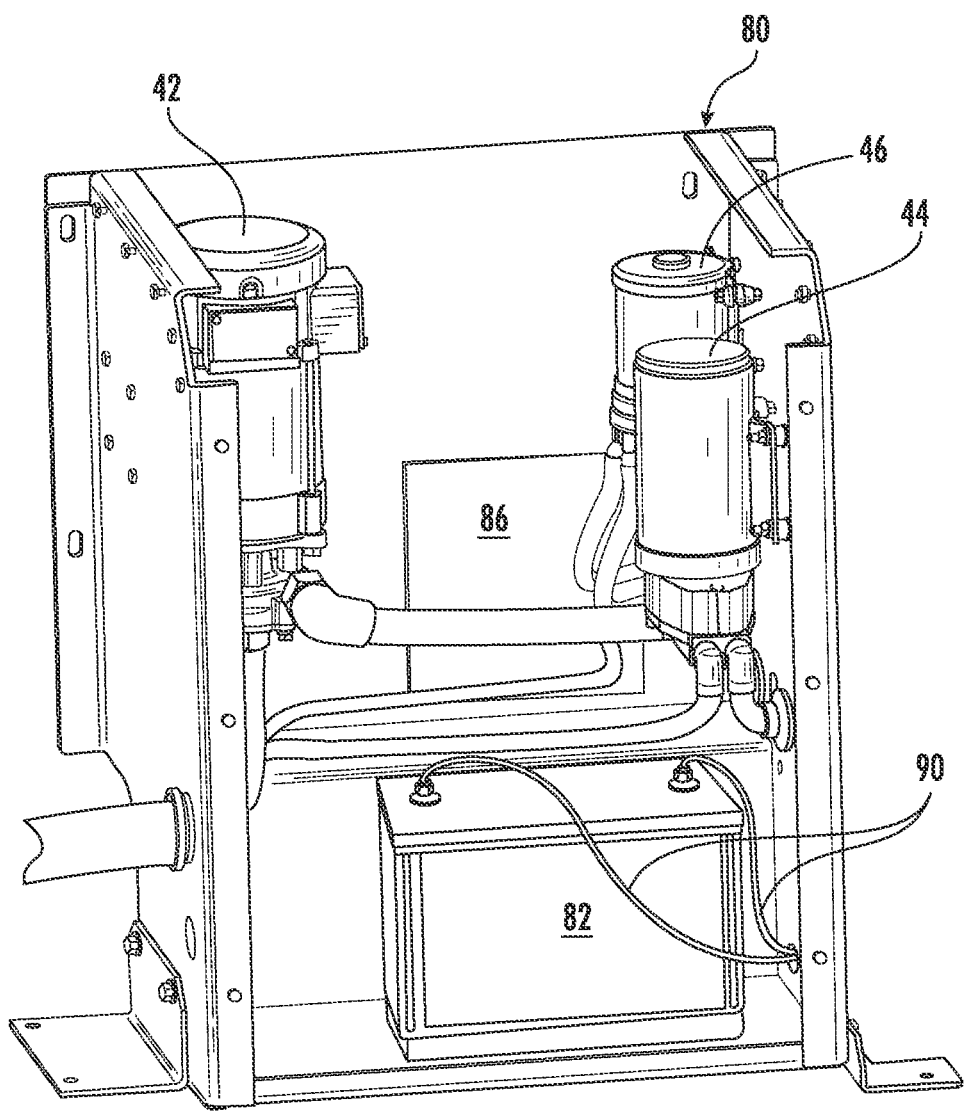
FIG. 5 depicts a substantially isolated view of a control cabinet of the harvester of FIG. 1, wherein the normally-closed control cabinet is in an open configuration for showing some of its contents, in accordance with the first embodiment.

Referring to FIG. 5, electric motor-operated suppression pumps 42, 44, 46 can receive a liquid fire suppressing agent (e.g., "fire suppressant") from the tanks 40 and/or other sources by way of one or more pipe networks that can include filter(s) and/or strainer fitting(s) (not shown). Throughout this Detailed Description section of this disclosure, "pipe" is intended to broadly embrace suitable conduits configured for transporting the liquid fire suppressant under pressure (e.g., placing respective features in fluid communication with one another). The fire suppressant of the first embodiment is water, or water-based. One or more additives can be added to the water, for example suitable fire retardants. Whereas the fire suppressant of the first embodiment is in liquid form, it is believed that one or more alternative embodiments may optionally use a gaseous fire suppressant and/or those fire suppression products commonly referred to as wet or dry chemical agents. However, using water or a water-based fire suppressant can be advantageous due, for example, to water being relatively readily available.

The electric motor-operated suppression pumps 42, 44, 46 can be operated to pressurize the fire suppressant, so that the fire suppressant is supplied by way of respective communication paths to a retractable/extendable hose 48 (FIGS. 1-3 and 7) and numerous spray nozzles of the suppression system. In the first embodiment, the suppression system includes sixteen spray nozzles of six different types, although different numbers and types are within the scope of this disclosure. The spray nozzles can be configured to discharge the fire suppressant into predetermined portions of the harvester's material flow path, for at least partially controlling and/or suppressing any sparks, embers, and/or flames (e.g., adverse fire-related conditions) in the predetermined portions of the harvester's material flow path.

Referring to FIGS. 2, 10, 11, and 13, one or more spray nozzles 50 can be mounted in respective upper areas of the accumulator 32, and they may be referred to as central-upper accumulator-suppression nozzles. The central-upper accumulator-suppression nozzles 50 can be configured to spray the fire suppressant at least downwardly into the interior space of the accumulator chamber (e.g., the chamber of the accumulator 32), as will be discussed in greater detail below.

Figure 13:
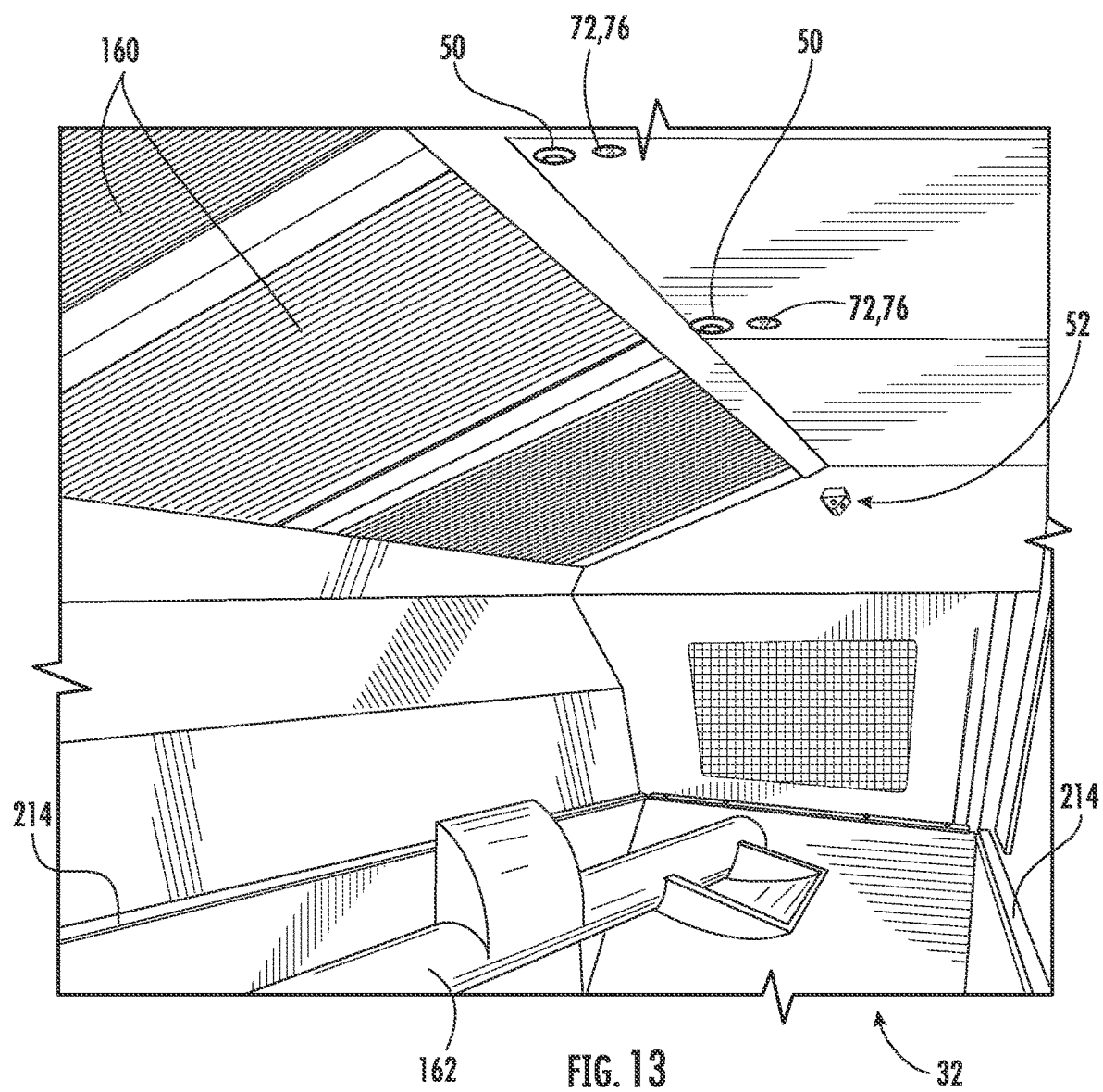
Figure 14:
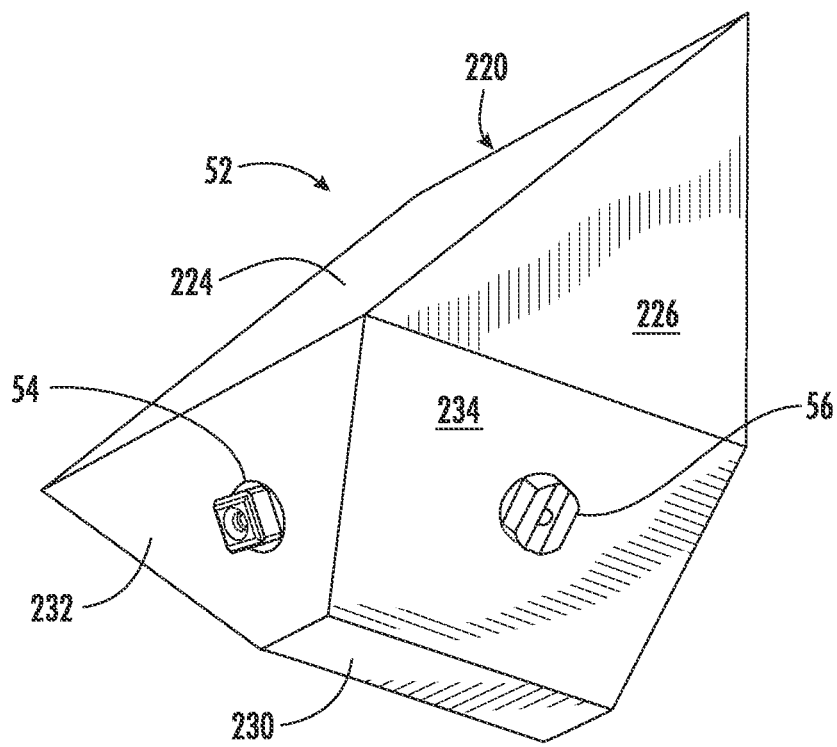
FIG. 14 is an isolated pictorial view of the upper-right nozzle assembly of FIG. 13.
Figures 15, 16:
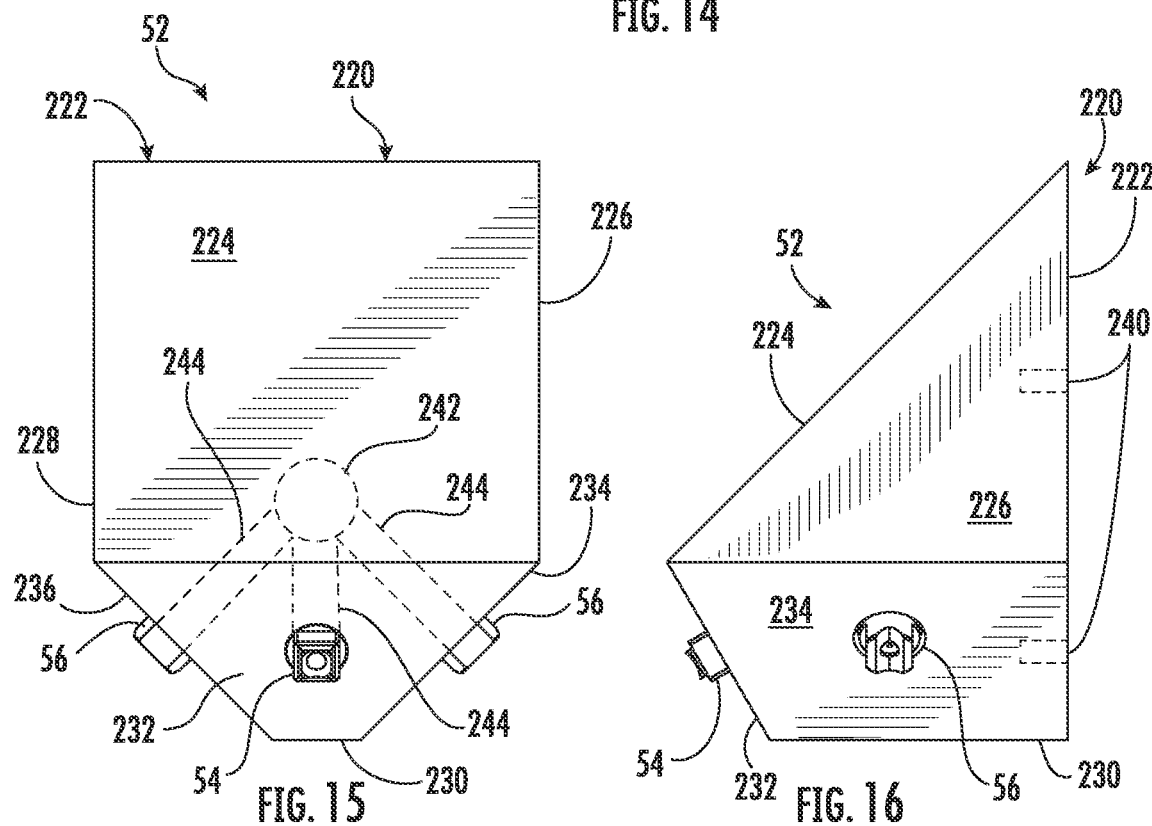
FIG. 15 is a left elevation view of the upper-right nozzle assembly of FIG. 14, wherein dashed lines schematically depict otherwise hidden bored holes and fluid-conveying passages.
FIG. 16 is a front elevation view of the nozzle assembly of FIG. 14, wherein a rear elevation view of the nozzle assembly can be a mirror image of FIG. 16, and wherein dashed lines schematically depict otherwise hidden threaded holes.

Referring to FIGS. 2 and 10-13, one or more upper nozzles, or upper nozzle assemblies 52, can be mounted in opposite upper areas of the accumulator 32. Referring to FIGS. 14-16, each of the upper nozzle assemblies 52 can include a middle spray nozzle 54 positioned between forward and rearward spray nozzles 56. Each of the spray nozzles 54, 56 may be referred to as an accumulator-suppression nozzle, and each can be configured to spray the fire suppressant at least partially downwardly into the interior space of the accumulator chamber, as will be discussed in greater detail below.

Figure 18:
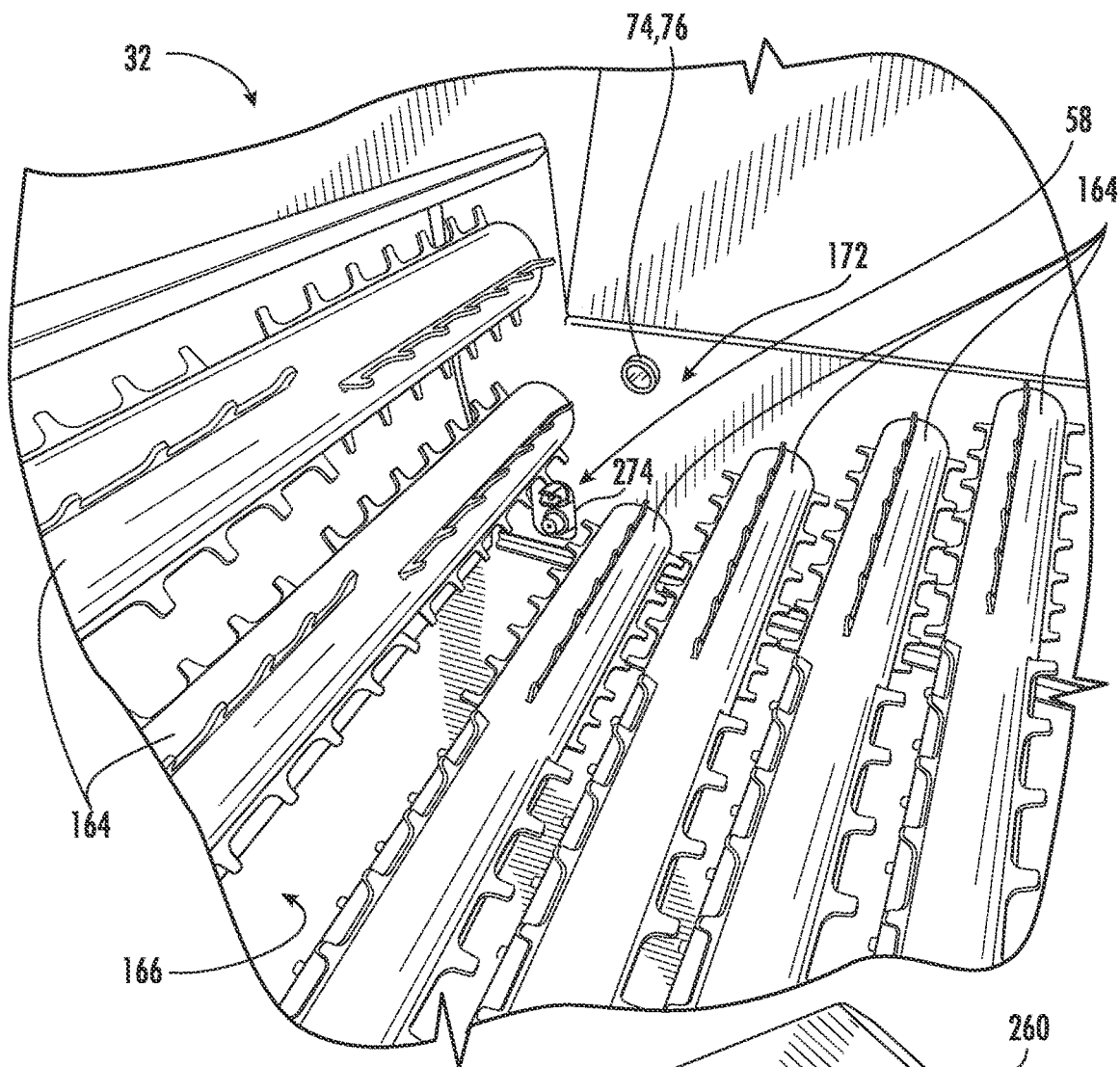
FIG. 18 is a downwardly directed pictorial view from within the accumulator of the harvester of FIG. 1, wherein a view corresponding to FIG. 18, except for being taken from the opposite side, can be a mirror image of FIG. 18.
Figure 19:
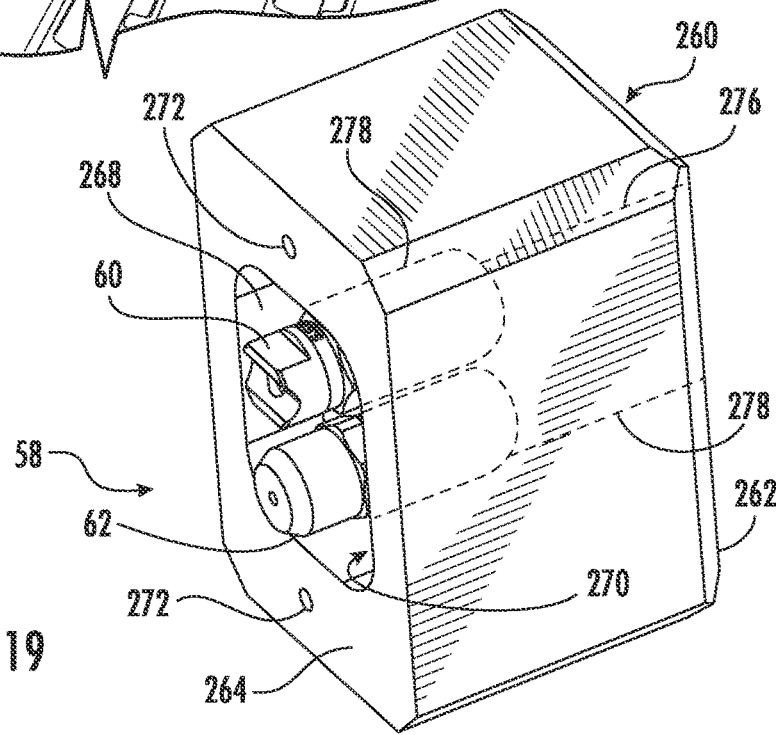
FIG. 19 is an isolated pictorial view of a lower nozzle assembly of the accumulator of the harvester of FIG. 1.

Referring to FIGS. 2, 18 and 19, one or more lateral lower nozzles, or lower nozzle assemblies 58, can be mounted in opposite lower areas of the accumulator 32, and they may be referred to as lateral lower accumulator-suppression nozzles or lower nozzle assemblies. Referring to FIG. 19, each of the lower nozzle assemblies 58 can include an upper spray nozzle 60 and a lower spray nozzle 62. Each of the spray nozzles 60, 62 may be referred to as an accumulator-suppression nozzle, and each can be configured to spray the fire suppressant at least sideways into the interior space of the accumulator chamber, as will be discussed in greater detail below.

The first embodiment suppression pump 42 (FIG. 5) is part of a relatively high-flow, medium-pressure, fire-suppression system for the accumulator 32 (e.g., "accumulator-suppression subsystem"). The first embodiment accumulator-suppression subsystem includes (e.g., the accumulator-suppression pump 42 supplies fire suppressant under pressure to) the accumulator-suppression nozzles 50, 54, 56, 60, 62.

Figure 6:
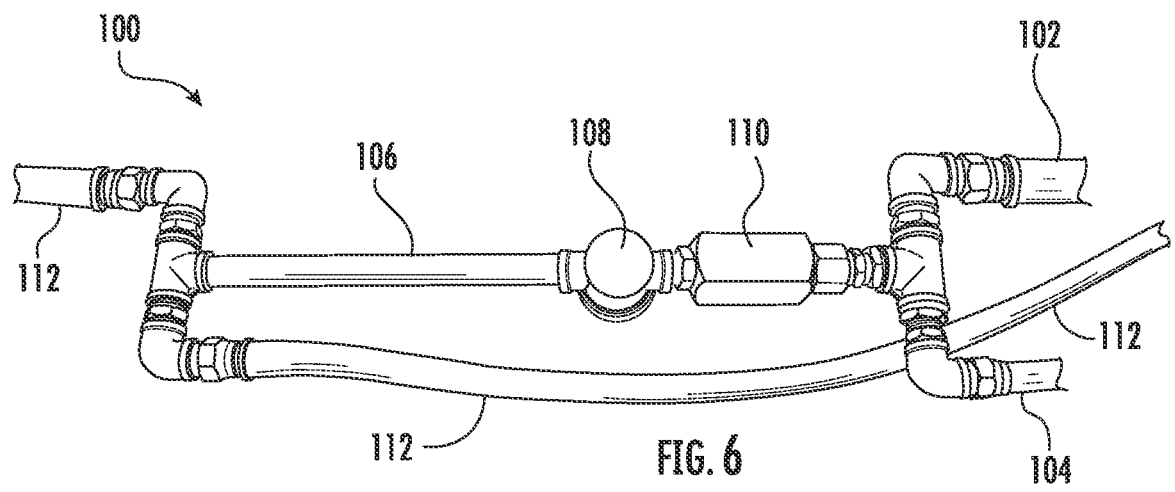
FIG. 6 is an isolated view of a portion of a piping system of the harvester of FIG. 1, wherein the portion depicted in FIG. 6 is located outside of the control cabinet and connected to a suppression pump in the control cabinet for supplying a liquid fire suppressant to respective spray nozzles in the harvester, in accordance with the first embodiment.

FIG. 6 depicts a portion of a liquid distribution (e.g., pipe) network 100 of the first embodiment accumulator-suppression subsystem. FIG. 3 depicts an example wherein the pipe network 100 is at least partially positioned proximate, adjacent, or in a space between, the cleaner 28 and a middle section of the accumulator chamber (e.g., the chamber of the accumulator 32), under the accumulator chamber, and/or in any other suitable location.

As best understood with reference to FIGS. 5 and 6, the accumulator-suppression piping 100 of the first embodiment includes at least one supply pipe 102 having an upstream end connected to the outlet of the accumulator-suppression pump 42, and a downstream end connected by a tee fitting to both an upper piping system 104 and at least one intermediate pipe 106. The at least one upper piping system 104 can supply fire suppressant under pressure from the accumulator-suppression pump 42 to the upper accumulator-suppression nozzles 50, 54, 56. The intermediate pipe 106 can include or have connected thereto at least one filter or strainer fitting 108 and/or a valve 110 for restricting flow through the intermediate pipe when the accumulator-suppression pump 42 is not operating.

A downstream end of the intermediate pipe 106 can be connected by a tee fitting to one or more lower piping systems 112. The lower piping system 112 can supply fire suppressant under pressure from the accumulator-suppression pump 42 respectively to the lower nozzle assemblies 58 (e.g., the lower accumulator-suppression nozzles 60, 62). In FIG. 3, a portion of a leg of the lower piping system 112 is hidden from view behind a conventional panel of the harvester 10. Accordingly, the hidden portion of the leg of the lower piping system 112 is schematically depicted by dashed lines in FIG. 3.

Figure 20:
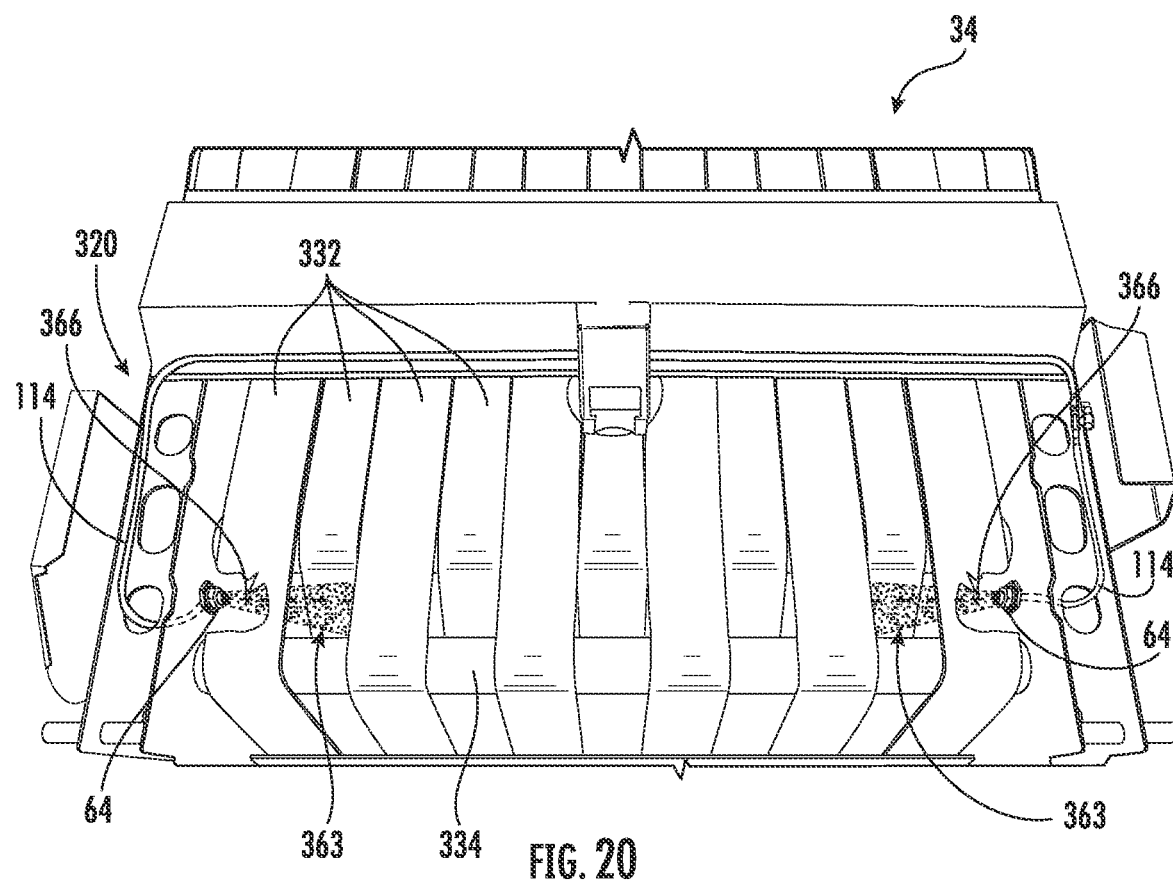
FIG. 20 is an isolated, front pictorial view of a portion of a module builder (e.g., baler) of the harvester of FIG. 1, wherein stippling schematically depicts portions of spray patterns.
Figure 21:
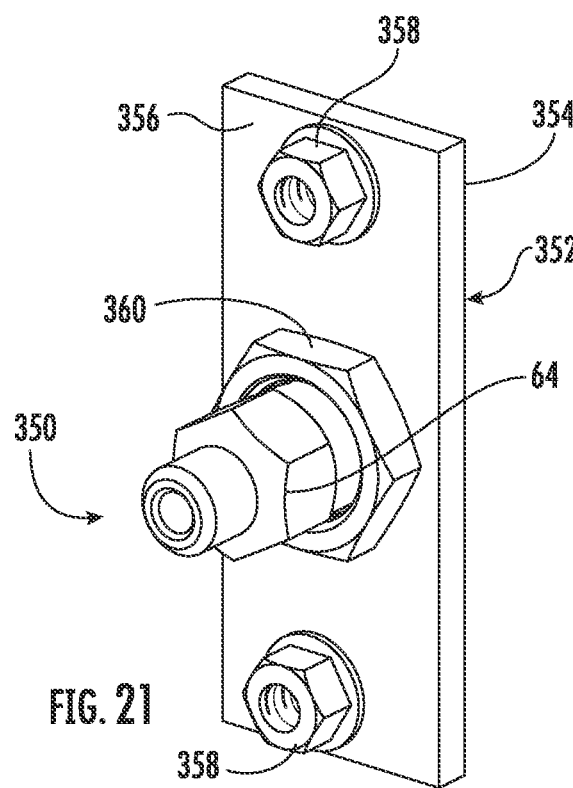
FIG. 21 is an isolated pictorial view of a nozzle assembly that is representative of nozzle assemblies partially shown in FIG. 20, in accordance with the first embodiment.
Figure 23:
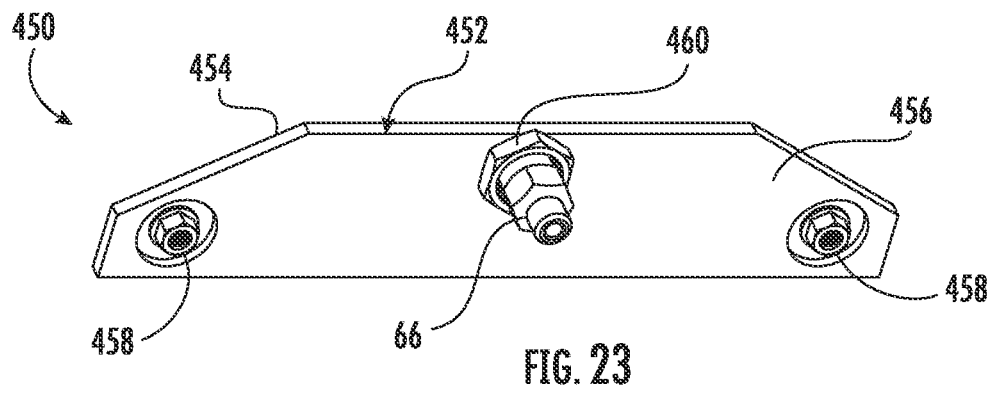
FIG. 23 is an isolated pictorial view of a nozzle assembly that is partially shown in FIG. 22, in accordance with the first embodiment.

Referring to FIGS. 2, 20 and 21, one or more lower spray nozzles 64 can be mounted in opposite lower areas of the module builder 34 (e.g., baler), and they may be referred to as lower baler-suppression nozzles. Referring to FIGS. 2 and 23, one or more upper spray nozzles 66 can be mounted in opposite upper areas of the module builder 34, and they may be referred to as upper baler-suppression nozzles. The baler-suppression nozzles 64, 66 can be respectively mounted at opposite upper and lower portions of opposite sides of the module builder 34. The baler-suppression nozzles 64, 66 can be configured to spray the fire suppressant at least sideways into the interior space of the module builder 34, as will be discussed in greater detail below.

The first embodiment suppression pump 44 (FIG. 5) is part of a relatively very high-pressure, low-flow, fire-suppression system for the module builder (e.g., "baler-suppression subsystem"). The first embodiment baler-suppression subsystem includes (e.g., the module-builder or baler-suppression pump 44 supplies fire suppressant under pressure to) the baler-suppression nozzles 64. Referring to FIG. 3, at least one pipe or piping system 114 of the baler-suppression subsystem can supply fire suppressant under pressure from the baler-suppression pump 44 to the baler-suppression nozzles 64, 66. Locations of the piping of this disclosure can be varied depending upon a variety of factors, for example the type and configuration of the agricultural vehicle, harvester, or the like. For example, one or more of the piping systems 104, 114, or portions thereof, depicted in FIG. 3 as being on the right side of the harvester 10 can alternatively be positioned on the left side of the harvester.

The first embodiment spot-suppression pump 46 is part of a part of relatively medium-flow fire-suppression system for use in at least partially controlling and/or suppressing spot fires on and/or around the harvester (e.g., "spot-suppression subsystem"). The first embodiment spot-suppression subsystem includes (e.g., the spot-suppression pump 46 supplies fire suppressant under pressure to) the hose 48 (FIGS. 1-3 and 7) on a reel. As depicted in FIGS. 1-3 and 7, a hose-end nozzle 49 (FIG. 7) (e.g., a nozzle that is manually-operable by depressing and releasing a hand-operated lever) can be connected to the free end of the hose 48 for use in at least partially controlling and/or suppressing spot fires on and/or around the harvester, as will be discussed in greater detail below. As an example, the use of the term "relative" with respect to the spot-suppression, accumulator-suppression, and baler-suppression subsystems can be understood in the context of comparing the spot-suppression, accumulator-suppression, and baler-suppression subsystems with one another.

Figure 7:
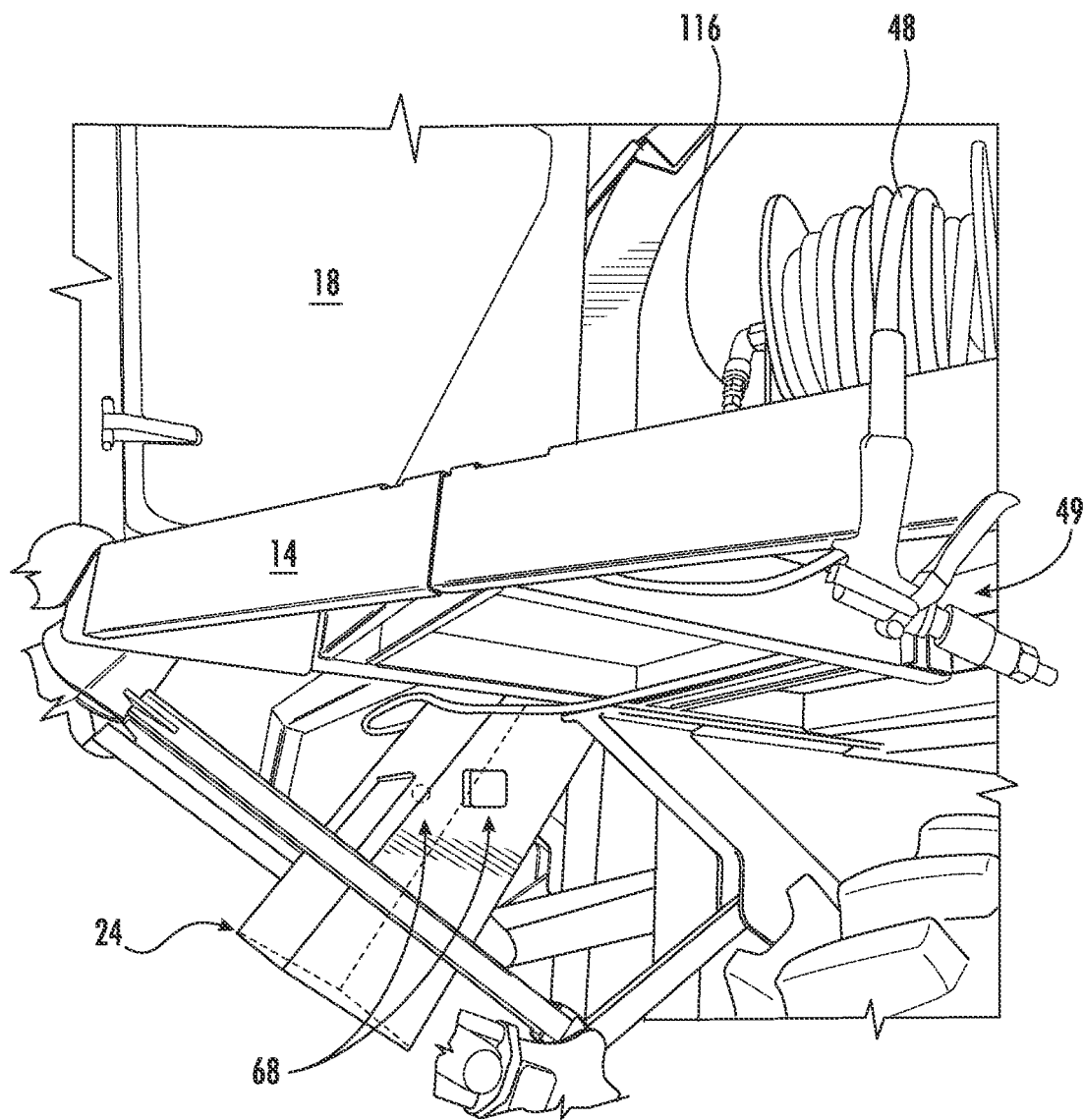
FIG. 7 is a right, front pictorial view of a portion of the front end of the harvester of FIG. 1, wherein some features that are normally hidden from view are depicted by dashed lines.

Referring to FIG. 7, at least one pipe or piping system 116 of the spot-suppression subsystem can supply fire suppressant under pressure from the spot-suppression pump 46 to the hose-end nozzle 49 by way of the retractable/extendable hose 48. In one example, the hose 48 is a fifty foot or other suitable length flexible hose that can be drawn off of, and wound back onto, the reel depicted in the drawings (e.g., a retractable/extendable hose reel).

In some examples, operation of one or more features of the suppression system (e.g., operation of the suppression pumps 42, 44, 46) can be manually initiated. In other examples, operation of one or more features of the suppression system (e.g., operation of the suppression pumps 42, 44, 46) can be automatically initiated in response to the detection system detecting that a fire-related condition in a portion of the harvester's material flow path exceeds a predetermined threshold. In this regard, the detection system can include one or more detectors configured in a manner that seeks to detect fire-related conditions (e.g., predetermined electromagnetic radiation and/or heat). As a more specific example and in accordance with the first embodiment, the detection system can include eight detectors configured in a manner that seeks to detect fire-related conditions (e.g., predetermined electromagnetic radiation and/or heat), and the detectors can be of different types. At least partially reiterating from above, the inclusion of detectors may be optional, and, if present, a variety of different numbers, arrangements, and types of detectors are within the scope of this disclosure.

The following high-level overview of the first embodiment detection system begins with reference to one or more of FIGS. 1, 2, 3, 7 and 8. The detection system can include one or more detectors 68 mounted to the upstream duct 24, and the detectors 68 may be referred to as upstream detectors. The upstream detectors 68 can be configured in a manner that seeks to detect fire-related conditions (e.g., sparks and/or embers) in the internal pathway of the upstream duct 24, as will be discussed in greater detail below.

Referring to one or more of FIGS. 1, 2, 9, and 24, the detection system can include one or more detectors 70 mounted to the downstream duct 30, and the detectors 70 may be referred to as downstream detectors. The downstream detectors 70 can be configured in a manner that seeks to detect fire-related conditions (e.g., sparks and/or embers) in the internal pathway defined of the downstream duct 30, as will be discussed in greater detail below.

Referring to one or more of FIGS. 2, 10, 11, 13, and 17, the detection system can include one or more detectors 72 mounted in respective upper areas of the accumulator 32, and they may be referred to as upper-accumulator detectors. The upper-accumulator detectors 72 can be configured in a manner that seeks to detect fire-related conditions (e.g., thermal radiation) in the interior space of the accumulator chamber (e.g., the chamber of the accumulator 32), as will be discussed in greater detail below.

Figure 10:
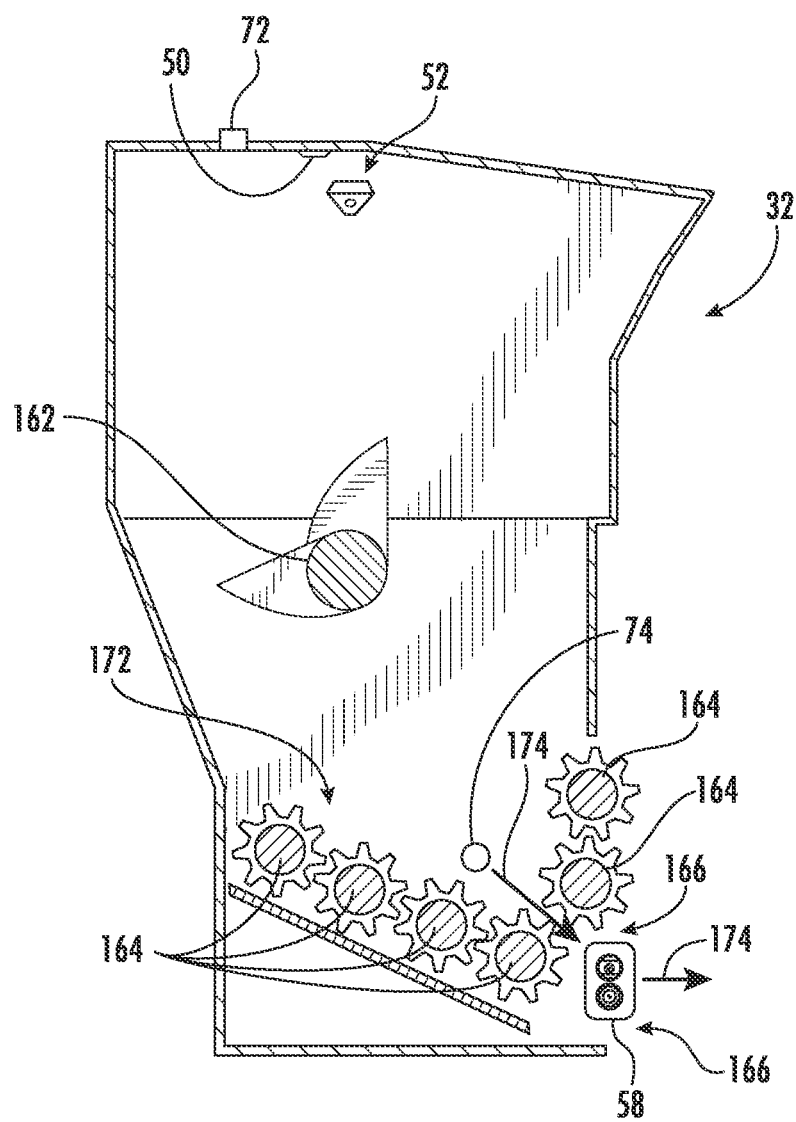
FIG. 10 is an isolated, right cut-away view of an accumulator of the harvester of FIG. 1, wherein an isolated, left-side cut-away view can be a mirror image of FIG. 10.
Figure 11:
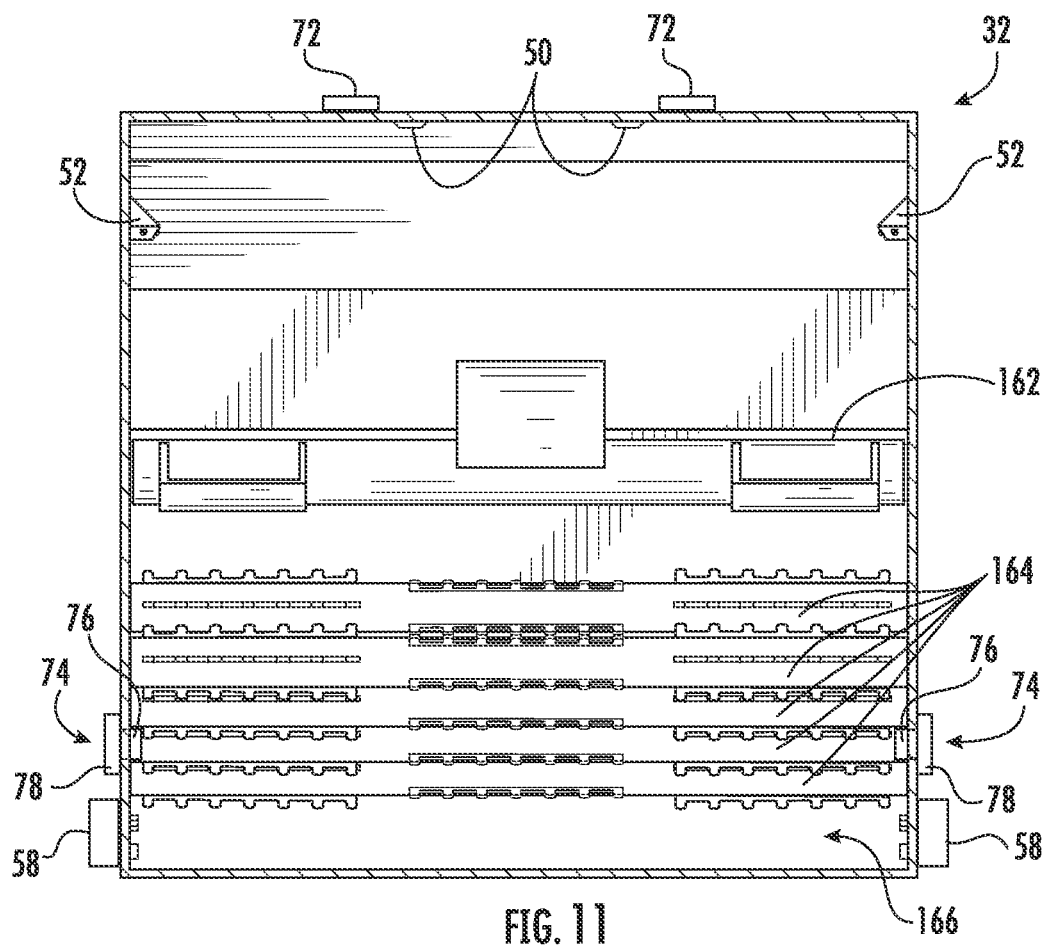
FIG. 11 is an isolated, front cut-away view of the accumulator of the harvester of FIG. 1.
Figure 12:
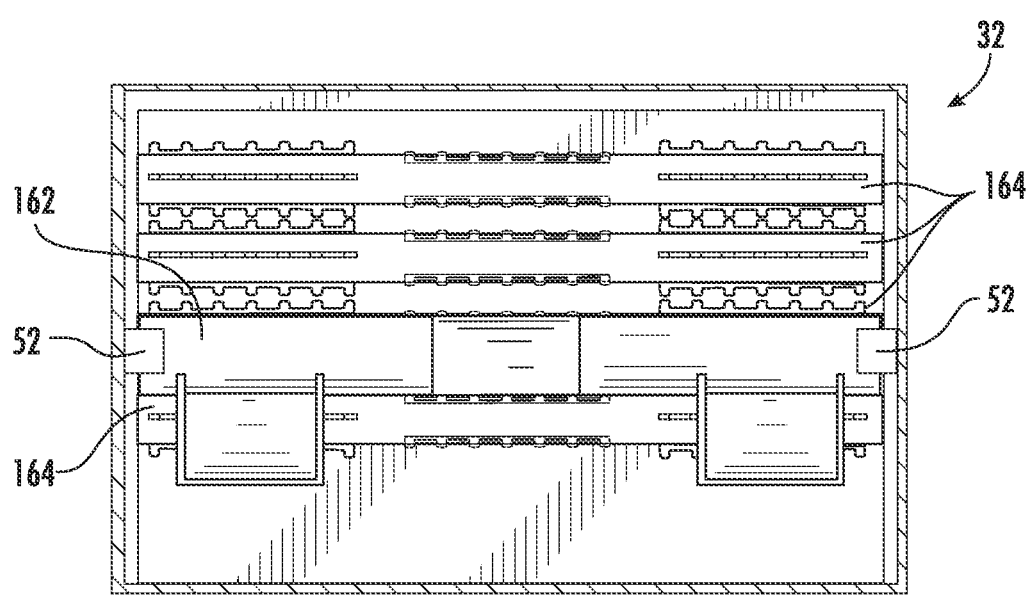
FIG. 12 is an isolated, top cut-away view of the accumulator of the harvester of FIG. 1.

Referring to one or more of FIGS. 10, 11, and 18, the detection system can include one or more detectors 74 mounted in opposite lower areas of the accumulator 32, and they may be referred to as lower-accumulator detectors. The lower-accumulator detectors 74 can be configured in a manner that seeks to detect fire-related conditions (e.g., embedded fire) in the interior space of the accumulator chamber, as will be discussed in greater detail below.

In the first embodiment, each of the detectors 68, 70, 72, 74 can have a lens assembly 76 (FIGS. 8, 11, 13, and 24) mounted to a housing 78 (FIGS. 8, 11, 17 and 24) containing the sensor(s) and other conventional components of the detector. The lens assembly 76 can include a tubular (e.g., generally cylindrical) barrel having opposite proximate and distal ends. The proximate end can be mounted to the detector housing 78 and in an optical communication with the sensor(s) through an opening in the housing. The distal end can contain a lens or other suitable optical device operatively associated with at least the sensor(s) to provide a conical or frustoconical field of view of the detector. The field of view typically is the solid angle through which the detector is sensitive to electromagnetic radiation.

Referring to FIG. 5, the detection and suppression systems can each include, or they can share, at least one fire-resistant and/or fire-proof control chamber, enclosure, box, or container 80 enclosing (e.g., fully enclosing) the electric motor-operated pumps 42, 44, 46. The control container 80 typically further contains at least one battery ("system battery 82") for providing electrical power to the electrical components of the suppression and detection systems. The control container 80 typically further contains at least one controller ("system controller 86") for providing signals to, and receiving signals from, respective components of the suppression and detection systems. The control container 80 can include panels (e.g., top and bottom panels, right and left side panels, and a rear panel) that collectively extend around an interior space of the control container, and an opening of the control container can be opened and closed by a door associated with a latch for releasably securing the door in its closed configuration.

Referring also to FIG. 4, the control container 80 can be mounted, for example by way of mounting brackets, to the frame platform 14, and positioned between the tanks 40 and the accumulator 32. In the first embodiment, components of the suppression and detection systems (e.g., components of the accumulator-suppression, baler-suppression, and spot-suppression subsystems) that are outside of the control container 80 (FIGS. 1 and 5) are typically constructed of at least fire resistant and/or fire proof material.

In FIG. 1, the control container 80 is hidden from view; therefore, the control container and system battery 82 are schematically depicted by dashed lines in FIG. 1. For ease of illustration and/or for providing an alternative example, FIG. 1 depicts the control container 80 as being on the far (e.g., left) side of the cleaner 28. Notwithstanding, the control container 80 of the first embodiment is typically on the far (e.g., left) side of the accumulator 32, although different arrangements are within the scope of this disclosure. The engine compartment 16 typically contains at least one suitable engine that drives an alternator or generator that charges at least one engine battery 84 contained in the engine compartment in a conventional manner. The engine battery 84 and system battery 82 can be electrically connected to one another (e.g., in parallel) by electrical wiring 90 connected therebetween so that the system battery is electrically charged by way of the engine battery and/or the alternator, generator, or the like. More generally, the system battery 82 can be in electrical communication with the conventional electrical system of the harvester 10 for maintaining the electrical charge of the system battery 82. The system and engine batteries 82, 84 can each be a twelve volt battery, although different voltages may be suitable.

In the first embodiment, the system battery 82 is a dedicated battery for providing electrical power to the detection and suppression systems of the harvester 10. For example, the electrically charged system battery 82 can provide electrical power to the detection and suppression systems of the harvester 10 after failure of any one or more of the electrical wiring 90, engine battery 84, alternator, generator, and/or the like. Different types, numbers, and arrangements of batteries are within the scope of this disclosure.

Referring to FIG. 5, the system battery 82 can supply power to (e.g., is electrically connected to) the electric motor of each of the suppression pumps 42, 44, 46, and also the controller 86, by way of respective wiring (not shown) that is contained in the control chamber 80. For each suppression pump 42, 44, 46, the electrical connection that is between it and the system battery 82, and positioned in the control chamber 80, can include a motor-controlling switch (not shown) for opening and closing the electrical circuit that electrically connects together the pump and the system battery. Each motor-controlling switch can be a relay switch or contactor that is electrically connected by wiring (not shown) to the system controller 86, so that the system controller can separately control operation of the suppression pumps 42, 44, 46, as will be discussed in greater detail below. Alternatively, there may be different numbers and arrangements of pumps, some of which may be together controlled by the same relay switch or contactor, or the like.

The system controller 86 can comprise at least one digital computer (e.g., programmable logic controller) including, for example, one or more of each of a central processing unit or processor, computer hardware integrated circuits or memory, data storage, and/or equipment interfaces. For example, one or more of the equipment interfaces of the system controller 86 can be operatively associated with the motor-controlling switches for the suppression pumps 42, 44, 46, for controlling operation of those switches and, thus, operation of the suppression pumps. As further examples, one or more of the equipment interfaces of the system controller 86 can be respectively connected to the detectors 68, 70, 72, 74 by wiring and/or in any other suitable manner. As another example, one or more of the equipment interfaces of the system controller 86 can be operatively associated one or more user interfaces 92 (FIG. 1) configured to allow a user to provide commands and information to the system controller 86, and configured to allow the system controller 86 to output information to the user. For example, the input-type feature(s) of the user interfaces can include a keyboard, a cursor control device (e.g., a mouse), a visual display with touch functionality (e.g., capacitive or other sensors that are configured to detect physical contact), and/or any other suitable devices. As additional examples, the output-type feature(s) of the user interfaces 92 can include a display device (e.g., a monitor or projector), speaker (for providing a fire alarm), and/or any other suitable devices. The system controller 86 can be in the form of a distributed computing system; therefore, the features of the system controller 86 can be spread between separate computers, and each of those separate computers can be contained in the control container 80 and/or other suitable fire proof locations.

In the example of FIG. 1, a first of the user interfaces 92 can be mounted inside the cab 18 (e.g., at a position proximate or adjacent a steering wheel for use in steering the harvester 10), and a second of the user interfaces 92 can be mounted to the frame platform 14 outside the cab (e.g., at a position proximate or adjacent the hose reel 48). Each of the user interfaces 92 can comprise depressible buttons, icons displayed by a visual display and/or other suitable features for being manually depressed, selected, or the like, by a user to at least partially control respective features of the suppression system, and the user interfaces can also display information about the suppression and detection systems, as discussed in greater detail below. Features of the system controller 86 and user interfaces 92 may be implemented in various manners, including software, hardware, firmware, or any combinations thereof, for facilitating respective aspects of this disclosure.

Referring to FIG. 1 and regarding the first embodiment harvesting apparatus 20 in greater detail, it includes moving machinery, namely rotating machinery, configured to harvest and transport plant material including ripe cotton bolls and associated debris. In some situations, the debris may include rocks, scraps of metal, and/or other types of debris that may engage with the harvester (e.g., the rotating machinery) in a manner that may produce one or more sparks and/or embers in respective portions of the harvester's material flow path, so that the sparks and/or embers are carried along with the other contents in respective portions of the harvester's material flow path. As will be discussed in greater detail below, the detection system can be configured in a manner that seeks to detect such sparks, embers, and/or any associated fires, and the suppression system can be configured in a manner that seeks to at least partially control and/or suppress such sparks, embers, and/or any associated fires, or the like.

Regarding the harvesting apparatus 20 in greater detail, it can be supported by the harvester framework (e.g., some of which is shown in FIG. 7) extending below and forward of the front end of the frame platform 14, or the like. The harvesting apparatus 20 can include series of strippers units 118 extending along, and each extending obliquely forwardly and downwardly from, a crosswise auger mechanism 120. The crosswise auger mechanism 120 can include a housing supporting rotating machinery in the form of one or more hydraulic motor-driven crosswise augers 122 (e.g., crosswise auger conveyors). The crosswise augers 122 are hidden from view in FIG. 1; therefore, one of the crosswise augers 122 is schematically depicted by a dashed circle in FIG. 1.

The first embodiment stripper units 118 are configured to remove (e.g., strip) cotton plant material and supply it to the crosswise auger mechanism 120. Each stripper unit 118 can include at least one housing supported by the crosswise auger mechanism 120. More specifically, each stripper unit 118 can include a generally dual-prong-shaped housing such that a slot is defined between the two prongs. The slot defined between the prongs is typically forwardly, upwardly and downwardly open for receiving a row of upright cotton plants. Each housing prong can support an agitator or rotary machinery in the form of a hydraulic motor-driven rotary brush 124, so that each stripper unit 118 includes a pair of counter-rotating rotary brushes 124 between which a nip or narrow gap is defined for receiving (e.g., stripping) a row of upright cotton plants. The rotary brushes 124 are hidden from view in FIG. 1; therefore, a representative rotary brush is schematically depicted by a dashed line in FIG. 1. Each inclined rotary brush 124 (e.g., rotating machinery comprising metal and/or metallic alloy) can extend obliquely, forwardly and downwardly relative to the crosswise auger mechanism 120.

In each stripper unit 118, each housing prong can further support a rotary machinery in the form of an inclined auger 126 (e.g., a hydraulic motor-driven inclined auger conveyor) configured to extend along, and at a lower elevation than, the associated rotary brush 124. The plant material removed (e.g., stripped) by the rotary brushes 124 is conveyed rearwardly by the inclined augers 126 to the crosswise auger mechanism 120.

In each housing prong of each stripper unit 118, the inclined auger 126 can be part of an inclined auger conveyor that includes an inclined trough in receipt of the inclined auger (e.g., rotating machinery comprising metal and/or metallic alloy). The inclined trough and inclined auger 126 can be cooperatively configured to at least partially clean the stripped plant material and at least partially remove any other material being conveyed rearwardly and upwardly by the inclined auger conveyor 126. For example, the inclined trough can include downwardly and outwardly open slots configured in a manner that seeks to facilitate removal of undesirable debris (e.g., dirt) from the inclined trough and/or to facilitate stalk breakage and removal. The downstream ends of the inclined auger conveyors 126 are typically open to the crosswise augers 122 of the crosswise auger mechanism 120 for supplying the removed plant material to the crosswise auger mechanism. The crosswise auger mechanism 120 can include a pair of the crosswise augers 122 (e.g., rotating machinery comprising metal and/or metallic alloy) that are arranged end-to-end with respect to one another and include opposite fighting to move the removed plant material inwardly toward at least one central, rearwardly-facing outlet of the crosswise auger mechanism.

In the first embodiment, the lower end of the at least one separation duct or chamber 22 is connected to the outlet(s) of the crosswise auger mechanism 120 for receiving the plant material and any associated materials from the crosswise auger mechanism. An upper end of the separation 28 chamber is open to a lower end of the upstream duct 24 for supplying at least ripe cotton bolls thereto. Referring to FIG. 2, at least one hydraulic motor-driven mechanical fan 132 (e.g., "upstream conveying fan") can be in at least indirect fluid communication with one or more of the separator 22 and upstream duct 24 for at least partially forming an upstream portion of the harvester's material flow path (e.g., for at least partially forming an upstream forced-air flow path portion of the harvester's material flow path). The first embodiment upstream forced-air flow path is configured to draw and/or push the ripe cotton bolls and associated relatively light debris from the outlet of the crosswise auger mechanism 120, into and through the separator 22, and into the inlet of the upstream duct 24. As best understood with reference to FIG. 2, the upstream conveying fan 132 can supply airflow to air nozzles 134, or the like, that respectively discharge air originating from the upstream conveying fan into interior spaces of the separator 22 and upstream duct 24. That discharged air at least partially forms the upstream forced-air flow path within the separator 22 and upstream duct 24.

The separator 22 can be in the form of a downwardly open duct or chamber. The one or more downward openings of the separator 22 can be configured to allow heavier, undesirable material, such as at least some of the green bolls, to drop from the upstream forced-air flow path, while lighter materials, including the ripe cotton bolls, are floated rearwardly and/or upwardly through the separator and into the upstream duct 24. The air nozzles 134 in the interior of the chamber of the separator 22 can open upwardly and rearwardly to provide an air flow that helps propel the lighter material upwardly and rearwardly over the lower opening of the separator and through the upstream duct 24. The upstream duct 24 typically extends through an appropriate opening in the frame platform 14.

It is believed that any sparks and/or embers generated in association with one or more of the rotating pieces of machinery of the harvesting apparatus 20 (FIG. 1) may be drawn into and travel along the harvester's material flow path in a manner that may ignite the plant material in the harvester's material flow path. The one or more upstream detectors 68 (FIGS. 1, 2, 3, 7 and 8) can be mounted to the upstream duct 24 and configured in a manner that seeks to detect any sparks and/or embers positioned in (e.g. traveling through) the internal pathway of the upstream duct. The upstream detectors 68 can each be infrared detectors, for example short-wave infrared detectors, configured in a manner that seeks to detect at least sparks and/or embers, or other suitable detectors may be used.

Figure 8:
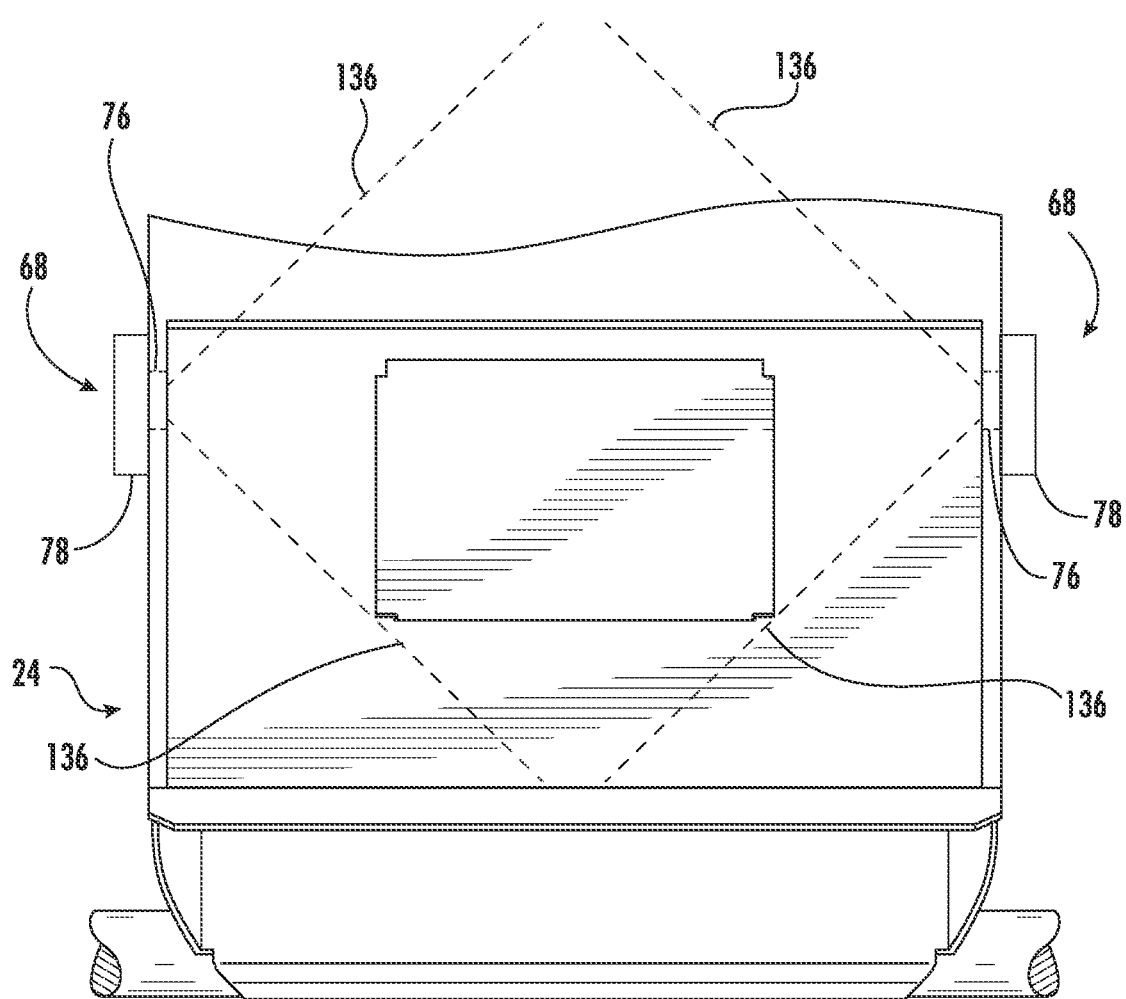
FIG. 8 is a front elevation view of a portion of the front end of the harvester of FIG. 3, wherein a portion of an upstream duct is depicted, and dashed lines schematically depict portions of optical detectors' fields of view, in accordance with the first embodiment.
Figure 9:
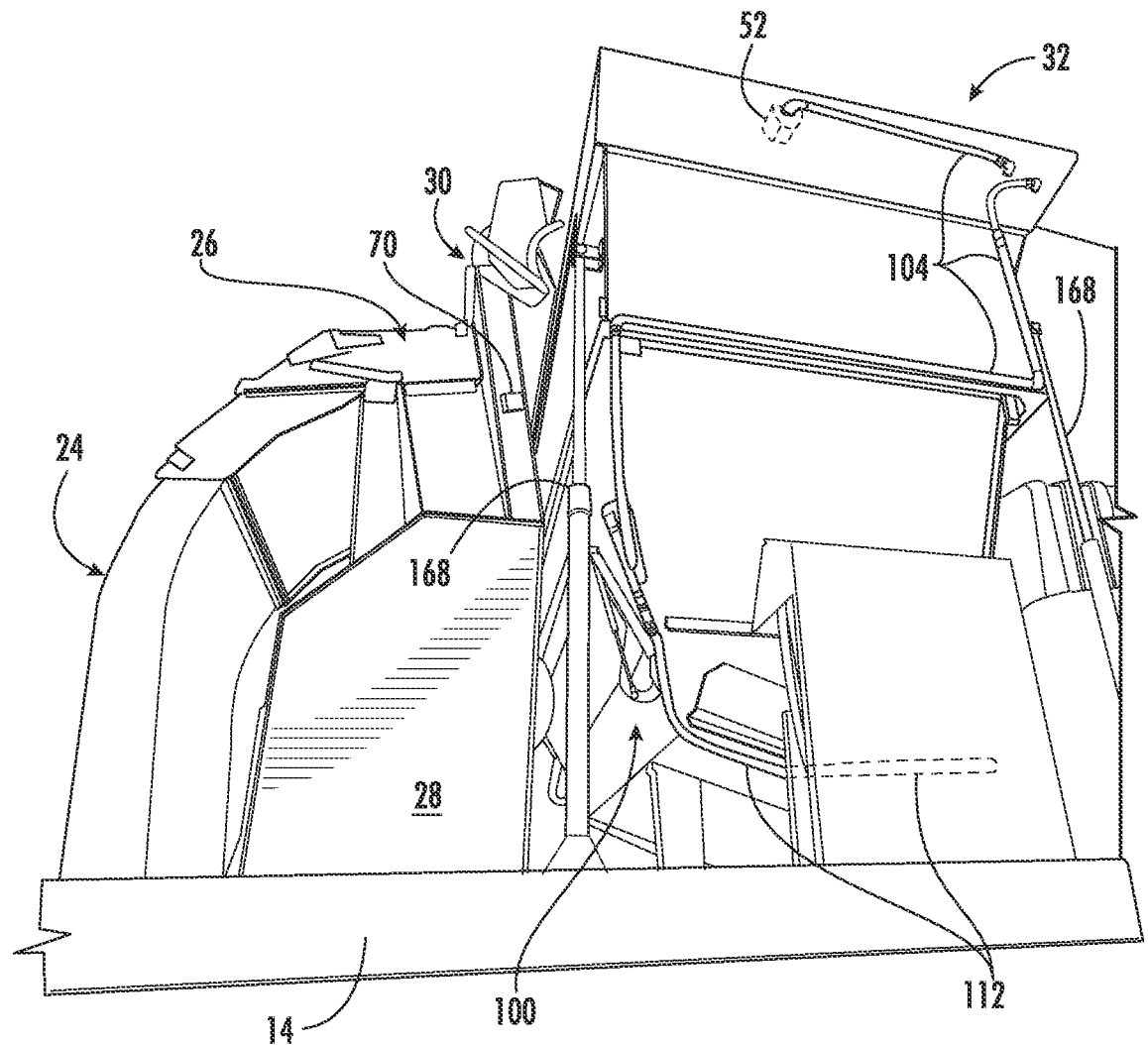
FIG. 9 is a right pictorial view of an upper central portion of the harvester of FIG. 1, wherein some features that are normally hidden from view are depicted by dashed lines.

In the example of FIG. 8, the upstream detectors 68 are mounted distantly from one another, or more specifically opposite from one another, by being mounted to opposite walls of the upstream duct 24. For each upstream detector 68 and the upstream duct wall to which it is mounted, its housing 78 can be engaged against the outer surface of the wall panel and its lens assembly 76 can be positioned in a hole extending through the wall panel. The upstream detectors 68 can be mounted to the upstream duct using suitable fasteners, frames, connectors, welds, and/or the like.

As schematically depicted in FIG. 8, the upstream detectors 68 can be right and left detectors respectively mounted to right and left side walls of the upstream duct 24, so that their respective fields of view 136 are within the interior space of the upstream duct. In FIG. 8, much of the interior space of the upstream duct 24 is hidden from view, and portions of the fields of view 136 are schematically depicted by dashed lines (e.g., in an approximated manner). The fields of view 136 can extend at least partially convergently with respect to one another, be directed toward one another, overlap one another, and/or be coaxially aligned with one another. As another example, the fields of view 136 can each have a central axis extending outwardly from the respective upstream detector 68, and these axes can extend convergently, or more specifically about coaxially, toward one another. Each of the fields of view 136 can be conical or frustoconical.

The field of view 136 of the left upstream detector 68 can be configured so that at least a portion of the front wall of the upstream duct 24, at least a portion of the rear wall of the upstream duct, at least a portion of the right wall of the upstream duct, and/or at least a portion of one or more other suitable features are within this field of view. Similarly, the field of view 136 of the right upstream detector 68 can be configured so that at least a portion of the front wall of the upstream duct 24, at least a portion of the rear wall of the upstream duct, at least a portion of the left wall of the upstream duct, and/or at least a portion of one or more other suitable features are within this field of view.

As depicted in the example of FIG. 2, the upstream duct 24 typically extends through an appropriate opening in the harvester frame (e.g., frame platform 14) for supplying the plant material from the upstream duct to an inlet of the intermediate duct 26. The upstream forced-air flow path, which is at least partially provided by the one or more fans 32 and air nozzles 134, continues through the intermediate duct 26. The intermediate duct 26 can be curved in shape so that both the inlet and outlet openings of the intermediate duct face at least generally downward. The upper, forwardly-facing structure of the intermediate duct 26 can be defined by grating 138. The grating 138 can be configured for both allowing some of the undesirable plant material to be discharged outwardly through the grating into the ambient environment outside of the intermediate duct, and retaining at least a significant percentage of the ripe cotton bolls in the intermediate duct. Solid wall panels of the intermediate duct 26 that are downstream from the grating 138 can extend rearwardly and downwardly to direct at least cotton bolls through the outlet of the intermediate duct. One or more of U.S. Pat. Nos. 4,606,177, 5,311,728 and 6,018,938 are believed to disclose examples of suitable harvesting apparatuses 16, separators 28, upstream ducts 30, fans 32, air nozzles 134, intermediate ducts 36, and/or other associated features.

Referring to FIG. 2, solid wall panels of the intermediate duct 26 that are downstream from the grating 138 can extend rearwardly and downwardly to an outlet of the intermediate duct that is open to an opening into a chamber of the field cleaner 28. The chamber of the field cleaner 28 (e.g., "cleaner chamber") can be a housing, wherein an upright partition 142 separates an upper inlet of the cleaner chamber from an upper outlet of the cleaner chamber. Except for the upper inlet and upper outlet separated by the partition 142, and at least one lower outlet (not shown) equipped with an auger (not shown) for discharging debris collected in the bottom of the cleaner chamber, the outer walls of the cleaner 28 can fully enclose the interior space of the cleaner chamber. The field cleaner 28 can be configured so that the upstream forced-air flow path carrying at least ripe cotton bolls enters the cleaner chamber through the upper inlet of the cleaner chamber.

With continued reference to FIG. 2, the first embodiment field cleaner 28 includes moving machinery, namely rotating machinery, configured to at least partially clean and transport predetermined portions of the harvested material that may include debris. In some situations, the debris may include rocks, scraps of metal, and/or other types of debris that may engage with the rotating machinery of the cleaner 28 in a manner that may produce one or more sparks and/or embers in the harvester's material flow path, so that the sparks and/or embers are carried along with the other contents in the harvester's material flow path. Reiterating from above and as will be discussed in greater detail below, the detection system can be configured in a manner that seeks to detect such sparks, embers, and/or any associated fires, and the suppression system can be configured in a manner that seeks to at least partially control and/or suppress such sparks, embers, and/or any associated fires, or the like.

The inlet area of the cleaner chamber (e.g., the chamber of the field cleaner 28) can be configured to direct material flowing into the cleaner chamber toward and along rotating machinery in the form of at least one rotary feeder shaft 144. The feeder shaft 144 (e.g., rotating machinery comprising metal and/or metallic alloy) can be configured to direct ripe cotton bolls and associated debris toward rotating machinery in the form of one or more rotary saw cylinders 146 that each have a "saw-toothed" outer periphery. As the saw cylinders 146 (e.g., rotating machinery comprising metal and/or metallic alloy) are rotated at a high speed, ripe cotton bolls are snagged by the saw cylinders' peripheral saw-teeth and the snagged bolls are hit against a series of stationary bars 148 (e.g., machinery comprising metal and/or metallic alloy) to separate the debris from the raw cotton.

Rotating machinery in the form of a rotary doffer shaft 150 can be operatively associated with the saw cylinders 146 and configured to remove (e.g., doff) the raw cotton from the saw cylinders 146. A hydraulic motor-driven mechanical fan 152 (e.g., "downstream conveying fan") can at least partially form an intermediate portion of the harvester's material flow path (e.g., at least partially form a downstream forced-air flow path portion of the harvester's material flow path). The first embodiment downstream forced-air flow path is operatively associated with the doffer 150 (e.g., rotating machinery comprising metal and/or metallic alloy) to receive the raw cotton from the doffer. At least the partition 142 can direct the downstream forced-air flow path containing the raw cotton outwardly through the outlet of the cleaning chamber. One or more of U.S. Pat. Nos. 4,606,177, 6,159, 094 and 9,763,387 are believed to disclose examples of suitable cleaners 40 and/or other associated features.

In the example of FIG. 2, the downstream forced-air flow path extends from the outlet of the cleaner 28 and into the downstream duct 30. The downstream forced-air flow path, which is at least partially provided by the downstream conveying fan 152, can propel the raw cotton through the downstream duct 30.

It is believed that any sparks and/or embers generated in association with one or more of the rotating pieces of machinery of the cleaner 28 may be drawn into and travel along the harvester's material flow path in a manner that may ignite the plant material (e.g., raw cotton) in the harvester's material flow path. The one or more downstream detectors 70 (FIGS. 1, 2, 9, and 24) can be mounted to the downstream duct 30 and configured in a manner that seeks to detect any one or more sparks and/or embers positioned in (e.g. traveling through) the internal pathway of the downstream duct. The downstream detectors 70 can each be infrared detectors, for example short-wave infrared detectors, configured in a manner that seeks to detect at least sparks and/or embers, or other suitable detectors may be used.

Figure 24:
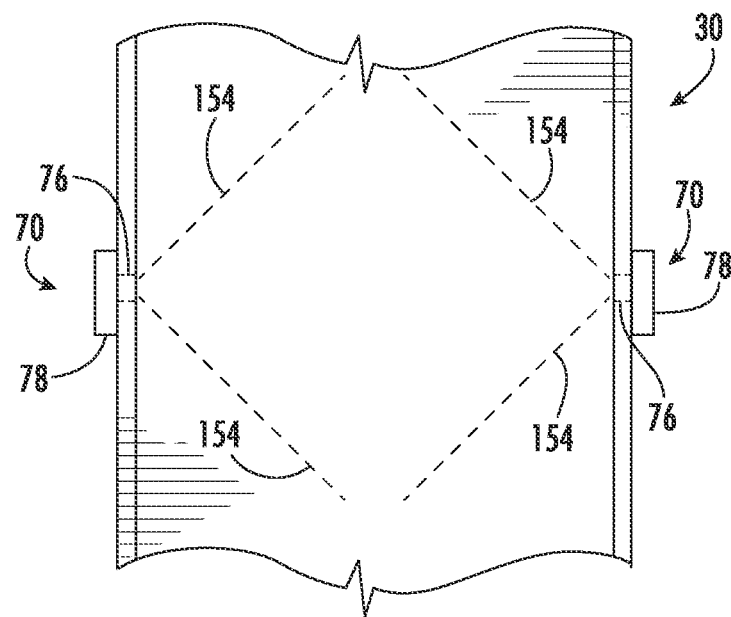
FIG. 24 is a substantially isolated, front elevation view of a portion of a downstream duct of the harvester of FIG. 1, wherein dashed lines schematically depict optical detectors' fields of view, in accordance with the first embodiment.

In the example of FIG. 24, the downstream detectors 70 are mounted distantly from one another, or more specifically opposite from one another, by being mounted to opposite walls of the downstream duct 30. For each downstream detector 70 and the downstream duct wall to which it is mounted, its housing 78 can be engaged against the outer surface of the wall panel and its lens assembly 76 can be positioned in a hole extending through the wall panel. The downstream detectors 70 can be mounted to the downstream duct using suitable fasteners, frames, connectors, welds, and/or the like. As schematically depicted in FIG. 24, the downstream detectors 70 can be right and left detectors respectively mounted to right and left side walls of the downstream duct 30, so that their respective fields of view 154 are within the interior space of the downstream duct. In FIG. 24, the interior space of the downstream duct 30 is hidden from view, and the portions of the fields of view 154 are schematically depicted by dashed lines (e.g., in an approximated manner). The fields of view 154 can extend at least partially convergently with respect to one another, be directed with respect to one another, overlap one another, and/or be coaxially aligned with one another. As another example, the fields of view 154 can each have a central axis extending outwardly from the respective downstream detector 70, and these axes can extend convergently, or more specifically about coaxially, toward one another.

The field of view 154 of the left downstream detector 70 can be configured so that at least a portion of the front wall of the downstream duct 30, at least a portion of the rear wall of the downstream duct, at least a portion of the right wall of the downstream duct, and/or at least a portion of one or more other suitable features are within this field of view. Similarly, the field of view 154 of the right downstream detector 70 can be configured so that at least a portion of the front wall of the downstream duct 30, at least a portion of the rear wall of the downstream duct, at least a portion of the left wall of the downstream duct, and/or at least a portion of one or more other suitable features are within this field of view.

Figure 17:
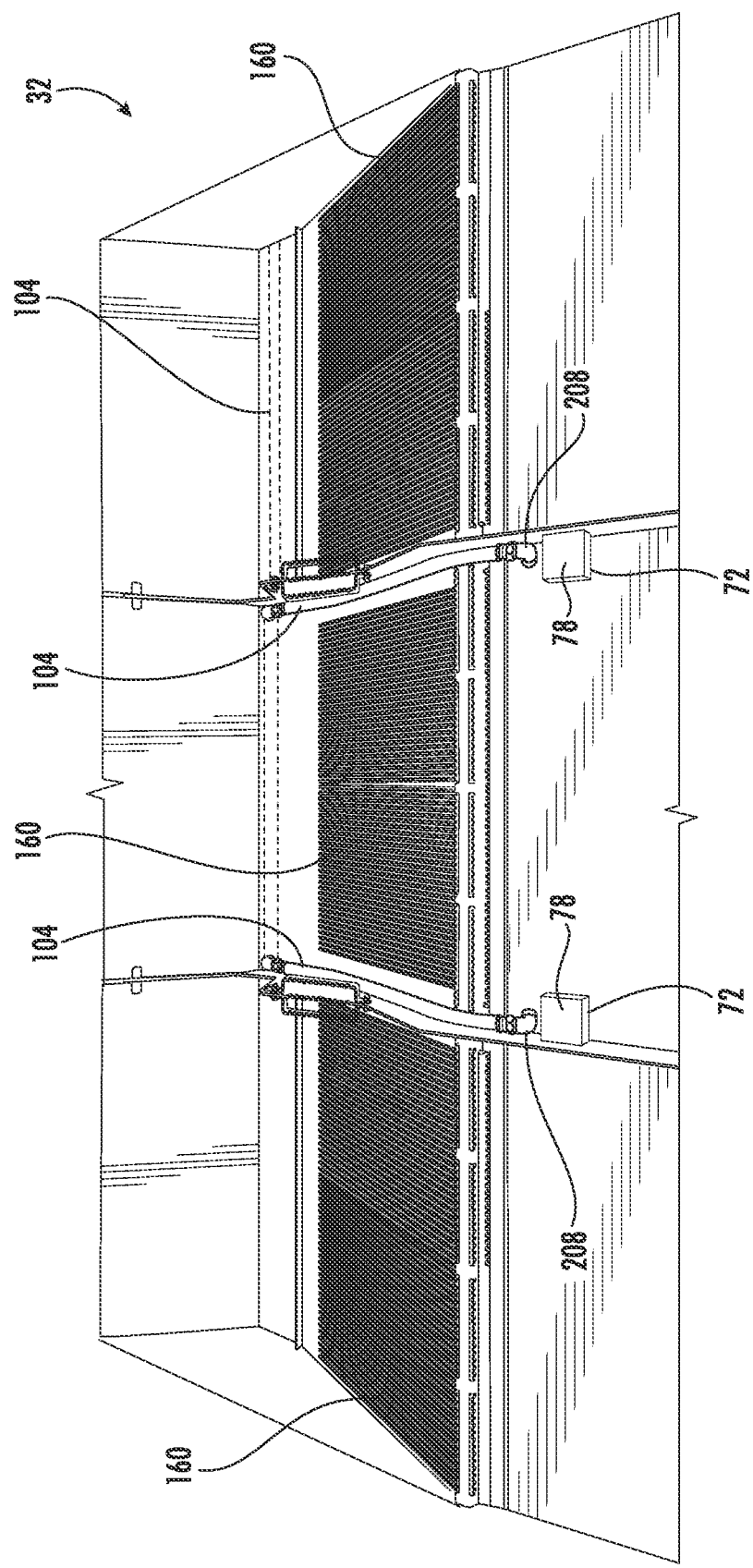
FIG. 17 is a top pictorial view of a portion of the accumulator of the harvester of FIG. 1, wherein some features that are hidden from view are depicted by dashed lines.

In the example of FIG. 2, the downstream forced-air flow path portion of the harvester's material flow path extends from the outlet of the cleaner 28, through the downstream duct 30, and into an opening to the interior of the accumulator chamber (e.g., the chamber of the accumulator 32). As a result, the raw cotton from the cleaner 28 is carried through the downstream duct 30 into the interior of the accumulator chamber. The downstream forced-air flow path typically dissipates in the interior of the accumulator chamber due, for example, to the relatively large size of the accumulator chamber and a rear portion of the top of the accumulator chamber being defined by grating 160 (FIGS. 13 and 17). The interior of the accumulator chamber is open to the ambient environment by way of the grating 160. Otherwise, the walls of the accumulator chamber can fully enclose the interior space of the accumulator chamber.

Referring to FIGS. 2, 10-13, and 18, the accumulator 32 can include at least one hydraulic motor-driven mixing shaft 162, and one or more hydraulic motor-driven feeder shafts 164 positioned in the interior of the accumulator chamber (e.g., the chamber of the accumulator 32). The mixing shaft 162 can be positioned in a central area within the interior space of the accumulator chamber and be configured to mix the raw cotton in the upper area of the accumulator chamber. The mixing shaft 162 is typically operated continuously while the harvester 10 is harvesting cotton, for dispersing the raw cotton throughout at least the upper portion of the interior of the accumulator chamber.

Referring to FIGS. 2 and 10, the feeder shafts 164 can be proximate or adjacent a lower, rear discharge opening 166 of the accumulator chamber. The feeder shafts 164 are typically part of a feeder system configured for periodically conveying and/or feeding accumulated raw cotton outwardly through the accumulator discharge opening 166. The feeder shafts 164 are typically not operated during a majority of the time while the harvester 10 is harvesting cotton. Similarly, the discharge opening 166 is typically closed during a majority of the time while the harvester 10 is harvesting cotton. Referring to FIG. 2, one or more doors 168 can be moved by one or more hydraulic actuators 170 for opening and closing the accumulator discharge opening 166.

While the harvester 10 is harvesting cotton, during an accumulating mode of operation of the accumulator 32, the discharge opening 166 can be closed (and the feeder shafts 164 can be idle/not operating/not rotating) so that the raw cotton accumulates in the lower interior space of the accumulator chamber (e.g., the chamber of the accumulator 32). Referring to FIG. 10, under at least the force of gravity, a mass of the raw cotton typically collects in a collection or convergence area 172, which is a lower portion of the interior space within the accumulator chamber. In the first embodiment, the series of feeder shafts 164 extend partially around the convergence area 172, and the convergence area can be described as being a lower half of the interior space of the accumulator chamber, being a lower third of the interior space of the accumulator chamber, extending downwardly from the top of the highest feeder shaft 164, extending downwardly from the tops of the highest feeder shafts, extending downwardly from the top of the second to the highest feeder shaft, extending downwardly from the tops of the second to the highest feeder shafts, and/or the like.

Referring to FIG. 10, during a feeding mode of operation of the accumulator 32, typically both the discharge opening 166 is open and the feeder shafts 164 are operated, so that the accumulated raw cotton is fed outwardly from the convergence area 172 along a feed path 174. The first embodiment feed path 174 extends through the accumulator discharge opening 166. At least a portion of the feed path 174 is schematically depicted by arrows designated by numeral 174 in FIG. 10. The feed path 174 is a portion of the harvester's material flow path.

The feeding mode can be automatically triggered by one more conventional level sensors for detecting a predetermined level (e.g., height) of accumulated raw cotton in the interior of the accumulator chamber (e.g., the chamber of the accumulator 32) and/or manually triggered, such as by way of one or more suitable user interfaces, or the like. U.S. Pat. Pub. 2014/0157745 is believed to disclose examples of suitable accumulators 32 and/or other associated features.

Further regarding the accumulating mode of operation of the accumulator 32, in some situations one or more sparks and/or embers may be present with the raw cotton within the interior space of the accumulator chamber and cause the raw cotton to ignite (e.g., start to burn and produce flames). It is believed that any sparks and/or embers within the interior of the accumulator chamber may reach this destination by way of the portion of the harvester's material flow path that enters the inlet of the accumulator chamber from the downstream duct 30. Alternatively and perhaps less likely, other scenarios may result in ignition within the accumulator chamber. For example, it is believed that sparks and/or embers may sometimes be produced in association with the rotating machinery within the accumulator chamber.

Regarding features of the detection system associated with the accumulator 32, FIGS. 13 and 17 depict the upper-accumulator detectors 72. The upper-accumulator detectors 72 can be configured in a manner that seeks to detect at least fire-related conditions in the interior space of the accumulator chamber (e.g., the chamber of the accumulator 32). The upper-accumulator detectors 72 can each be infrared detectors, for example mid-wave infrared detectors, or other suitable detectors may be used.

The upper-accumulator detectors 72 can be mounted to a central area of the top wall of the accumulator chamber so that they are spaced apart from one another. For each of the upper-accumulator detectors 72, its housing 78 can be engaged against the outer surface of the respective panel of the top wall of the accumulator chamber, and its lens assembly 76 can be positioned in a hole extending through the respective wall panel. The upper-accumulator detectors 72 can be mounted to the accumulator chamber using suitable fasteners, frames, connectors, welds, and/or the like.

Figure 25:
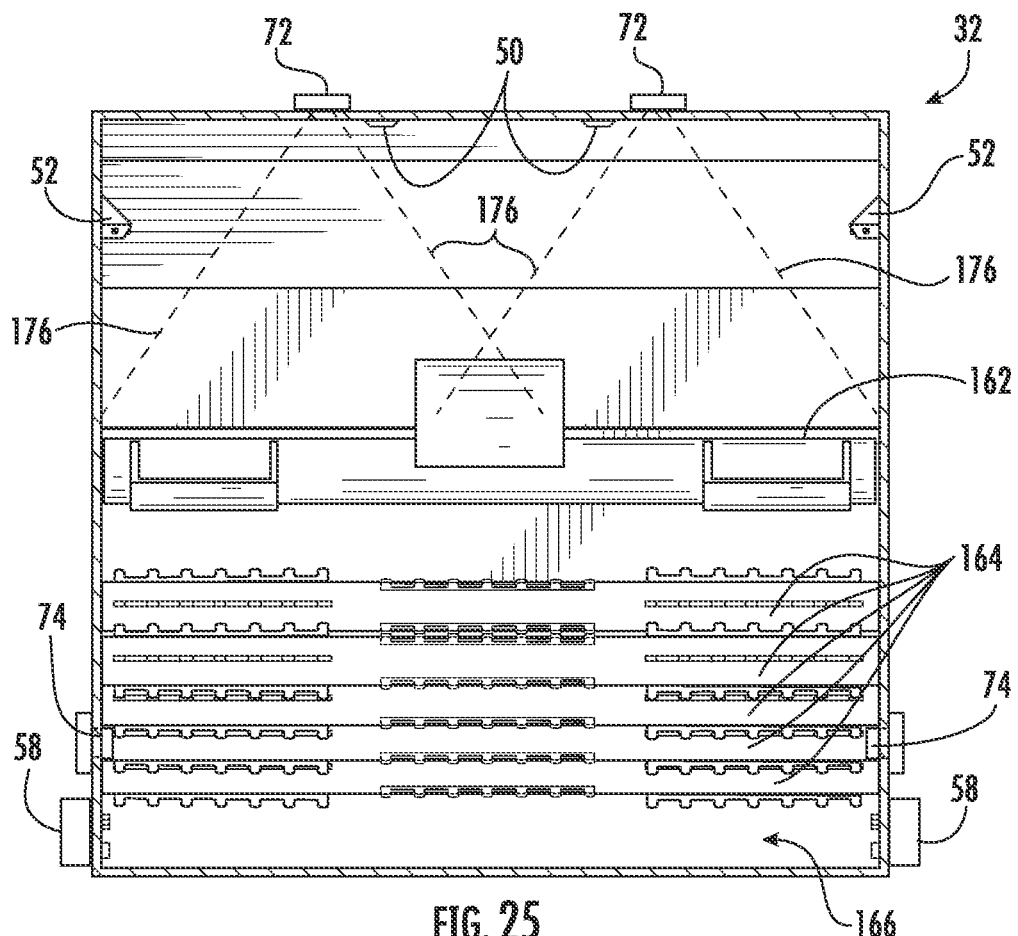
FIG. 25 is like FIG. 11, except, for example, that dashed lines schematically depict portions of optical detectors' fields of view, in accordance with the first embodiment.

As schematically depicted in FIG. 25, the upper-accumulator detectors 72 can be right and left upper-accumulator detectors configured so that their respective fields of view 176 are within the interior space of the accumulator chamber. In FIG. 25, portions of the fields of view 176 are schematically depicted by dashed lines (e.g., in an approximated manner). In the example of FIG. 25, the right and left fields of view 176 partially overlap one another. The first embodiment upper-accumulator detectors 72 are configured so that numerous features within the accumulator chamber are within the fields of view 176, including, for example, at least portions of the front, rear, right, and/or left walls of the accumulator chamber; at least portions of the mixing shaft 162; at least portions of the feeder shafts 164; and/or at least portions of one or more ledges 214 that may be present in, or otherwise associated with, one or more of the accumulator front and rear walls. As another example, the fields of view 176 can each have a central axis extending outwardly from the respective upper-accumulator detectors 72, and these axes can extend about parallel with respect to one another.

As depicted in FIG. 11, the lower-accumulator detectors 74 can be right and left detectors respectively mounted to right and left side walls of the accumulator chamber (e.g., the chamber of the accumulator 32). The lower-accumulator detectors 74 can be configured in a manner that seeks to detect at least fire-related conditions (e.g., embedded fire) in the interior space of the accumulator chamber. The lower-accumulator detectors 74 can each be infrared detectors, for example short-wave infrared detectors, configured in a manner that seeks to detect at least embedded fire in the accumulator chamber, for example fire embedded in the mass of raw cotton collected in the collection or convergence area 172 (FIG. 10), or other suitable detectors may be used.

The lower-accumulator detectors 74 can be respectively mounted to lower central portions of the right and left side walls of the accumulator chamber (e.g., the chamber of the accumulator 32). For each of the lower-accumulator detectors 74, its housing 78 can be engaged against the outer surface of a panel of the respective side wall of the accumulator chamber, and its lens assembly 76 can be positioned in a hole extending through the respective side wall panel of the accumulator chamber. The lower-accumulator detectors 74 can be mounted to the accumulator chamber using suitable fasteners, frames, connectors, welds, and/or the like.

Figure 26:
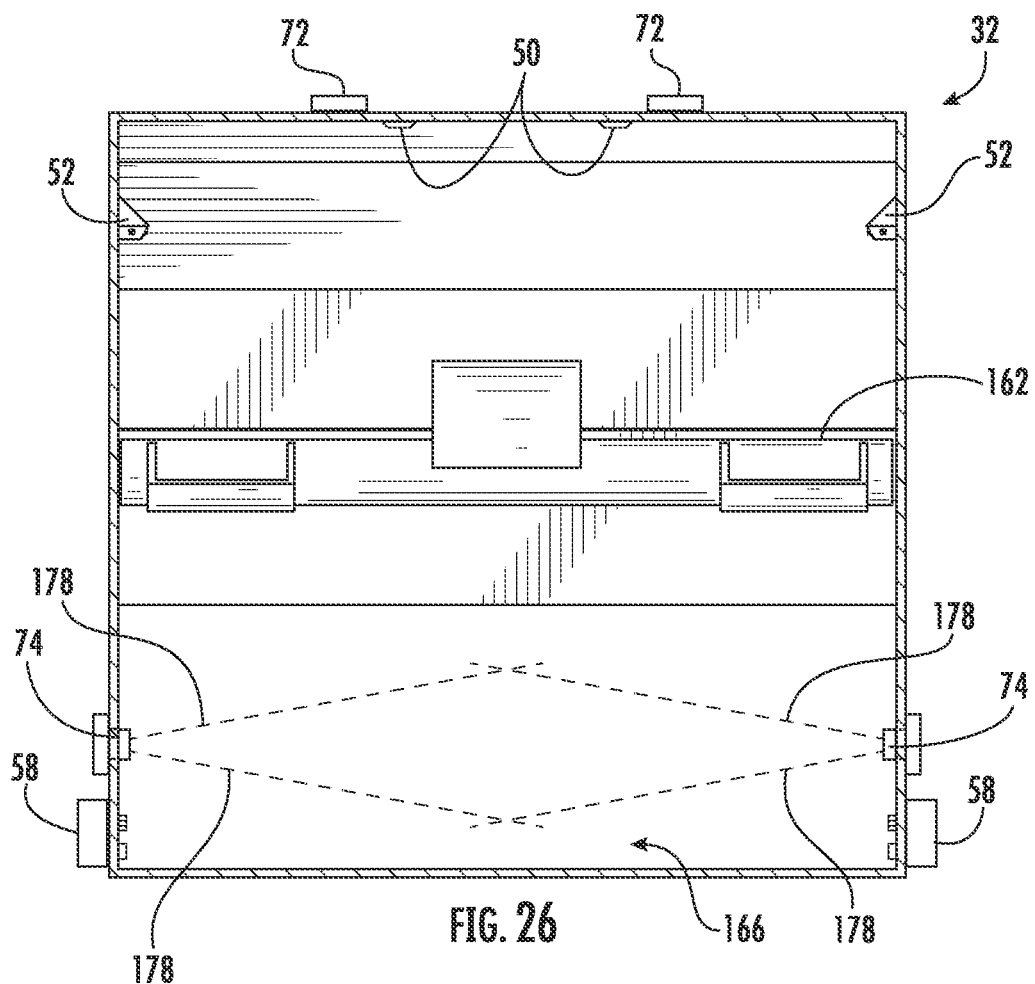
FIG. 26 is like FIG. 11, except, for example, that dashed lines schematically depict portions of optical detectors' fields of view, and feeder shafts are omitted in order to clarify the view, in accordance with the first embodiment.

As schematically depicted in FIG. 26, the lower-accumulator detectors 74 can be configured so that their respective fields of view 178 are within the interior space of the accumulator chamber. In FIG. 26, the feeder shafts 164 are omitted in order to more clearly depict the fields of view 178, which are schematically depicted by dashed lines (e.g., in an approximated manner). The fields of view 178 can extend at least partially convergently with respect to one another, be directed toward one another, overlap one another, and/or be coaxially aligned with one another. As another example, the fields of view 178 can each have a central axis extending outwardly from the respective lower-accumulator detectors 74, and these axes can extend convergently, or more specifically about coaxially, toward one another. Referring also to FIG. 10, the fields of view 178 can extend crosswise into the convergence area 172 in the respective portion of the harvester's material flow path.

Figure 27:
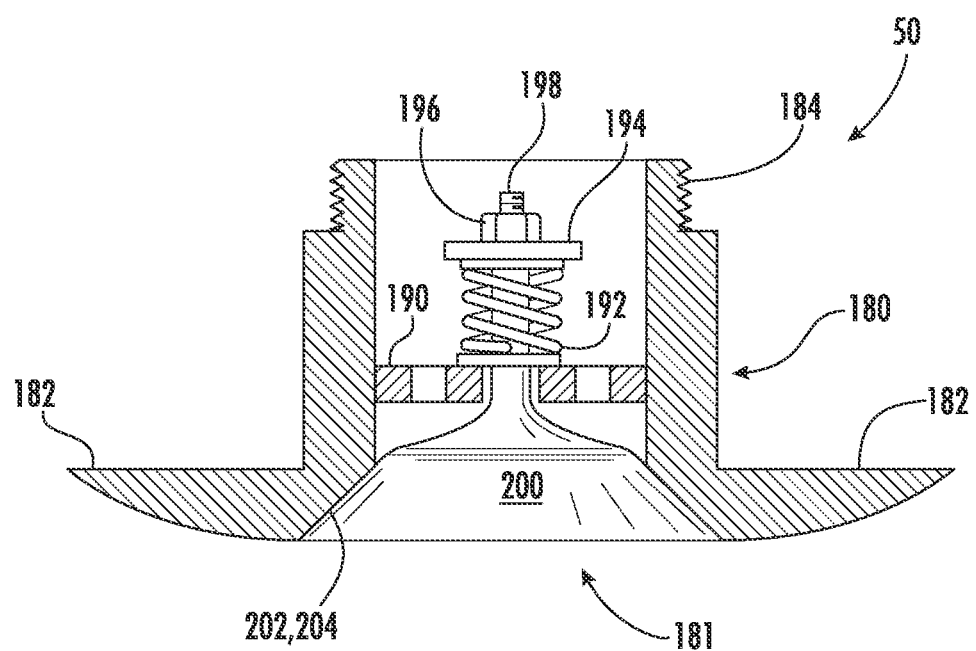
FIG. 27 is an isolated, partially cross-sectional view of a spray nozzle in its closed configuration, in accordance with the first embodiment.

Regarding features of the first embodiment accumulator-suppression subsystem, and as best understood with reference to FIG. 27, each of the upper-central accumulator-suppression nozzles 50 can be a plug nozzle. The example of the representative upper-central accumulator-suppression nozzle depicted in FIG. 27 has a tubular collar or outer nozzle body 180 and an inner plug body 181 movably mounted to the nozzle body. A lower end or lower portion of the nozzle body 180 can include, or have extending outwardly therefrom, an annular flange 182. The flange 182 can be about flush with the inner surface of the top wall panel of the accumulator chamber (e.g., the chamber of the accumulator 32). The upper end portion of the outer body 180 can be in the form of an externally-threaded nipple 184 and/or any other suitable fastening feature.

In the first embodiment, nozzle body 180 and the plug body 180, 181 are connected, or more generally mounted together, in a manner that allows for automatic relative movement therebetween, as will be discussed in greater detail below. More specifically, in the example of FIG. 27 the plug body 181 is movably mounted in the nozzle body 180 by way of a guide or guide plate 190, coil spring 192, washer 194, and threaded nut 196 or other suitable fastener(s). Alternatively, nozzle and plug bodies 180, 181 can be mounted together in any other suitable manner, for example in a manner that allows for the automatic relative movement between the nozzle and plug bodies, as will be discussed in greater detail below.

FIG. 27 is an isolated, front elevational view of a representative one of the central-upper accumulator-suppression nozzles 50 in its closed configuration, wherein the front half of each of the nozzle body 180 (including flange 182 and nipple 184) and the guide 190 are cut away to expose features that would otherwise be hidden from view. In the example of FIG. 27, the plug body 181 includes a shaft 198 extending from a head 200. The guide or guide plate 190 can be fixedly mounted within the internal passageway extending through the nozzle body 180 for guiding and supporting the shaft 198. In the first embodiment, the shaft 198 extends through a hole of two or more holes extending through the guide plate 190, and the shaft further extends through the coil spring 192 and washer 194. The nut 196 or other suitable fastener(s) can be connected to an end portion of the shaft 198, or in any other suitable configuration, so that the plug body 181 is pulled or biased inwardly relative to the outer body 180. The inward biasing typically causes sealing engagement (e.g., firm, face-to-face contact) between mutually configured, frustoconical seats 202, 204 respectively of the nozzle body 180 and head 200, as will be discussed in greater detail below.

Figure 28:
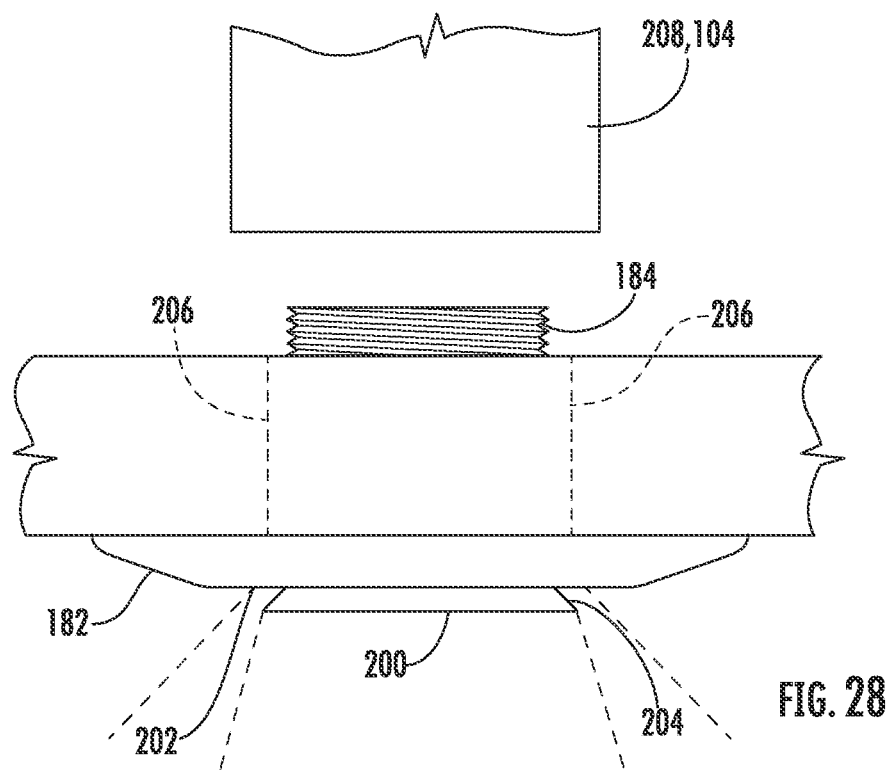
FIG. 28 depicts the spray nozzle of FIG. 27 in its opened configuration, and positioned in a hole in a top wall of the accumulator of the harvester of FIG. 1, wherein a portion of a pipe fitting is exploded away from a nipple of the spray nozzle, in accordance with the first embodiment.

FIG. 28 is a front elevational view of a representative one of the central-upper accumulator-suppression nozzles 50 in its open configuration and extending through a hole 206 in the respective panel of the top wall of the accumulator chamber. In the example of FIG. 28, a portion of a pipe fitting 208 of a respective leg of the upper piping system 104 is exploded away from the threaded nipple 184. The flange 182 and pipe fitting 208 can be wider than the hole 206 in the top wall of the accumulator chamber, so that when an internal screw thread of the pipe fitting 208 is securely fully engaged to the threaded nipple 184, the central-upper accumulator-suppression nozzle 50 is securely mounted to the top wall of the accumulator chamber. The lower ends of the first embodiment central-upper accumulator-suppression nozzles 50 can be flush, or about flush, with the inner side of the top wall panel of the accumulator chamber.

In the example of FIG. 17, the central-upper accumulator-suppression nozzles 50 (e.g., hidden from view in FIG. 17, but shown mounted in FIG. 13) are mounted to a central area of the top wall of the accumulator chamber at least partially by way of the respective pipe fitting 208 of the respective leg of the upper piping system 104 being connected (e.g., by screw thread) to the nipples 184. The connection between the central-upper accumulator-suppression nozzles 50 and the upper piping system 104 can be provided in any other suitable manner including one or more of pipes, pipe fittings, connectors, welds, and/or the like.

Referring mainly to FIG. 27, the central-upper accumulator-suppression nozzles 50, piping system 104, and accumulator-suppression pump 42 of the first embodiment are cooperatively configured so that, when the accumulator-suppression pump is operated to provide fire suppressant to the central-upper accumulator-suppression nozzles, the pressurized fire suppressant pushes on the upwardly-facing surface of the head 200 within the interior space of the nozzle body 180 with sufficient force to move the plug body 181 outwardly relative to the nozzle body. The plug body 181 moves a small distance outwardly relative to the nozzle body 180 so that a frustoconical gap becomes defined between the seats 202, 204, and the fire suppressant flows through the gap. This movement of the plug body 181 compresses the spring 192. When the accumulator-suppression pump 42 ceases to operate, the spring 192 expands to close the central-upper accumulator-suppression nozzle 50.

Figure 29:
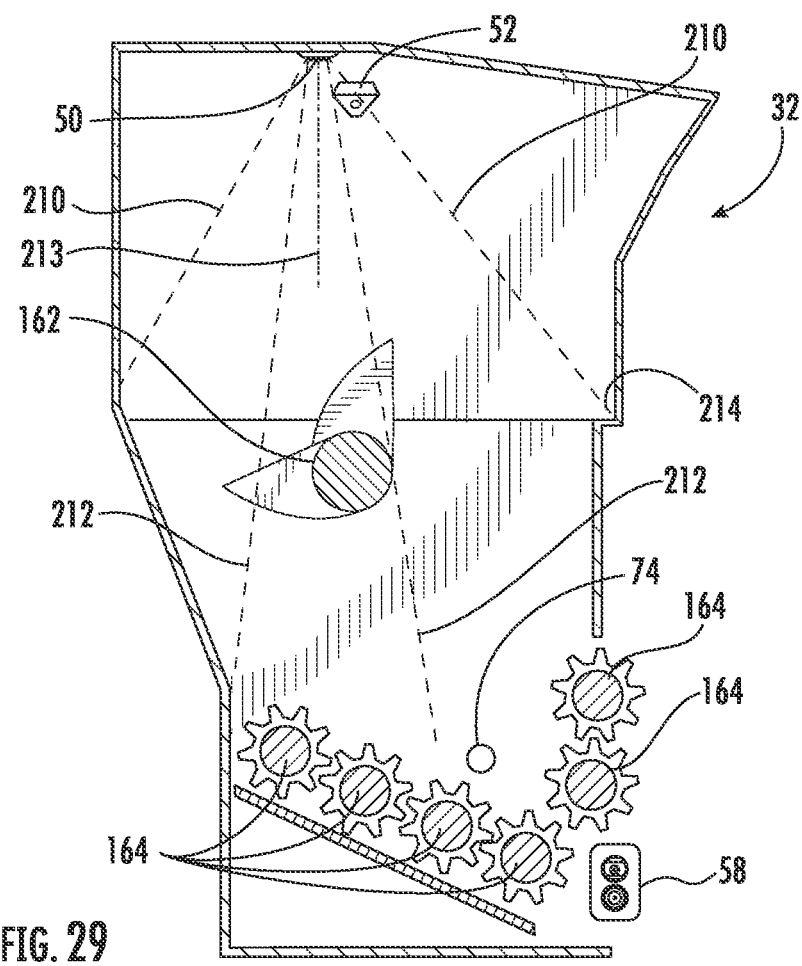
FIG. 29 is like FIG. 10, except, for example, that a portion of a spray pattern is schematically depicted by dashed lines, in accordance with the first embodiment.
Figure 30:
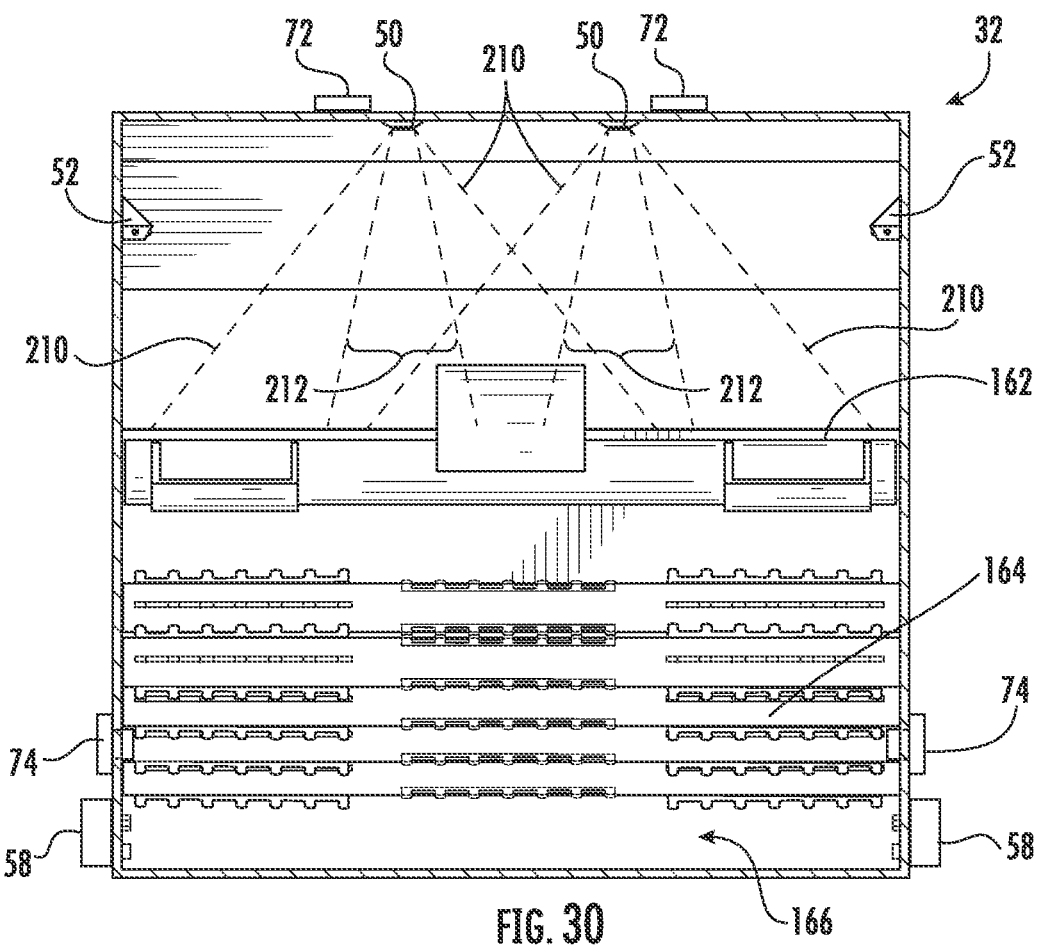
FIG. 30 is like FIG. 11, except, for example, that portions of spray patterns are schematically depicted by dashed lines, in accordance with the first embodiment.
Figure 31:
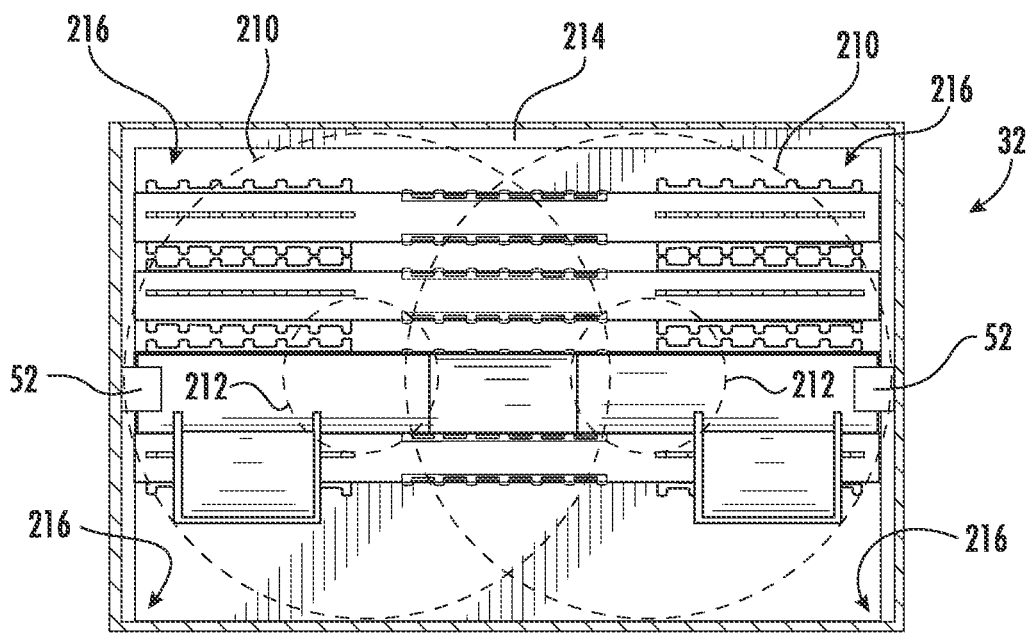
FIG. 31 is like FIG. 12, except, for example, that portions of spray patterns are schematically depicted by dashed lines, in accordance with the first embodiment.

Referring to FIGS. 28-31, in the first embodiment, each of the upper-central accumulator-suppression nozzles 50 (e.g., plug nozzles) is configured, when opened, to discharge the fire suppressant from the respective leg of the upper piping system 104 in the form of a downwardly directed, relatively wide angle, hollow-cone spray pattern. Each hollow-cone spray pattern from the central-upper accumulator-suppression nozzles 50 typically includes a conical outermost portion 210 of the spray pattern and a conical innermost portion 212 of the spray pattern. In FIGS. 28-31, portions of the conical outermost and innermost spray pattern portions 210, 212 are schematically depicted by dashed lines (e.g., in an approximated manner). As schematically depicted in FIG. 29 by dashed lines (e.g., in an approximated manner), the spray pattern portions 210, 212 can have a central discharge axis 213 extending outwardly from the respective central-upper accumulator-suppression nozzle 50. The discharge axes 213 of the two central-upper accumulator-suppression nozzles can extend downwardly and about parallel to one another.

Referring to FIGS. 28-31, at least the central-upper accumulator-suppression nozzles 50, piping system 104, and accumulator-suppression pump 42 can be configured so that the hollow-cone spray patterns 210, 212 from the central-upper accumulator-suppression nozzles 50 at least partially cover numerous features within the accumulator chamber, including, for example, at least portions of the front and rear walls of the accumulator chamber, at least portions of the mixing shaft 162, at least portions of the feeder shafts 164, and/or at least portions of one or more ledges 214 that may be present in, or otherwise associated with, one or more of the accumulator front and rear walls. In one aspect, the hollow-cone spray patterns 210, 212 provide the primary coverage for at least the upper interior space of the accumulator chamber. Conversely and in accordance with the first embodiment, at least the central-upper accumulator-suppression nozzles 50, piping system 104, and accumulator-suppression pump 42 can be configured so that the hollow-cone spray patterns 210, 212 from the central-upper accumulator-suppression nozzles 50 do not cover end portions of the ledges 214, and/or one or more of the upright corners or corner areas 216 (FIG. 31) respectively defined between the front, right, left and rear walls of the accumulator chamber, and/or one or more of the central areas encompassed by the innermost spray pattern portions 212.

Referring to FIGS. 13-16 and in accordance with the first embodiment, the upper-right nozzle assembly 52 depicted in FIGS. 13-16 is representative (e.g., in both configuration and function) of the upper-left nozzle assembly 52 (e.g., FIG. 11), except that their installed orientations are reversed as compared to one another. The upper-right nozzle assembly 52 includes a body 220 that can be generally in the form of an irregular block of metal, metallic alloy, and/or any other suitable materials. In the first embodiment, the body 220 includes a right surface 222, an upper left surface 224 extending obliquely downwardly from an upper edge of the right surface 222, an upper-front surface 226 extending perpendicularly from a front edge of the right surface 222 to a front edge of the upper-left surface, an upper-rear surface 228 extending perpendicularly from a rear edge of the right surface 222 to a rear edge of the upper-left surface 224, a lower surface 230 extending perpendicularly from a lower edge of the right surface 222, a lower-middle or lower-left surface 232 extending obliquely upwardly from a left edge of the lower surface 230 to a lower edge of the upper left surface 224, a lower-front surface 234 extending obliquely upwardly from a front edge of the lower surface 230 to respective edges of other of the surfaces of the body 220, and a lower rear surface 236 extending obliquely upwardly from a rear edge of the lower surface 230 to respective edges of other of the surfaces of the body 220. Each of the surfaces 222, 224, 226, 228, 230, 232, 234, 236 can be about planar.

In the first embodiment, the right surface 222 of the body 220 of the upper-right nozzle assembly 52 is connected to, and in opposing face-to-face relation or contact with, the interior surface of the right wall, or more specifically the interior surface of the right wall panel, of the accumulator chamber. In the first embodiment, the upper edge of the body upper-left surface 224 is positioned below, and spaced apart from, the upper wall of the accumulator chamber. As an example of a portion of a suitable connection between the upper-right nozzle assembly 52 and the right wall of the accumulator chamber, dashed lines in FIG. 16 schematically depict fastener parts comprising internally threaded bores 240 that extend through the body right surface 222 into the interior of the body 220. The bores 240 can respectively receive externally threaded fasteners (e.g., bolts) that extend through respective holes in the right wall of the accumulator chamber. Alternatively or additionally, connection between the accumulator-suppression nozzles 54, 56 or nozzle assemblies 52 and the accumulator chamber can be provided by way of suitable fasteners, frames, connectors, welds, and/or the like.

In the first embodiment, the body upper-left surface 224 is inclined downwardly (e.g., relative to the horizontal direction) toward a central area of the interior of the accumulator chamber at a sufficient angle in a manner that seeks to cause raw cotton, and any other associated material, that comes into contact with the upper-left surface 224 to slide downwardly and fall off of the upper-left surface 224. Similarly, the body lower-left, lower-front, and lower-rear surfaces 232, 234, 236 can be inclined (e.g., relative to the vertical direction), as will be discussed in greater detail below.

The upper-right nozzle assembly 52 of the first embodiment is further described in the following. As schematically depicted by dashed lines in FIG. 15, the body 220 includes an internal liquid distribution network including an upstream bore or passageway 242 connected to downstream bores or passageways 244. The upstream passageway 242 extends through the body right surface 222 into the interior of the body 220. The left, front and rear downstream passageways 244 respectively extend through the body lower-left, lower-front, and lower-rear surfaces 232, 234, 236 to an inner end portion of the upstream passageway 242.

Referring also to FIG. 3, the upper-right nozzle assembly 52 can be mounted to the right wall of the accumulator chamber. This mounted configuration can be at least partially provided by way of at least one pipe fitting 246 of the respective leg of the upper piping system 104 being connected (e.g., by screw thread) into the outer end of the body upstream passageway 242.

Referring to FIG. 15, the middle or left spray nozzle 54 can be connected to, and in fluid communication with, the left downstream passageway 244 of the body 220 by way of, for example, an externally threaded nipple (not shown) of the left spray nozzle 54 being connected (e.g., by screw thread) into the outer end of the left downstream passageway 244. Similarly, the front and rear spray nozzles 56 can be respectively connected to, and in fluid communication with, the forward and rearward downstream passageways 244 of the body 220 by way of, for example, externally threaded nipples (not shown) of the front and rear spray nozzles 56 being respectively connected (e.g., by screw thread) into the outer ends of the forward and rearward downstream passageways 244. Additionally or alternatively, the connections between the spray nozzles 52,54 and the upper piping system 104 can be provided in any other suitable manner including more of pipes, pipe fittings, connectors, welds, and/or the like.

Figure 32:
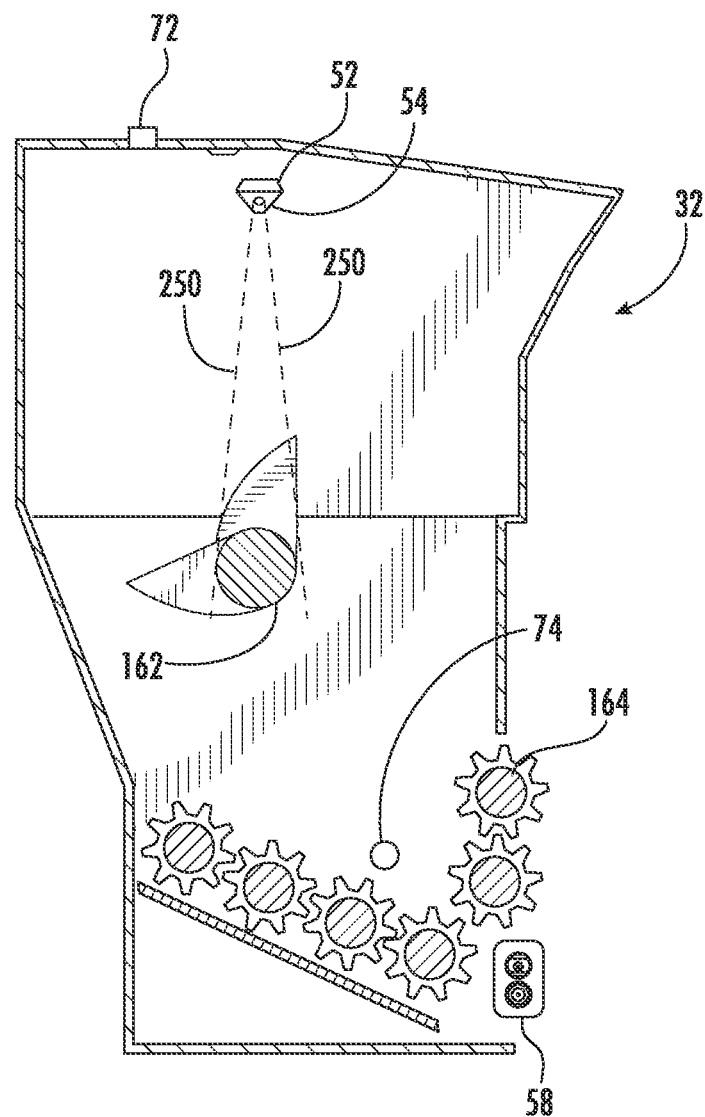
FIG. 32 is like FIG. 10, except, for example, that a portion of a spray pattern is schematically depicted by dashed lines, in accordance with the first embodiment.
Figure 33:
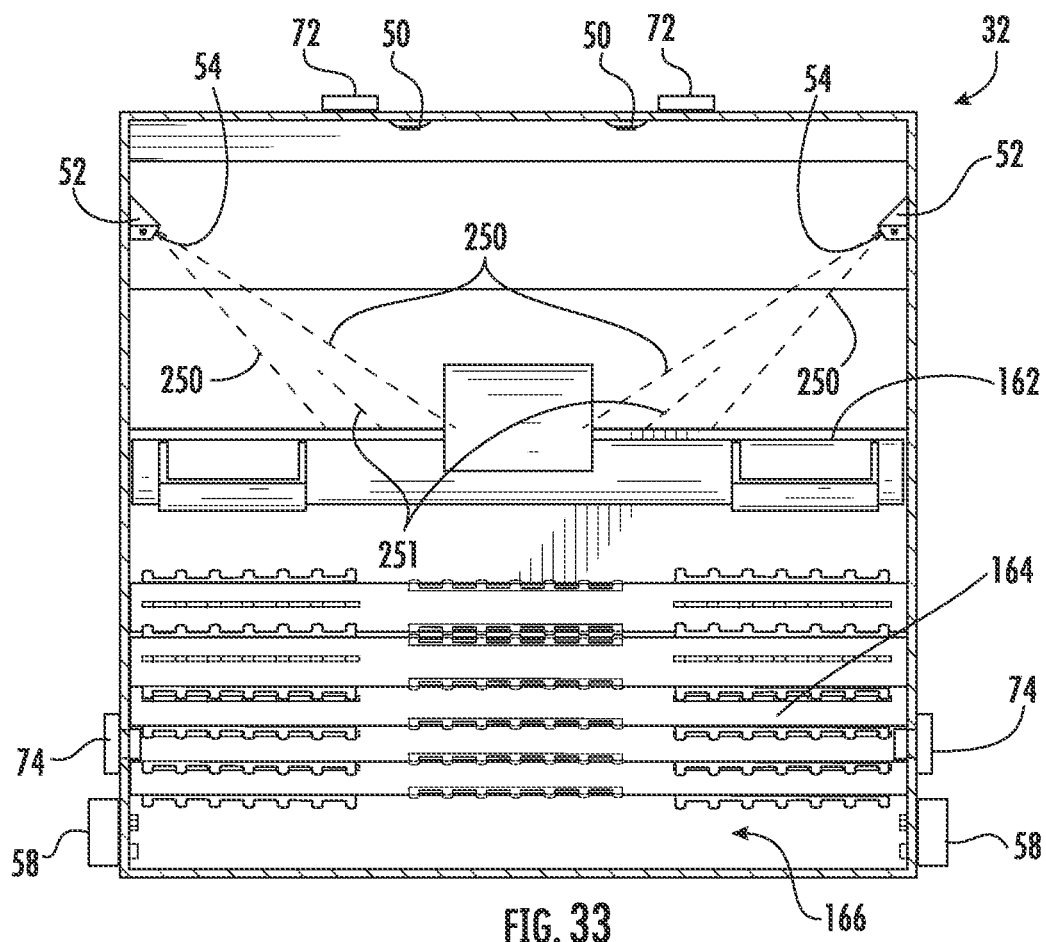
FIG. 33 is like FIG. 11, except, for example, that portions of spray patterns are schematically depicted by dashed lines, in accordance with the first embodiment.
Figure 34:
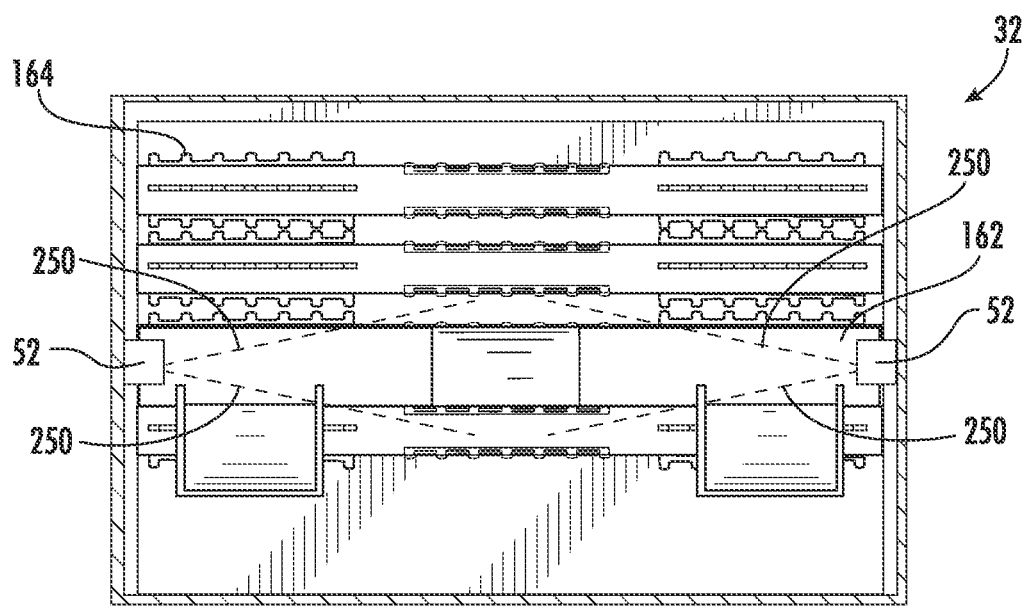
FIG. 34 is like FIG. 12, except, for example, that portions of spray patterns are schematically depicted by dashed lines, in accordance with the first embodiment.

Referring to FIGS. 32-34, in the first embodiment, the middle nozzles 54 of the upper nozzle assemblies 52 are configured to discharge the fire suppressant, which is supplied thereto under pressure from the respective leg of the upper piping system 104, in the form of a relatively large angle, solid-cone spray patterns 250. In FIGS. 32-34, portions of the solid-cone spray patterns 250 are schematically depicted by dashed lines (e.g., in an approximated manner). In the first embodiment, the middle nozzles 54 are mounted to the body 220 at the inclined lower-middle surfaces 232 (FIGS. 14-16) such that the central axes 251 (FIG. 33) of the solid-cone spray patterns 250 are downwardly inclined, and extend convergently with respect to one another.

At least the middle nozzles 54, bodies 220, piping system 104, and accumulator-suppression pump 42 can be cooperatively configured so that the solid-cone spray patterns 250 at least partially cover features within the accumulator chamber, including, for example, at least portions of the mixing shaft 162, and/or at least portions of the feeder shafts 164. The solid-cone spray patterns 250 can provide at least some secondary coverage for the interior space of the accumulator chamber, for example by covering at least some of the central areas that are encompassed by, but not covered by, the innermost spray pattern portions 212 (e.g., see FIG. 31). In the example of FIGS. 33 and 34, the respective components are configured so that the solid-cone spray patterns 250 extend at least partially convergently with respect to one another.

Figure 35:
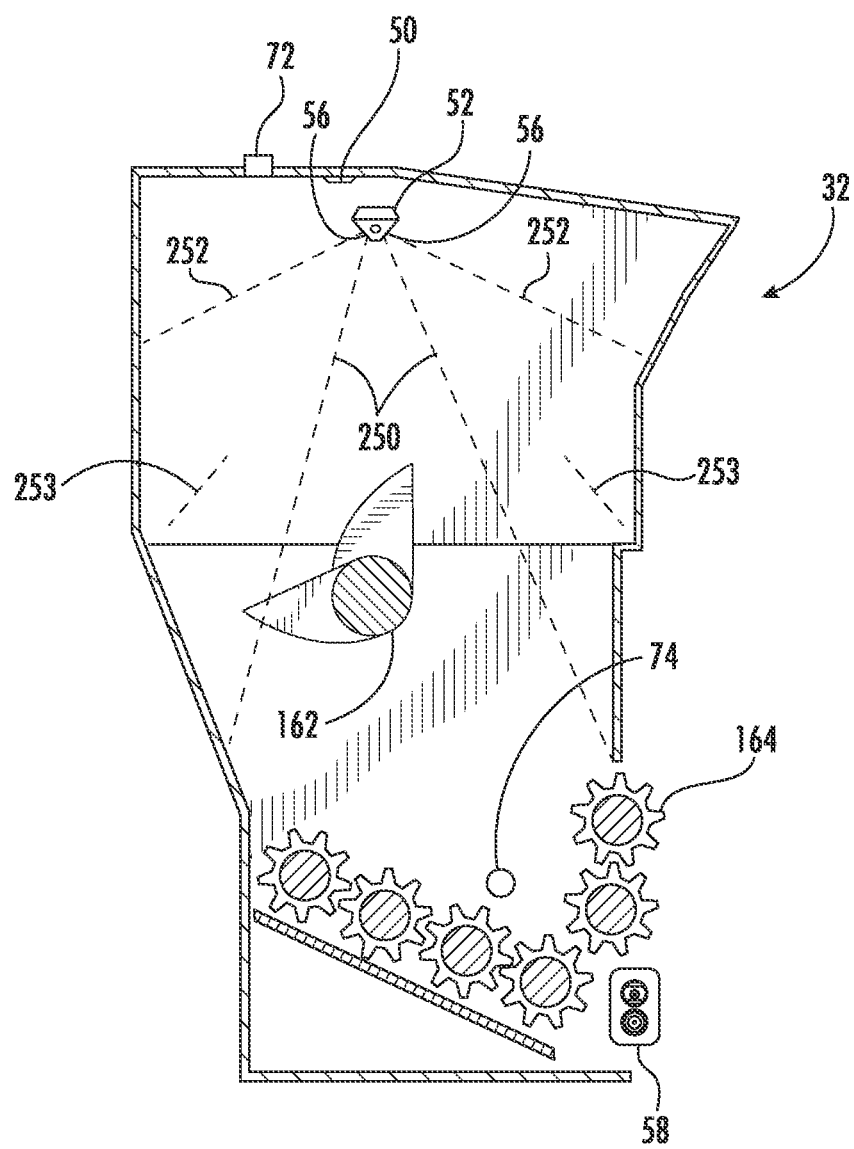
FIG. 35 is like FIG. 10, except, for example, that portions of spray patterns are schematically depicted by dashed lines, in accordance with the first embodiment.
Figure 36:
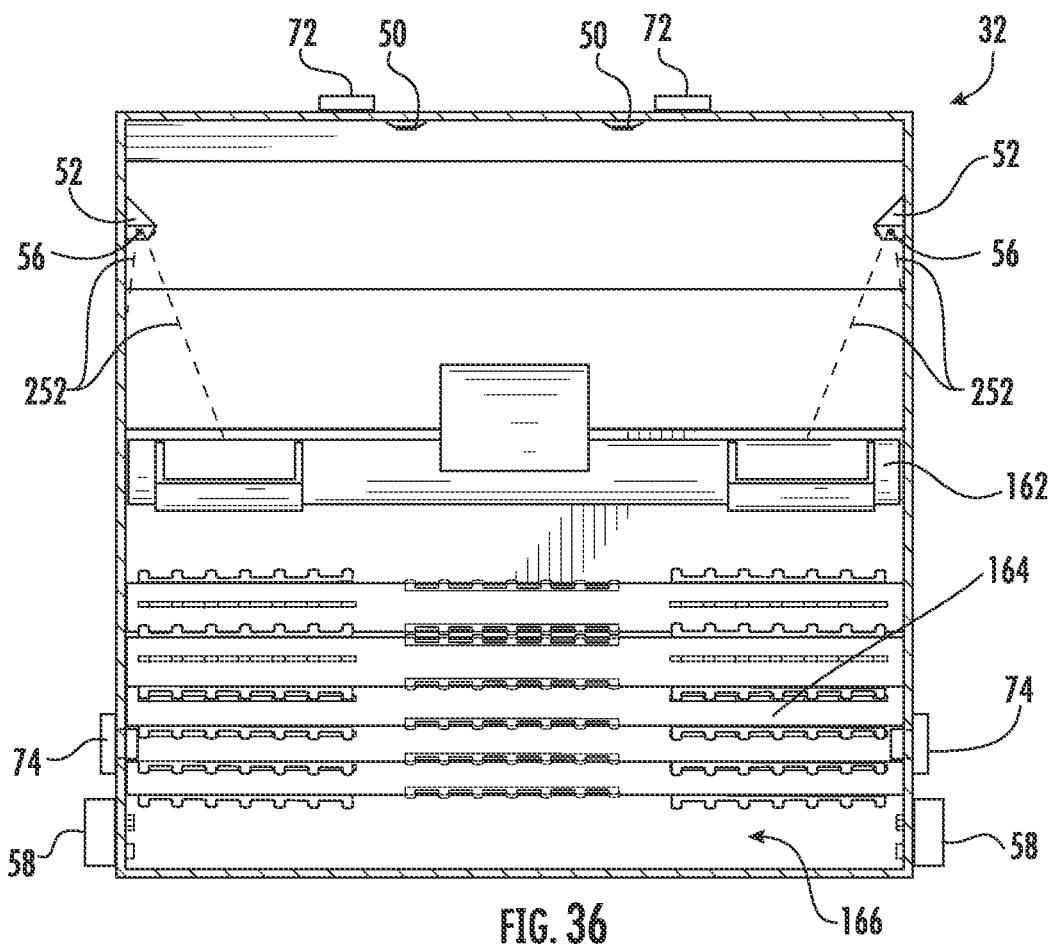
FIG. 36 is like FIG. 11, except, for example, that portions of spray patterns are schematically depicted by dashed lines, in accordance with the first embodiment.
Figure 37:
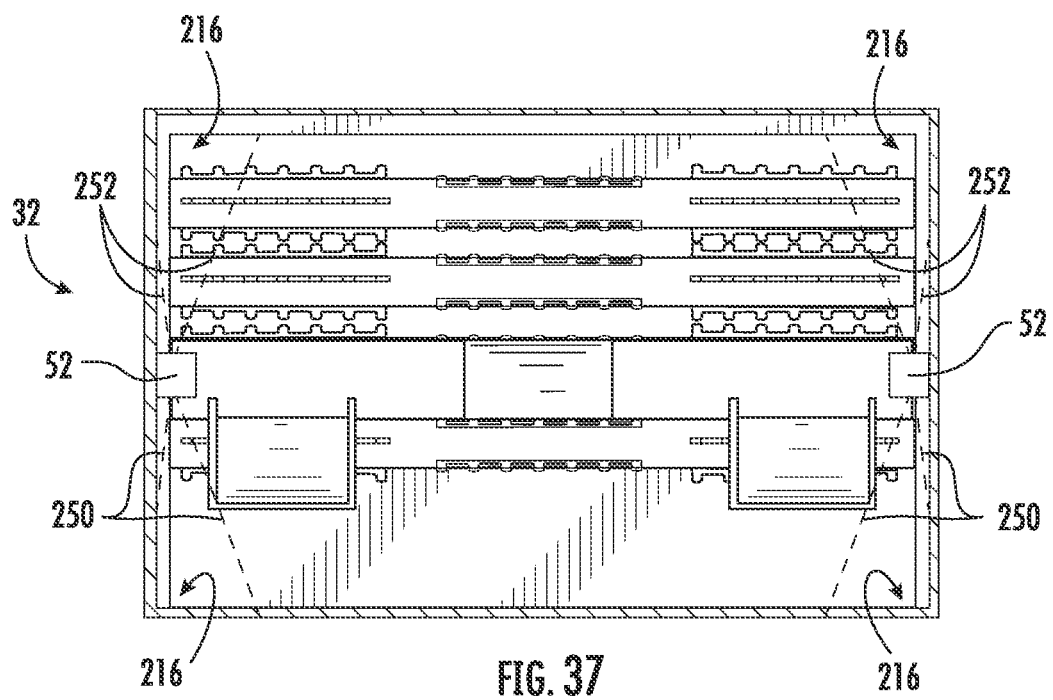
FIG. 37 is like FIG. 12, except, for example, that portions of spray patterns are schematically depicted by dashed lines, in accordance with the first embodiment.

Referring to FIGS. 35-37, in the first embodiment, the front and rear nozzles 56 of the upper nozzle assemblies 52 are configured to discharge the fire suppressant, which is supplied thereto under pressure from the respective legs of the upper piping system 104, in the form of a relatively narrow fan spray patterns 252. In FIGS. 35-37, portions of the fan spray patterns 252 are schematically depicted by dashed lines (e.g., in an approximated manner). In the first embodiment, the front and rear nozzles are respectively mounted to the body 220 at the inclined lower-front and lower-rear surface 234, 236 (FIGS. 14-16) such that the central axes 253 (FIG. 35) of the fan spray patterns 252 are downwardly inclined. In the example of FIGS. 14 and 16, the discharge ends of the front and rear nozzles 56 include grooves 245 configured to at least partially define the shape and orientation of the spray patterns 252, wherein the lengths of the grooves 245 extend upright, or more specifically vertically.

At least the front and rear nozzles 56, bodies 220, piping system 104, and accumulator-suppression pump 42 can be cooperatively configured so that the portions of the fan spray patterns 252 can at least partially cover predetermined features within the accumulator chamber. These predetermined features can include, for example, at least portions of the front and rear walls of the accumulator chamber, and/or at least portions of one or more ledges 214 that may be present in, or otherwise associated with, one or more of the accumulator front and rear walls. As a further example, the fan spray patterns 252 can provide at least some secondary coverage for the interior space of the accumulator chamber, for example by covering one or more of the end portions of the ledges 214, and/or one or more of the upright corners or corner areas 216 (FIG. 37) respectively defined between the front, right, left and rear walls of the accumulator chamber.

In the example of FIGS. 33 and 34, the upper nozzle assemblies 52 are mounted distantly from one another, or more specifically opposite from one another. In the example of FIGS. 35 and 37, the respective components are configured so that the fan spray patterns 252 (e.g., axes 253 schematically depicted in FIG. 35) originating from the same upper nozzle assembly 52 extend divergently with respect to one another. In contrast, the fan spray patterns 252 (e.g., their axes 253) originating from opposite upper nozzle assembly 52 can extend at least partially convergently with respect to one another.

Referring to FIG. 19 and in accordance with the first embodiment, the lower-right nozzle assembly 58 depicted in FIG. 19 is representative (e.g., in both configuration and function) of the lower-left nozzle assembly 58 (e.g., FIG. 11), except that their installed orientations are reversed as compared to one another. The lower-right nozzle assembly 58 includes a body 260 that can be generally in the form of a block of metal, metallic alloy, and/or any other suitable materials.

Figure 38:
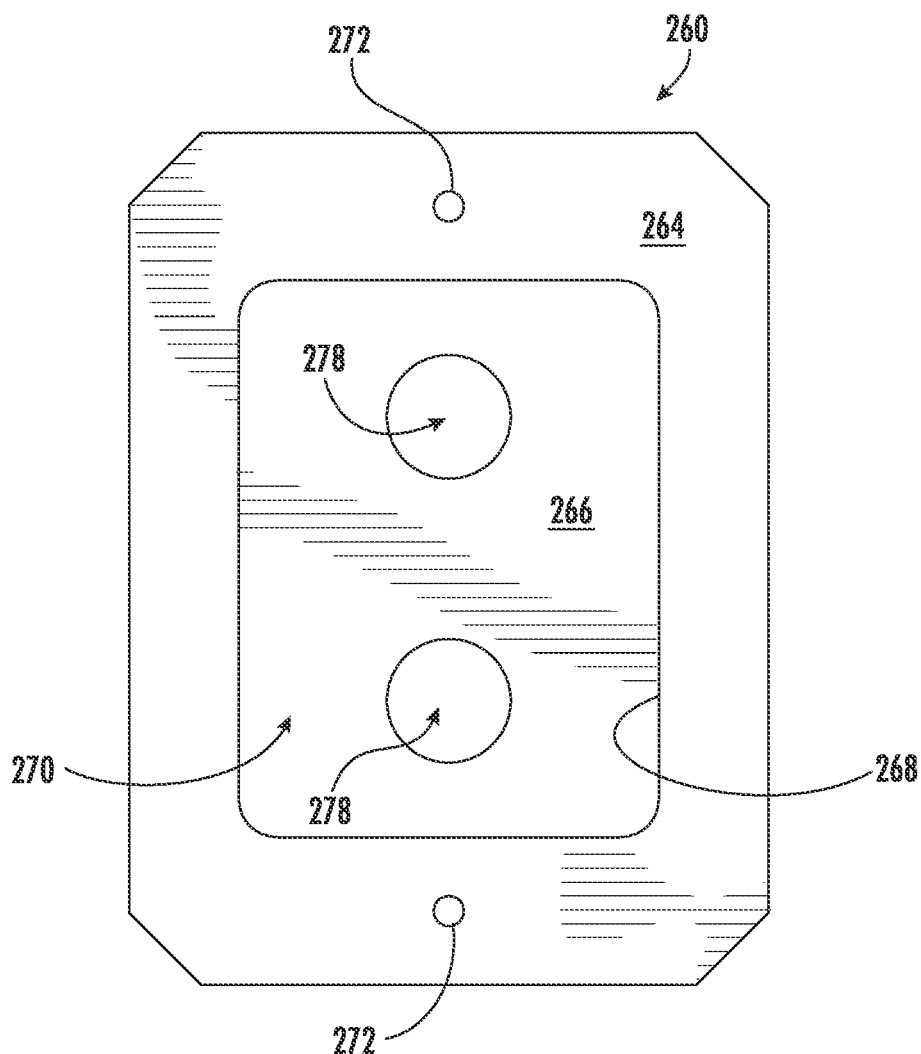
FIG. 38 is an isolated view of a body of the lower nozzle assembly of FIG. 19, in accordance with the first embodiment.

FIG. 38 is an isolated left elevation view of the body 260 of the lower-right nozzle assembly 58 of the first embodiment. In the example of FIGS. 19 and 38, the body 260 of the lower-right nozzle assembly 58 of the first embodiment includes a right surface 262, an outer left surface 264, a recessed left surface 266 (FIG. 38), and one or more surfaces, for example an annular surface 268, connecting an inner periphery of the outer left surface 264 to an outer periphery of the recessed left surface 266. At least the outer left surface 264 can be planar. In the first embodiment, the recessed left surface 266 and annular surface 268 (or one or more other suitable surfaces) define a hole or recess 270 configured to at least partially contain the lower accumulator-suppression nozzles 60, 62.

In the first embodiment, the left outer surface 264 of the body 260 of the lower-right nozzle assembly 58 is connected to, and in opposing face-to-face contact with, the outer surface of the right wall of the accumulator chamber. The lower edge of the left outer surface 264 can be positioned above the lower wall of the accumulator chamber. As an example of a portion of a suitable connection between the lower-right nozzle assembly 58 and the accumulator chamber, FIGS. 19 and 38 schematically depict fastener parts comprising internally threaded bores 272 that extend through the left outer surface 264 into the interior of the body 260. The bores 272 can respectively receive externally threaded fasteners (e.g., bolts) extending through respective holes in the right wall of the accumulator chamber. Alternatively or additionally, connection between the lower accumulator-suppression nozzles 60, 62 or nozzle assemblies 58 and the accumulator chamber can be provided by way of suitable fasteners, frames, connectors, welds, and/or the like.

In the first embodiment, when the body 260 of the lower-right nozzle assembly 58 is mounted to the right wall, or more specifically the right wall panel, of the accumulator chamber, the body recess 270 is open to the interior space of the accumulator chamber by way of at least one hole 274 (FIG. 18) extending through the right wall of the accumulator chamber. In the example of FIG. 18, the hole 274 (FIG. 18) is positioned between the accumulator discharge opening 166 and another hole (not shown) in the left right panel of the accumulator 32. This other hole (not shown) in the right wall panel of the accumulator 32 can be in receipt of a reduced diameter portion of the right end section of the lowest feeder shaft 164. Similarly for the first embodiment, when the body 260 of the lower-left nozzle assembly 58 is mounted to the outer surface of the left wall, or more specifically the left wall panel, of the accumulator chamber, the body recess 270 of the lower-left nozzle assembly is open to the interior space of the accumulator chamber by way of at least one hole (e.g., similar to hole 274 in FIG. 18) extending through the left wall panel of the accumulator chamber.

The lower-right nozzle assembly 58 of the first embodiment is further described in the following. As schematically depicted by dashed lines in FIG. 19, the body 260 includes an internal liquid distribution network including an upstream bore or passageway 276 connected to downstream bores or passageways 278. The upstream passageway 276 extends through the body right surface 262 into the interior of the body 260. The downstream passageways 278 extend through the recessed left surface 266 to an inner end portion of the upstream passageway 276.

Referring also to FIG. 3, liquid fire suppressant can be provided to the internal liquid distribution network of the body 260 by way of at least one pipe fitting 280 of the respective leg of the lower piping system 112 being connected (e.g., by screw thread) into the outer end of the body upstream passageway 276. In FIG. 3, a portion of the subject leg of the lower piping system 112 that includes the pipe fitting 280 is hidden from view behind a conventional panel of the harvester 10. Accordingly, the hidden portion of the leg of the lower piping system 112 and the pipe fitting 280 are schematically depicted by dashed lines in FIG. 3.

Referring to FIG. 19, the lower accumulator-suppression nozzles 60, 62 can be respectively connected to, and in fluid communication with, the upper and lower downstream passageways 278 of the body 260 by way of, for example, externally threaded nipples (not shown) of the lower accumulator-suppression nozzles 60, 62 being respectively connected (e.g., by screw thread) into the outer ends of the upper and lower downstream passageways 278. As a result, the lower accumulator-suppression nozzles 60, 62 are connected to (e.g., in fluid communication with) the lower piping system 112. Additionally or alternatively, the connections between the lower accumulator-suppression nozzles 60, 62 and the lower piping system 112 can be provided in any other suitable manner including one or more pipes, pipe fittings, connectors, welds, and/or the like. In the Example of FIG. 11, the discharge ends of the lower accumulator-suppression nozzles 60, 62 are depicted as protruding into the interior space of the accumulator chamber. In other examples, the discharge ends of the lower accumulator-suppression nozzles 60, 62 are at least partially recessed, for example they may be flush or further recessed, with respect to the inner surfaces of the accumulator's right and left side wall panels, respectively.

Figure 39:
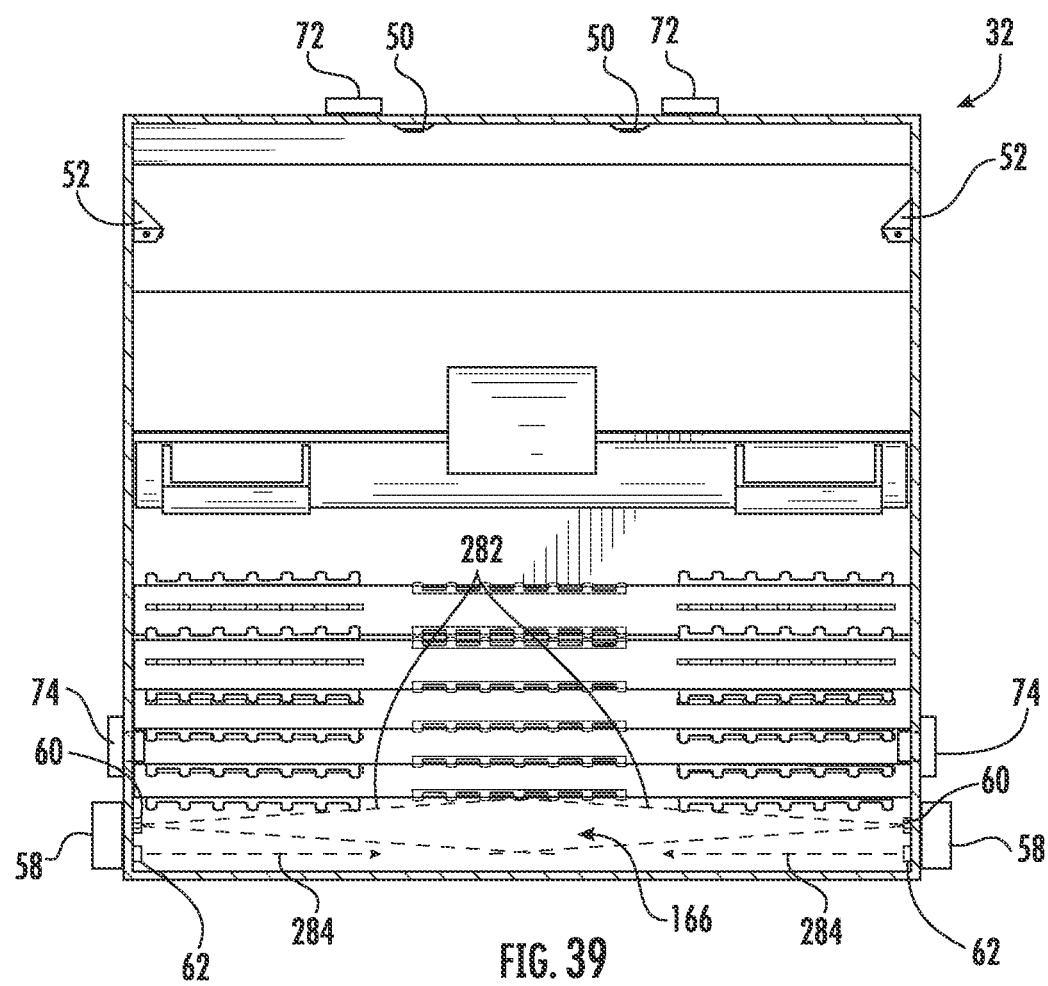
FIG. 39 is like FIG. 11, except, for example, that portions of spray patterns are schematically depicted by dashed lines, in accordance with the first embodiment.

Referring to FIG. 39, for each of the lower nozzle assemblies 58 of the first embodiment, the upper nozzle 60 is configured to discharge the fire suppressant in the form of a relatively narrow fan spray pattern 282, and the lower nozzle 62 is configured to discharge the fire suppressant in the form of a very narrow or near-zero angle spray pattern 284 (e.g., a blast spray pattern, or more specifically a tight blast pattern). In FIG. 39, portions of the narrow fan spray pattern 282 and blast spray pattern 284 are schematically depicted by dashed lines (e.g., in an approximated manner). The lowest feeder shaft 164 (e.g., see FIGS. 2, 10 and 18) is omitted from FIG. 39 in an effort to clearly depict the spray patterns 282, 284. In the example of FIGS. 10 and 19, the discharge ends of the upper nozzles 60 include grooves configured to at least partially define the shape and orientation of the spray patterns 282, wherein the lengths of the grooves extend crosswise to the upright or vertical direction, or more specifically the lengths of the grooves extend horizontally.

The first embodiment lower nozzle assemblies 58 are configured so that each of the narrow fan and blast spray patterns 282, 284 extend into a lower portion of the interior space of the accumulator chamber, or more specifically the portion of the interior space of the accumulator chamber that is positioned between the lowest feeder shaft 164 (FIGS. 2 and 18) and the discharge opening 166 (FIGS. 2 and 18) of the accumulator chamber. As best understood with reference to the examples of FIGS. 10 and 39, one or more of, and/or each of, the narrow fan and blast spray patterns 282, 284 extend into a lower portion of the interior space of the accumulator chamber, or more specifically crosswise into the feed path 174 portion of the harvester's material flow path.

In the example of FIG. 39, the lower nozzle assemblies 58 are mounted distantly from one another, or more specifically opposite from one another, so that the right and left narrow fan spray patterns 282 extend at least partially convergently with respect to one another, are directed toward one another, overlap one another, and/or are coaxially aligned with one another. As a more specific example, the fan spray patterns 282 can each have a central discharge axis extending outwardly from the respective lower spray nozzle 60, and these axes can extend convergently, or more specifically about coaxially, toward one another. Similarly, the right and left blast spray patterns 284 can extend at least partially convergently with respect to one another, be directed toward one another, overlap one another, and/or be coaxially aligned with one another. As a more specific example, the blast spray patterns 284 can each have a central discharge axis extending outwardly from the respective lower spray nozzle 62, and these axes can extend convergently, or more specifically about coaxially, toward one another. One or more of the narrow fan and blast spray patterns 282, 284 (e.g., their respective axes) can extend parallel to one another, as schematically depicted, for example, in FIG. 39.

The first embodiment accumulator-suppression subsystem is configured so each of the central-upper accumulator-suppression nozzles 50 has a higher flow rate of fire suppressant, and provides broader fire suppressant coverage, than each of the other accumulator-suppression nozzles 52, 54, 56, 58, 60, 62; and one or more of the other accumulator-suppression nozzles 52, 54, 56, 58, 60, 62 provide fire suppressant coverage that supplements (e.g., covers at least some different areas than) the fire suppressant coverage provided by the central-upper accumulator-suppression nozzles 50. In this regard, predetermined pairs of spray pattern central axes extending outwardly from the accumulator-suppression nozzles 50, 54, 56, 60, 62 can extend relative to one another in a variety of configurations, including convergently (e.g., coaxially), divergently, and/or crosswise (e.g., perpendicularly). As another example, predetermined pairs of spray pattern central axes extending outwardly from the accumulator-suppression nozzles 50, 54, 56, 60, 62 can extend along (e.g., parallel to) one another. Similarly, predetermined spray pattern central axes extending outwardly from the accumulator-suppression nozzles 50, 54, 56, 60, 62 can extend relative to respective features of the accumulator 32 (e.g., the lengthwise rotational axes of the mixing shaft 162 and feeder shafts 164) in a variety of configurations, including convergently, divergently, and/or crosswise (e.g., perpendicularly). As another example, predetermined spray pattern central axes extending outwardly from the accumulator-suppression nozzles 50, 54, 56, 60, 62 can extend along (e.g., parallel to) respective features of the accumulator 32 (e.g., the lengthwise rotational axes of the mixing shaft 162 and feeder shafts 164).

Referring to FIGS. 2 and 10, in the first embodiment of the feeding mode of operation of the accumulator 32, the feeder shafts 164 are operated so that the accumulated raw cotton is fed along the feed path 174 outwardly from the convergence area 172, through the accumulator discharge opening 166, and into an adjacent inlet opening of the module builder 34. A belt conveyor (not shown) or other suitable carrying device can extend along the portion of the feed path 174 that includes the accumulator discharge opening 166 and the inlet opening of the module builder 34, for carrying the raw cotton into an interior space of a chamber of the module builder 34. In the first embodiment, the module builder 34 is a baler 34 configured to form the raw cotton into cylindrical bales 336 (FIG. 2). Accordingly, in the first embodiment, the raw cotton travels along the feed path 174 into an interior space of the baler chamber (e.g., the chamber of the module builder 34).

Referring to FIG. 1, the first embodiment baler 34 includes a baler forward housing 320 pivotably connected to the chassis of the harvester 10, and a baler rearward housing 326 (e.g., discharge gate) pivotably connected to the baler forward housing. The baler forward housing 320 can be mounted for pivoting vertically about a horizontal pivot axis relative to the chassis, wherein this pivoting can be part of transitioning between the above-discussed harvesting and transport configurations. The discharge gate or baler rearward housing 326 can be mounted for pivoting vertically about a horizontal pivot axis relative to the baler forward housing 320. In one mode of operation, the pivoting of the baler rearward housing 326 can be part of transitioning between the harvesting and transport configurations. Configuring into the transport configuration can include relative pivoting between the forward and rearward baler housing 320, 326 (e.g., similar to opening a "clam shell container") such that the baler 34 is reconfigured into a lowered configuration (not shown). In another mode of operation, the pivoting of the baler rearward housing 326 can at least partially facilitate discharging of a bale 336 (FIG. 2) from the baler 34, as will be discussed in greater detail below.

The baler forward housing 320 can include spaced apart right and left side walls between which a forward portion of the interior of the baler chamber is defined. Similarly, the baler rearward housing 326 (e.g., gate) can include spaced apart right and left side walls between which a rearward portion of the interior of the baler chamber is defined. One or more hydraulic cylinders (not shown) connected to the side walls of the baler rearward housing 226 can be selectively operable for moving the baler rearward housing between its pivoted positions, including a lowered baling position and an opened discharge position.

The first embodiment baler 34 is of a variable chamber design and, thus, includes a plurality of longitudinally extending side-by-side belts 332 supported on a plurality of rollers 334 positioned between the side walls of the baler forward and rearward housings 320, 326. One or more of the rollers can be driven by one or more hydraulic motors, or other suitable mechanisms, so that the baler belts 332 are driven about a central area of the interior of the baler chamber.

In the first embodiment, when the accumulator 32 is supplying raw cotton to the operating baler 34, the raw cotton is rolled up in a spiral fashion in a nip formed between oppositely moving adjacent loops of the baler belts 332 to form the bale 336. The space between adjacent loops of the baler belts 332 grows as the forming bale 336 grows larger. The accumulator 32 can be configured to provide enough raw cotton to the baler 34 so that each bale 336 has a maximum predetermined diameter, for example a diameter of about five feet, about seven and a half feet, about eight feet, or any other suitable size. FIG. 2 depicts the predetermined maximum size of the bale 336 of the first embodiment.

The baler 34 can include a conventional bale wrapping apparatus 240 configured to operate in conjunction with the baler belts 332 to wrap the formed bale 336 in a web of material, for example polymeric film or other suitable material, before the bale is discharged from the baler. After the bale 336 is wrapped, the baler gate or rearward housing 326 can be pivoted open so that the wrapped bale is delivered onto the extended unloader 36. Then, the baler gate or rearward housing 226 can be closed, and the next bale 336 can be formed and wrapped.

The unloader 36 can be pivotably mounted to the frame of the harvester 10, and be connected to one or more hydraulic cylinders (not shown) configured for pivoting the unloader between its respective positions. The unloader 36 can be pivoted to a lower position to deposit a bale 336 onto the ground behind the harvester 10. One or more of U.S. Pat. Nos. 6,941,740, 7,631,716, 8,925,287, and 10,034,433; and U.S. Pat. Pub. 2018/0242527 are believed to disclose examples of suitable balers 34, wrapping apparatuses 340, unloaders 36, and/or other associated features.

Referring to FIGS. 20 and 21, the first embodiment baler-suppression subsystem includes one or more of the lower baler nozzles 64, or one or more lower nozzle assemblies 350, mounted to the baler forward housing 320. In the first embodiment, there are lower-right and lower-left baler nozzles 64 respectively mounted to the right and left side walls of the baler forward housing 320. More specifically, there can be lower-right and lower-left baler nozzle assemblies 350 respectively mounted to the right and left side walls of the baler forward housing 320.

The lower-right nozzle assembly 350 depicted in FIG. 21 can be representative (in both configuration and function) of the lower-left nozzle assembly 350, except that their installed orientations are reversed as compared to one another. FIG. 21 is an isolated, left pictorial view of the lower-right nozzle assembly 350 of the first embodiment. The first embodiment lower-right nozzle assembly 350 includes a body 352 that can be generally in the form of a plate of metal, metallic alloy, and/or any other suitable materials. The body 352 of the lower-right nozzle assembly 58 of the first embodiment includes opposite right and left surfaces 354, 356.

The body 352 of the lower-right nozzle assembly 350 can be connected to the right wall of the baler forward housing 320 so that at least a portion of the left surface 356 of the body 352 is in opposing face-to-face relation with (and optionally also opposing face-to-face contact with) the outer surface of the right wall, or more specifically the right wall panel, of the baler forward housing. The lower edge of the left surface 356 of the body 352 can be positioned above a lower wall of the baler forward housing 320. As an example of a portion of a suitable connection between the lower-right nozzle assembly 350 and the baler forward housing 320, FIG. 21 depicts that the lower-right nozzle assembly 350 includes fastener parts comprising internally threaded bores, wherein these bores can be defined by the body 352 and/or by fastener nuts 358. The fastener nuts 358 can be fixedly mounted to the body 352 by way of welds and/or any other suitable connection. The threaded bores (e.g., of the mounting nuts 358) can respectively receive externally threaded fasteners (e.g., bolts) extending through respective holes in the right wall, or more specifically the right wall panel, of the baler forward housing 320. Holes in the body 352 can be respectively aligned with the threaded bores of the nuts 358. Alternatively or additionally, connection between the lower nozzle assemblies 350 and the baler forward housing 320 can be provided by way of suitable fasteners, frames, connectors, welds, and/or the like.

As an example of a portion of a suitable connection between the lower-right baler-suppression nozzle 64 and the respective body 352, FIG. 21 depicts that the lower-right nozzle assembly 350 includes another fastener part comprising an internally threaded bore, wherein this bore can be defined by the body 352 and/or by a fastener nut 360. The fastener nut 360 can be fixedly mounted to the body 352 by way of welds and/or any other suitable connection. A hole in the body 352 can be aligned with the threaded bore of the nut 360. The lower-right baler-suppression nozzle 64 can be connected to the respective threaded bore of the lower-right nozzle assembly 350 (e.g., the nut 360) by way of an externally threaded nipple (not shown) of the lower-right baler-suppression nozzle 64. The externally threaded nipple of the lower-right baler-suppression nozzle 64 can be connected (e.g., by screw thread) into the respective threaded bore of the lower-right nozzle assembly 350 (e.g., the nut 360), so that the threaded nipple of the lower-right baler-suppression nozzle 64 extends through, and protrudes from, the hole in the body 352 that is aligned with the threaded bore of the nut 360. Alternatively or additionally, connection between the lower baler nozzles 64 and the baler forward housing 320 can be provided by way of suitable fasteners, frames, connectors, welds, and/or the like.

Liquid fire suppressant can be provided to the lower baler-suppression nozzles 64 by way of pipe fittings of respective legs of the piping system 114 being connected (e.g., by screw thread) to the externally threaded nipples of the lower-right baler-suppression nozzles 64. Additionally or alternatively, the connections between the lower baler-suppression nozzles 64 and the piping system 114 can be provided in any other suitable manner including pipes, pipe fittings, connectors, welds, and/or the like. In the Example of FIG. 20, the discharge ends of the lower baler-suppression nozzles 64 are depicted as protruding into the interior space of the baler chamber (e.g., the chamber of the module builder 34). In other examples, the discharge ends of the lower baler-suppression nozzles 64 are at least partially recessed, for example they may be flush or further recessed, with respect to the inner surfaces of the right and left side wall panels of the baler 34.

Referring to FIG. 20, the lower baler-suppression nozzles 64 of the first embodiment are configured to discharge the fire suppressant as fog and/or mist into the interior space of the baler chamber (e.g., the chamber of the module builder 34). The fog and/or mist can be discharged from the lower baler-suppression nozzles 64 in a conical pattern, although the conical shape may exist only in relatively close proximity to the lower baler-suppression nozzles 64 due to the relatively small particle size of the fog and/or mist. Portions of the initial conical fog and/or mist pattern 363 discharged from the lower baler-suppression nozzles 64 are schematically depicted by stippling in FIG. 20. As schematically depicted in FIG. 20 by dashed lines (e.g., in an approximated manner), each fog and/or mist pattern 363 can have a central discharge axis 366 extending outwardly from the respective lower baler-suppression nozzle 64. The discharge axes 366 can extend convergently, or more specifically about coaxially, toward one another.

Figure 22:
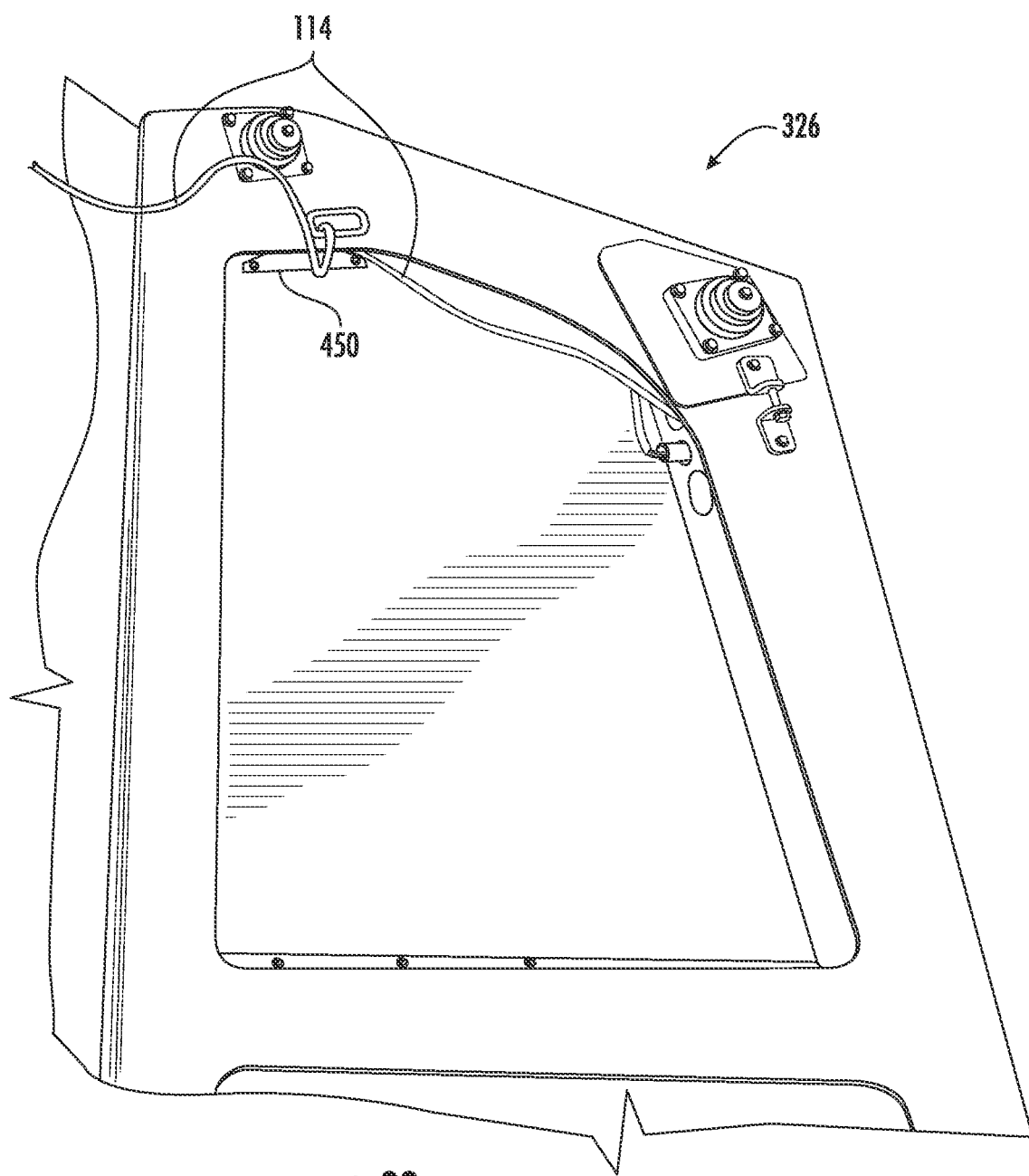
FIG. 22 is a right pictorial view of an outer portion of the module builder of the harvester of FIG. 1, when a left pictorial view of a similar outer portion of the module builder can be substantially similar to FIG. 22.

Referring to FIGS. 22 and 23, the first embodiment baler-suppression subsystem includes one or more of the upper baler nozzles 66, or one or more upper nozzle assemblies 450, mounted to the baler rearward housing 420. In the first embodiment, there are upper-right and upper-left baler nozzles 66 respectively mounted to the right and left side walls of the baler rearward housing 420. More specifically, there can be upper-right and upper-left baler nozzle assemblies 450 respectively mounted to the right and left side walls of the baler rearward housing 420.

The upper-right nozzle assembly 450 depicted in FIG. 23 can be representative (in both configuration and function) of the upper-left nozzle assembly 450, except that their installed orientations are reversed as compared to one another. FIG. 23 is an isolated, left pictorial view of the upper-right nozzle assembly 450 of the first embodiment. In the first embodiment, the upper-right nozzle assembly 450 is like the lower-right nozzle assembly 350 (FIG. 21), except for variations noted and variations that will be apparent to those of ordinary skill in the art. Accordingly, reference numerals for most features of the upper-right nozzle assembly 450 have been incremented by one hundred as compared to the corresponding features of the lower-right nozzle assembly 350.

The body 452 of the upper-right nozzle assembly 450 can be connected to the right wall of the baler rearward housing 420 so that at least a portion of the left surface 456 of the body 452 is in opposing face-to-face relation with (and optionally also opposing face-to-face contact with) the outer surface of the right wall, or more specifically the right wall panel, of the baler rearward housing, so that the upper edge of the left surface 456 is positioned below an upper wall of the baler rearward housing. The threaded bores (e.g., of the mounting nuts 458) of the upper-right nozzle assembly 450 can respectively receive externally threaded fasteners (e.g., bolts) extending through respective holes in the right wall, or more specifically the right wall panel, of the baler rearward housing 420. Holes in the body 452 can be respectively aligned with the threaded bores of the nuts 458. Alternatively or additionally, connection between the upper nozzle assemblies 450 and the baler rearward housing 420 can be provided by way of suitable fasteners, frames, connectors, welds, and/or the like.

The upper-right baler-suppression nozzle 66 can be connected to the respective threaded bore of the upper-right nozzle assembly 450 (e.g., the nut 460) by way of an externally threaded nipple (not shown) of the upper-right baler-suppression nozzle 66. The externally threaded nipple of the upper-right baler-suppression nozzle 66 can be connected (e.g., by screw thread) into the respective threaded bore of the upper-right nozzle assembly 450 (e.g., the nut 460), so that the threaded nipple of the upper-right baler-suppression nozzle 66 extends through, and protrudes from, the hole in the body 452 that is aligned with the threaded bore of the nut 460. Alternatively or additionally, connection between the upper baler nozzles 66 and the baler rearward housing 320 can be provided by way of suitable fasteners, frames, connectors, welds, and/or the like.

Liquid fire suppressant can be provided to the upper baler-suppression nozzles 66 by way of pipe fittings of respective legs of the piping system 114 being connected (e.g., by screw thread) to the externally threaded nipples of the upper-right baler-suppression nozzles 66. Additionally or alternatively, the connections between the upper baler-suppression nozzles 66 and the piping system 114 can be provided in any other suitable manner including pipes, pipe fittings, connectors, welds, and/or the like. The discharge ends of the right and left upper baler-suppression nozzles 66 protrude into the interior space of the baler chamber (e.g., the chamber of the module builder 34). In other examples, the discharge ends of the upper baler-suppression nozzles 66 are at least partially recessed, for example they may be flush or further recessed, with respect to inner surfaces of the right and left side wall panels of the baler 34.

The upper baler-suppression nozzles 66 of the first embodiment are configured to discharge the fire suppressant as fog and/or mist into the interior space of the baler chamber (e.g., the chamber of the module builder 34). The fog and/or mist can be discharged from the upper baler-suppression nozzles 66 in a conical pattern, although the conical shape may exist only in relatively close proximity to the upper baler-suppression nozzles 66 due to the relatively small particle size of the fog and/or mist. Similarly to the lower baler-suppression nozzles 64, the fog and/or mist patterns of the upper baler-suppression nozzles 66 can each have a central discharge axis extending outwardly from the respective upper baler-suppression nozzle. The discharge axes of the upper baler-suppression nozzles 66 can extend convergently, or more specifically about coaxially, toward one another. In the first embodiment, the baler-suppression subsystem is configured to operate so that the liquid fire suppressant discharged from the baler-suppression nozzles 64, 66 consists of, or consists essentially of, fog and/or mist.

FIG. 2 depicts an example of a predetermined maximum size of a bale 336 created by the first embodiment baler 34. The example of FIG. 2 further depicts that the baler-suppression nozzles 64, 66 are positioned radially outwardly (e.g., relative to the central (e.g., rotational) axis of the bale 336) from the cylindrical periphery of the bale (e.g., module), so that the fog and/or mist spray patterns (e.g., see patterns 363 in FIG. 20) are positioned radially outwardly from the cylindrical periphery of the bale. This arrangement seeks to allow the fog and/or mist from the baler-suppression nozzles 64, 66 to be distributed throughout the otherwise unoccupied interior space of the baler chamber, to at least partially envelope the module (e.g., bale 336) in the fog and/or mist of the fire suppressant. More generally, the baler-suppression nozzles 64, 66 can be positioned outwardly from the baler chamber's central area in which the bale 336 or other suitable module is formed, so that the fog and/or mist spray patterns are positioned outwardly from the baler chamber's central area in which the bale or other module is formed. Also, the baler-suppression nozzles 64, 66 can be positioned in proximity to respective baler belts 332 so that the traveling baler belts entrain the fog and/or mist from the baler-suppression nozzles 64, 66 in a manner that seeks to cause the fog and/or mist to be distributed throughout the otherwise unoccupied interior space of the baler chamber. In the example of FIG. 2, the baler-suppression nozzles 64, 66 are positioned proximate adjacent sections of the baler belts 332 so that the spray patterns of fog and/or mist from the suppression nozzles 64, 66 can extend into gaps defined between adjacent sections of the baler belts 332.

The first embodiment baler-suppression subsystem is configured so predetermined pairs of fog and/or mist spray pattern central axes extending outwardly from the baler-suppression nozzles 64, 66 can extend convergently (e.g., coaxially) with respect to one another. As another example, predetermined pairs of fog and/or mist spray pattern central axes extending outwardly from the baler-suppression nozzles 64, 66 can extend along (e.g., parallel to) one another. As a further example, the fog and/or mist spray pattern central axes extending outwardly from the baler-suppression nozzles 64, 66 can extend along (e.g., parallel to) respective features of the accumulator 32 (e.g., the lengthwise rotational axes of the rollers 334) and/or crosswise to (e.g., perpendicularly to) respective features of the accumulator 32 (e.g., the lengths and direction of travel of the belts 332).

Regarding conventional features of the harvester 10, for facilitating conventional operations of the harvester, the harvester can include a conventional controller or digital computer (not shown) including, for example, one or more of each of a central processing unit or processor, computer hardware integrated circuits or memory, data storage, and/or equipment interfaces. For example, one or more of the equipment interfaces of the conventional controller or computer can be operatively associated with sensors, switches, and other features for facilitating conventional operation of the harvester 10. As another example, one or more of the equipment interfaces of the conventional controller or computer can be operatively associated with one or more user interfaces configured to allow a user to enter commands and information into the conventional controller or computer, and configured to allow the conventional controller or computer to output information to the user. For example, the input-type feature(s) of the user interfaces can include a keyboard, a cursor control device (e.g., a mouse), a visual display with touch functionality (e.g., capacitive or other sensors that are configured to detect physical contact), and/or any other suitable devices. As additional examples, the output-type feature(s) of the user interfaces can include a display device (e.g., a monitor or projector), speaker, and/or any other suitable devices. The conventional controller can be in the form of a distributed computing system; therefore, the features of the conventional controller can be spread between separate computers.

The first embodiment harvester 10 can operate in a conventional manner to harvest cotton plant material and any associated debris, clean raw cotton therefrom, and discharge the raw cotton in bales 336. During this process, flammable debris can accumulate outside of the harvester's material flow path. For example, debris can pass outwardly through the grating 138, 160 (FIGS. 2, 4, 13, and 17) and accumulate on exposed upper surfaces of the harvester 10 (e.g., on the deck).

As an example, occasionally the rotating machinery in the harvesting apparatus 20 and/or field cleaner 28 may engage any rocks, scraps of metal, and/or any other types of debris that is contained in the harvester's material flow path. Any such engagement may create sparks such that sparks or embers may be entrained in the harvester's material flow path. The sparks and embers may interact with harvested plant material in the harvester's material flow path and cause a fire therein. As a more specific example, the sparks and embers may interact with harvested plant material in the accumulator chamber (e.g., the chamber of the accumulator 32), and cause a fire therein. The fire may spread to other areas of the harvester 10, for example to the raw cotton in the baler chamber (e.g., the chamber of the module builder 34). As an example of an external fire, flammable debris accumulated on exposed upper surfaces of the harvester 10 (e.g., the deck 14), or around the harvester, may catch on fire. An external fire may result from sparks or embers passing outwardly through the grating 138, 160 (FIGS. 2, 4, 13, and 17) and falling upon any debris accumulated on exposed upper surfaces of the harvester 10 (e.g., the deck 14). As additional examples, it is believed that sparks, embers, and/or fires in harvesters may result from a variety of other causes including equipment malfunction, lightening strikes, static electricity, or the like.

The first embodiment accumulator-suppression subsystem is configured to at least partially control and/or suppress sparks, embers, and/or flames in the accumulator chamber by discharging fire suppressant from the accumulator-suppression nozzles 50, 54, 56, 60, 62 in response to operation of the accumulator-suppression pump 42. Similarly, the first embodiment baler-suppression subsystem is configured to at least partially control and/or suppress sparks, embers, and/or flames in the baler chamber by discharging fire suppressant from the baler-suppression nozzles 64, 66 in response to operation of the baler-suppression pump 44. Somewhat similarly, the first embodiment spot-suppression subsystem is configured so that fire suppressant under pressure is supplied to the hose-end nozzle 49 (FIG. 7) in response to operation of the spot-suppression pump 46. When the spot-suppression pump 46 is operating, the hose-end nozzle 49 can be manually activated by squeezing its lever or trigger to spray fire suppressant in, on, and/or around the harvester 10.

In the first embodiment, the suppression pumps 42, 44, 46 can be activated, individually or collectively, by manually depressing and/or selecting one or more respective buttons, icons, and/or other suitable features of the user interfaces 92 (FIG. 1). Similarly, the suppression pumps 42, 44, 46 can be deactivated, individually or collectively, by manually depressing and/or selecting one or more respective buttons, icons, and/or other suitable features of the user interfaces 92 (FIG. 1).

As an example of automatic operation, the controller 86 can be configured to analyze one or more signals (e.g., signals comprising data indicative of any detection of at least one predetermined fire-related condition) from one or more of the detectors 68, 70, 72, 74, and initiate operation of one or more of the suppression pumps 42, 44, 46 in response to any detected fire-related condition(s) exceeding threshold(s).

An example of a method of operating the accumulator and baler suppression pumps 42, 44 is described in the following, in accordance with the first embodiment. The suppression-system controller 86 (FIG. 5) can be configured to include an "interlock" or other suitable feature so that the operation of both the accumulator-suppression pump 42 and baler-suppression pump 44 are initiated at about the same time, or more specifically simultaneously. The suppression-system controller 86 can be further configured so that, after initiating operation of the accumulator-suppression and baler suppression pumps 42, 44, operation of the accumulator-suppression pump 42 is automatically ceased, at first predetermined time, prior to automatic cessation of the baler-suppression pump 44. Automatic cessation of the baler-suppression pump 44 can occur at a second predetermined time that is after the first predetermined time.

Optionally, operations of the suppression-system controller 86 and harvester's conventional controller (not shown) can be coordinated in response to manually initiated instructions and/or automatic operations of the suppression-system controller 86. In one example of these coordinated operations, both of the above-discussed feeding mode of operation of the accumulator 32 and the baling mode of operation of the baler can be initiated at about the same time, or more specifically simultaneously, with the initiation of operation of the accumulator-suppression and baler suppression pumps 42, 44. Thereafter, cessation of the feeding mode of operation of the accumulator 32 and cessation of the operation of the accumulator-suppression pump 42 can occur at about the same time, or more specifically simultaneously. Thereafter, cessation of the baling mode of operation of the baler 34 can occur before cessation of the operation of the baler-suppression pump 44. For example, the baler-suppression subsystem of the first embodiment is configured in a manner that seeks to sufficiently at least partially control and/or suppress any sparks, embers, and/or fire in the baler chamber for a sufficient period of time so that, for example while the bale 336 remains in the baler chamber, the harvester 10 can be driven across land to a relatively fire-resistant location. The fire-resistant location may be a natural, cleared, and/or otherwise configured area having a relatively reduced amount of combustible material. The fire-resistant location may be adjacent to the field being harvested and/or in any other suitable location. When the harvester 10 reaches the fire-resistant location, the baler gate or rearward housing 226 can be actuated to deliver the bale 336 onto the extended unloader 36, and the unloader can deposit the bale in the relatively fire-resistant location. Additionally or alternatively, the bale 336 can be carried by the unloader 36 while the vehicle 10 is traveling, and thereafter the bale can be unloaded from the unloader.

One or more of the above-discussed features may be configured differently or be omitted from the harvester 10. Optionally, one or more of the features of the detection system of this disclosure (e.g., one or more of the detectors 68, 70, 72, 74 and associated features) may be omitted from the harvester 10. On the other hand, one or more of the detectors 68, 70, 72, 74 and associated features can be included in the harvester 10. Signals from one or more of the detectors 68, 70, 72, 74 can be processed (e.g., by a computer processor of the system controller 86) to provide associated information that can be displayed to a user on the user interfaces 92 (FIG. 1) so that the user can use his or her judgement to initiate operation of one or more features of the suppression system (e.g., the suppression pumps 42, 44, 46). As another example, the signals from one or more of the detectors 68, 70, 72, 74 may be processed (e.g., by the computer processor of the system controller 86) and used as part of the process of automatically initiating operation of one or more features of the suppression system. For example, the first embodiment detection system (e.g., the detectors 68, 70, 72, 74) can be configured to quickly detect sparks, embers, and/or flames at predetermine locations in the harvester's material flow path, and operation of respective components of the first embodiment suppression system (e.g., the suppression pumps 42, 44, 46) can be quickly initiated, either manually or automatically, in a manner that seeks to quickly at least partially control and/or suppress the sparks, embers, and/or flames. The suppression system can be configured in a manner that seeks to quickly at least partially control and/or suppress the sparks, embers, and/or flames in a manner that seeks to allow for substantially continuous harvesting operations of the harvester 10.

The first embodiment accumulator-suppression subsystem can be configured so that, in a single cycle of this system, the accumulator-suppression pump 42 can supply, by way of the accumulator-suppression nozzles 50, 54, 56, 60, 62, forty to fifty gallons of fire suppressant into the interior space of the chamber of the accumulator 32 in about ninety seconds. The first embodiment baler-suppression subsystem can be configured so that, in a single cycle of this system, the baler-suppression pump 44 can supply, by way of the baler-suppression nozzles 64, 66, fog and/or mist into the interior space of the chamber of the module builder 34 for about fifteen to twenty minutes. In one example, each of the tanks 40 (FIG. 4) can contain fifty gallons of the fire suppressant, and the fire suppressant can also be supplied from a conventional sixty eight gallon tank conventionally present on the harvester 10, so that the suppression system can operate through at least two complete suppression cycles before replenishing the suppression system with fire suppressant.

An aspect of this disclosure is the provision of system(s) that seek to promote the safety of a user operating the harvester 10, seek to restrict fire-related damage to the harvester (e.g., seeks to restrict any damage to merely cosmetic damage), and seek to minimize downtime associated with fire-related events. Another aspect of this disclosure is the provision of system(s) that seek to provide early, high-speed, reliable detection of fires and fire risks in harvesters. Another aspect of this disclosure is the provision of system(s) that seek to provide effective suppression of fires and fire risks in key high risk areas of harvesters. A further aspect of this disclosure is the provision of a suppression system that seeks to be capable of being quickly prepared for reuse (e.g., by resupplying the tanks 40 (FIG. 4) with fire suppressant), for example since the detection system can use non-destructive detection methods (e.g., optical detection methods).

The first embodiment accumulator-suppression pump 42 is a relatively high-flow, medium-pressure pump. As a more specific example, a suitable accumulator-suppression pump 42 can be a twelve volt, electric-motor operated centrifugal pump configured to provide a flow rate of about 26.5 gallons per minute ("gpm") at a pressure of about 30 pounds per square inch ("psi"). More generally, it is believed that a suitable accumulator-suppression pump 42 can be configured to provide a flow rate in a range from about 20 gpm to about 50 gpm (or any values or subranges therebetween), at a pressure in a range from about 20 psi to about 50 psi (or any values or subranges therebetween).

The first embodiment accumulator-suppression subsystem can be configured so that while the accumulator-suppression pump 42 is operating and the accumulator-suppression nozzles 50, 54, 56, 60, 62 are simultaneously discharging the fire suppressant, the fire suppressant is supplied to each of the upper nozzle assemblies 52 at a pressure of about 15 psi, the fire suppressant is supplied to each of the lower nozzle assemblies 58 at a pressure of about 29 psi, and the fire suppressant is supplied to each of the upper-central accumulator-suppression nozzles 50 at a pressure of about 13 psi. More generally, it is believed that the first embodiment accumulator-suppression subsystem may be configured so that while the accumulator-suppression pump 42 operating and the accumulator-suppression nozzles 50, 54, 56, 60, 62 are simultaneously discharging the fire suppressant, the fire suppressant is supplied to each of the upper nozzle assemblies 52 at a pressure in a range from about 7 psi to about 35 psi (or any values or subranges therebetween), the fire suppressant is supplied to each of the lower nozzle assemblies 58 at a pressure in a range from about 14 psi to about 60 psi (or any values or subranges therebetween), and the fire suppressant is supplied to each of the upper-central accumulator-suppression nozzles 50 at a pressure in a range from about 6 psi to about 30 psi (or any values or subranges therebetween).

The first embodiment baler-suppression pump 44 is a relatively very high-pressure, low-flow pump. As a more specific example, a suitable baler-suppression pump 44 can be a twelve volt, electric-motor operated plunger pump or piston pump configured to provide a flow rate of about 1 gpm at a pressure of about 450 psi. More generally, it is believed that a suitable baler-suppression pump 44 can be configured to provide a flow rate in a range from about 0.2 gpm to about 3 gpm (or any values or subranges therebetween), at a pressure in a range from about 200 psi to about 1000 psi (or any values or subranges therebetween).

The first embodiment spot-suppression pump 46 is a relatively medium-flow pump. As a more specific example, a suitable spot-suppression pump 46 can be a twelve volt, electric-motor operated diaphragm pump configured to provide a flow rate of about 7 gpm at a pressure of about 100 psi. More generally, it is believed that a suitable spot-suppression pump 46 can be configured to provide a flow rate in a range from about 2 gpm to about 15 gpm (or any values or subranges therebetween), at a pressure in a range from about 50 psi to about 150 psi (or any values or subranges therebetween). As an example, the use of the term "relative" with respect to the suppression pumps 42, 44, 46 can be understood in the context of comparing the suppression pumps with one another.

The first embodiment upper-central accumulator-suppression nozzles 50 are configured to discharge the fire suppressant in a relatively wide angle, cone spray pattern (e.g., a hollow-cone spray pattern), for example to provide the main deluge for the accumulator-suppression subsystem. As a more specific example, a suitable upper-central accumulator-suppression nozzle 50 can be a plug nozzle configured to provide a hollow-cone spray pattern having an angle of about 140 degrees when operating at a pressure of about 30 psi and a flow rate of about 7 gpm. More generally, it is believed that a suitable upper-central accumulator-suppression nozzle 50 can be a plug nozzle configured to provide a hollow-cone spray pattern with an average spray pattern of in a range from about 120 degrees to about 170 degrees (or any values or subranges therebetween) when operating at a pressure in a range from about 20 psi to about 50 psi (or any values or subranges therebetween), and a flow rate in a range from about 3 gpm to about 20 gpm (or any values or subranges therebetween).

The first embodiment middle accumulator-suppression nozzles 54 are configured to discharge the fire suppressant in a relatively large angle, cone spray pattern (e.g., solid-cone spray pattern). As a more specific example, a suitable middle accumulator-suppression nozzle 54 can be configured to provide a solid-cone spray pattern with an average droplet size of about 449 micron when operating at a pressure of about 30 psi and a flow rate of about 3 gpm. More generally, it is believed that a suitable middle accumulator-suppression nozzle 54 can be configured to provide a solid-cone spray pattern with an average droplet size in a range from about 211 micron to about 729 micron (or any values or subranges therebetween) when operating at a pressure in a range from about 20 psi to about 50 psi (or any values or subranges therebetween), and a flow rate in a range from about 1 gpm to about 10 gpm (or any values or subranges therebetween), while providing a spray pattern having an angle within a range from about 80 degrees to about 120 degrees (or any values or subranges therebetween).

The first embodiment front and rear accumulator-suppression nozzles 56 are configured to discharge the fire suppressant in a relatively narrow fan spray pattern. As a more specific example, a suitable accumulator-suppression nozzle 56 can be configured to provide a fan spray pattern with an average droplet size of about 781 micron when operating at a pressure of about 30 psi and a flow rate of about 2 gpm. More generally, it is believed that a suitable accumulator-suppression nozzle 56 can be configured to provide a fan spray pattern with an average droplet size in a range from about 417 micron to about 1165 (or any values or subranges therebetween) when operating at a pressure in a range from about 20 psi to about 50 psi (or any values or subranges therebetween), and a flow rate in a range from about 1 gpm to about 10 gpm (or any values or subranges therebetween), while providing a spray pattern having an angle of about 15 degrees.

The first embodiment lower accumulator-suppression nozzles 60 are configured to discharge the fire suppressant in a relatively narrow fan spray pattern. As a more specific example, a suitable accumulator-suppression nozzle 60 can be configured to discharge the fire suppressant in a relatively narrow fan spray pattern with an average droplet size of about 781 micron when operating at a pressure of about 30 psi and a flow rate of about 2 gpm. More generally, it is believed that a suitable accumulator-suppression nozzle 60 can be configured to discharge the fire suppressant in a relatively narrow fan spray pattern with an average droplet size in a range from about 417 micron to about 1165 micron (or any values or subranges therebetween) when operating at a pressure in a range from about 20 psi to about 50 psi (or any values or subranges therebetween), and a flow rate in a range from about 1 gpm to about 5 gpm (or any values or subranges therebetween), while providing a spray pattern having an angle of about 15 degrees.

The first embodiment baler-suppression nozzles 64, 66 are configured to discharge the fire suppressant as a fog and/or mist, at least initially in a conical pattern. As a more specific example, a suitable accumulator-suppression nozzle 64, 66 can be configured to discharge the fire suppressant as a fog and/or mist with an average droplet size of about 79 micron when operating at a pressure of about 600 psi and a flow rate of about 0.25 gpm. More generally, it is believed that a suitable accumulator-suppression nozzle 64, 66 can be configured to discharge the fire suppressant as a fog and/or mist with an average droplet size in a range from about 29 micron to about 149 micron (or any values or subranges therebetween) when operating at a pressure in a range from about 300 psi to about 2000 psi (or any values or subranges therebetween), and a flow rate in a range from about 0.1 gpm to about 1 gpm (or any values or subranges therebetween). The first embodiment baler-suppression nozzles 64, 66 are configured to fill (e.g., substantially fill) the interior of the chamber of the module builder 34 with the fire suppressant in the form of fog and/or mist. As an example, the use of the term "relative" with respect to the suppression nozzles 50, 54, 56, 60, 62 can be understood in the context of comparing the suppression nozzles with one another.

The above-discussed first embodiment is provided as an example, and numerous variations to the first embodiment are within the scope of this disclosure. For example, one or more features of the first embodiment can be omitted, rearranged, reconfigured, included in duplicate, reduced in number, and/or be varied in any other suitable manner. As an example of an alternative embodiment, it is believed that the harvester 10 may be modified to be towed behind a tractor. As an example for the tow-behind harvester, the engine compartment 16 (FIG. 1) and its contents may be omitted from the tow-behind harvester, and respective features of the tow-behind harvester (e.g., its hydraulic and electrical systems) may be coupled to respective features of the tractor (e.g., its hydraulic and electrical systems). Other types of harvesters, for example combine harvesters, are within the scope of this disclosure.

As another example, a second embodiment of this disclosure can be like the first embodiment (e.g., in both configuration and function), except for variations noted and variations that will be apparent to those of ordinary skill in the art. In the second embodiment, the harvester is a cotton picker rather than a cotton stripper. As a more specific example of a version of the second embodiment, both the system for detecting the adverse fire-related conditions and the system for at least partially controlling and/or suppressing the adverse fire-related conditions are incorporated into the cotton picker, wherein the cotton picker was a conventional JOHN DEERE CP690 Cotton Picker prior to being retrofitted with the detection and suppression systems.

The harvesting apparatus (e.g., see harvesting apparatus 20 of FIG. 1) of the second embodiment includes rotating machinery in the form of rows of barbed spindles that are configured to be rotated and remove the raw cotton from the cotton plants. The second embodiment harvesting apparatus further includes rotating machinery in the form of counter-rotating brushes or doffers configured to removing the raw cotton from the spindles. The cotton picker of the second embodiment typically does not include the intermediate duct 26, field cleaner 28, and downstream duct 30 of the first embodiment. Rather, the cotton picker of the second embodiment is typically configured so that a plurality of supply ducts (e.g., like/see the upstream duct 24 of the first embodiment), which are arranged in parallel to one another, supply the raw cotton from the harvesting apparatus directly to the interior of the accumulator chamber, and each of the supply ducts can be equipped with detectors 68 in substantially the same way that the upstream duct 24 of the first embodiment is equipped with the upstream detectors 68. One or more of U.S. Pat. Nos. 4,463,543, 6,550,230, 7,631,716, and 9,313,952 are believed to disclose examples of suitable harvesting apparatus and supply ducts (e.g., supply ducts configured to supply the raw cotton from the harvesting apparatus to the interior of the accumulator chamber).

To supplement the present disclosure, this application incorporates by reference the entire disclosure of each of: U.S. Pat. Nos. 7,631,716; 7,026,619; 4,606,177, 5,311,728 and 6,018,938; 4,606,177, 6,159,094 and 9,763,387; U.S. Pat. Pub. 2014/0157745; U.S. Pat. Nos. 6,941,740, 7,631,716, 8,925,287, and 10,034,433; U.S. Pat. Pub. 2018/0242527; and U.S. Pat. Nos. 4,463,543, 6,550,230, and 9,313,952.

Reiterating from above, it is within the scope of this disclosure for one or more of the terms "substantially," "about," "approximately," and/or the like, to qualify each of the adjectives and adverbs of the foregoing disclosure, for the purpose of providing a broad disclosure. As an example, it is believed that those of ordinary skill in the art will readily understand that, in different implementations of the features of this disclosure, reasonably different engineering tolerances, precision, and/or accuracy may be applicable and suitable for obtaining the desired result. Accordingly, it is believed that those of ordinary skill will readily understand usage herein of the terms such as "substantially," "about," "approximately," and the like.

In the specification and drawings, examples of embodiments have been disclosed. The present invention is not limited to such exemplary embodiments. The use of the term "and/or" includes any and all combinations of one or more of the associated listed items. Unless otherwise noted, specific terms have been used in a generic and descriptive sense and not for purposes of limitation.

The invention claimed is:

1. A vehicle configured to at least partially process harvested plant material and at least partially control any sparks, embers, and/or flames associated with the plant material, the vehicle comprising:
   a chassis;
   a module builder supported by the chassis, and configured to receive the harvested plant material and form the harvested plant material into a module within a first portion of an interior of the module builder; and
   a nozzle mounted to the module builder, and configured to receive fire suppressant under pressure and discharge the fire suppressant into a second portion of the interior of the module builder, wherein the first and second portions of the interior are adjacent to one another.

2. The vehicle according to claim 1, wherein:
   the module builder includes a plurality of belts configured to extend at least partially around the module; and
   at least a portion of a belt of the plurality of belts is positioned between the first and second portions of the interior.

3. The vehicle according to claim 1, wherein the nozzle is configured to discharge at least some of the fire suppressant as fog.

4. The vehicle according to claim 1, wherein the nozzle is configured to discharge at least some of the fire suppressant as mist.

5. The vehicle according to claim 1, wherein the nozzle is configured to discharge the fire suppressant in a pattern consisting essentially of fog and/or mist.

6. The vehicle according to claim 1, wherein:
   the nozzle is a first nozzle mounted to a first side wall of the module builder;
   the vehicle further comprises a second nozzle mounted to a second sidewall of the module builder, and configured to receive fire suppressant under pressure and discharge the fire suppressant into a third portion of the interior of the module builder; and
   the first and third portions of the interior are adjacent to one another.

7. The vehicle according to claim 1, wherein:
   the nozzle is a first nozzle mounted to a first side wall of the module builder;
   the vehicle further comprises a second nozzle mounted to a second sidewall of the module builder, and configured to receive fire suppressant under pressure and discharge the fire suppressant into a third portion of the interior of the module builder;
   the module builder includes a rearward housing mounted for being pivoted relative to a forward housing of the module builder;
   the first nozzle is mounted to the forward housing; and
   the second nozzle is mounted to the rearward housing.

8. A vehicle configured to at least partially process harvested plant material, the vehicle comprising:
   a chassis;
   a plurality of material processing units supported by the chassis, configured to cooperatively move the harvested plant material along a flow path, and configured to be in series along the flow path, wherein the plurality of material processing units comprises:
      a first material processing unit comprising machinery positioned in the flow path and configured to rotate and potentially generate sparks when engaged by any rock and/or metallic debris in the flow path, and
      a downstream material processing unit comprising a conduit positioned downstream from the first material processing unit;
   a fan supported by the chassis, wherein the fan is in fluid communication with the conduit and configured to at least partially cause the harvested plant material to be transported along at least the portion of the flow path within the conduit; and
   a detector configured to detect at least one predetermined fire-related condition within the conduit, and provide a signal comprising data indicative of any detection of the at least one predetermined fire-related condition within the conduit.

9. The vehicle according to claim 8, wherein the plurality of material processing units further comprises an accumulator positioned downstream from the conduit and configured to repeatedly accumulate the harvested plant material and repeatedly discharge the harvested plant material.

10. The vehicle according to claim 8, wherein:
    the first detector is an optical detector having a field of view;
    the vehicle further comprises a second detector configured to detect at least one predetermined fire-related condition within the conduit, and provide a signal comprising data indicative of any detection of the at least one predetermined fire-related condition within the conduit; and
    the second detector is an optical detector having a field of view directed toward the field of view of the first detector.

11. The vehicle according to claim 8, wherein the first material processing unit is a field cleaner.

12. The vehicle according to claim 8, wherein:
    the first material processing unit comprises a harvesting apparatus configured to harvest the plant material and provide the plant material to the flow path; and
    the harvesting apparatus comprises a crosswise series of harvester units.

13. A method for at least partially controlling any fire-related condition in a vehicle configured to at least partially process harvested plant material, the method comprising:
    operating a plurality of material processing units supported by a chassis of the vehicle, so that the plurality of material processing units cooperatively move the harvested plant material along a flow path, wherein:
       the plurality of material processing units are configured to be in series along the flow path,
       the plurality of material processing units includes upstream and downstream material processing units each including a respective chamber through which the flow path extends, and
       the upstream material processing unit is positioned upstream from the downstream material processing unit along the flow path;
    discharging fire suppressant into the chamber of the upstream material processing unit;
    discharging fire suppressant into the chamber of the downstream material processing unit;
    transporting harvested plant material from the upstream material processing unit to the downstream material processing unit along a portion of the flow path;

ceasing the discharging of the fire suppressant into the chamber of the upstream material processing unit; and ceasing the discharging of the fire suppressant into the chamber of the downstream material processing unit after the ceasing of the discharging of the fire suppressant into the chamber of the upstream material processing unit.

14. The method according to claim 13, further comprising operating rotating machinery of a material processing unit of the plurality of material processing units, comprising operating the rotating machinery in the flow path at a position upstream from the upstream material processing unit in a manner that has the potential to generate sparks in response to the rotating machinery being engaged by any rock and/or metallic debris in the flow path.

15. The method according to claim 14, wherein:

the upstream material processing unit is an accumulator, and the method further comprises repeatedly accumulating harvested plant material in the accumulator and repeatedly discharging the accumulated plant material from the accumulator; and the downstream material processing unit is a module builder, and the method further comprises the module builder repeatedly receiving, and baling, the discharged accumulated plant material.

16. The method according to claim 13, comprising:

forming the harvested plant material into a module in the downstream material processing unit; and at least partially enveloping the module in a fog and/or mist of the fire suppressant in the chamber of the downstream material processing unit, wherein the enveloping is comprised of the discharging of the fire suppressant into the chamber of the downstream material processing unit.

17. The method according to claim 16, further comprising:

operating the vehicle to move the vehicle on land between first and second places during the enveloping; and unloading the module from the vehicle at the second place.

* * * * *

UNITED STATES PATENT AND TRADEMARK OFFICE
CERTIFICATE OF CORRECTION

PATENT NO. : 12,280,278 B2  
APPLICATION NO. : 18/388959  
DATED : April 22, 2025  
INVENTOR(S) : Robert A. Duncan et al.

Page 1 of 1

It is certified that error appears in the above-identified patent and that said Letters Patent is hereby corrected as shown below:

In the Specification

Column 17, delete Line 35 and insert: --another and include opposite flighting to move the removed--

Signed and Sealed this
Fifth Day of August, 2025

Coke Morgan Stewart
*Acting Director of the United States Patent and Trademark Office*